United States Patent
Fonseka et al.

(10) Patent No.: US 7,920,637 B2
(45) Date of Patent: *Apr. 5, 2011

(54) SINGLE SIDEBAND AND QUADRATURE MULTIPLEXED CONTINUOUS PHASE MODULATION

(76) Inventors: John P. Fonseka, Plano, TX (US); Eric Morgan Dowling, San Jose, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 12/385,468

(22) Filed: Apr. 9, 2009

(65) Prior Publication Data

US 2009/0279422 A1    Nov. 12, 2009

Related U.S. Application Data

(63) Continuation of application No. 11/253,730, filed on Oct. 20, 2005, now Pat. No. 7,532,676.

(51) Int. Cl.
*H04L 23/02* (2006.01)

(52) U.S. Cl. ..................................... 375/265

(58) Field of Classification Search .................. 375/265, 375/130, 146, 147, 256, 259, 298, 329, 316, 375/295; 370/208, 401, 476

See application file for complete search history.

(56) References Cited

U.S. PATENT DOCUMENTS

| | | | |
|---|---|---|---|
| 4,835,791 A | 5/1989 | Daoud | |
| 5,852,476 A | 12/1998 | Limberg | |
| 6,667,760 B1 | 12/2003 | Limberg | |
| 6,947,509 B1 | 9/2005 | Wong | |
| 7,072,427 B2 * | 7/2006 | Rawlins et al. | 375/346 |
| 7,386,292 B2 * | 6/2008 | Sorrells et al. | 455/313 |
| 7,532,676 B2 * | 5/2009 | Fonseka et al. | 375/265 |
| 2005/0078768 A1 * | 4/2005 | Sun et al. | 375/297 |

OTHER PUBLICATIONS

Kahn and Thomas, "Bandwidth Properties and Optimum Demodulation of Single Sideband FM," IEEE Transactions on Communications Technology, vol. COM-14, No. 2, Apr. 1966, pp. 113-117.

Chadwick, "Binary Single-Sideband Phase-Modulated Systems," IEEE Transactions on Information Theory, Jan. 1972, pp. 214-215.

Anderson et al., "A Bandwidth-Efficient Class of Signal Space Codes," IEEE Transactions on Information Theory, vol. IT-24, No. 6, Nov. 1978, pp. 703-712.

Pizzi et al., "Convolutional Coding Combined with Continuous Phase Modulation," IEEE Transactions on Communications, vol. COM-33, No. 1, Jan. 1985, pp. 20-29.

Rimoldi, "A Decomposition Approach to CPM," IEEE Transactions on Information Theory, vol. 34, No. 2, Mar. 1988, pp. 260-270.

Fonseka et al., "Combined Coded Multi-h CPFSK Signaling," IEEE Transactions on Communications, vol. 38, No. 10, Oct. 1990, pp. 1708-1715.

Abriskamar et al., "Suboptimum Detection of Trellis Coded CPM for Transmission on Bandwidth- and Power-Limited Channels," IEEE Transactions on Communications, vol. 39, No. 7, Jul. 1991, pp. 1065-1074.

(Continued)

*Primary Examiner* — Khai Tran
(74) *Attorney, Agent, or Firm* — Eric M. Dowling

(57) ABSTRACT

A class of bandwidth reduction techniques are used develop a broad class of modulation types collectively called SSB-FM. These signals can be used to construct communication systems that provide bandwidth-normalized performance gains of 10 dB or more when compared to popular prior art modulation methods. An aspect of the invention involves mapping trellis paths in a complex signal space onto corresponding real-valued trellis signals with desirable spectral properties. The invention can be used map continuous phase modulated (CPM) signals onto simpler amplitude-modulated trellis signals having double the channel capacity of prior art CPM signals. Multi-amplitude signaling and frequency division multiplexing may also be incorporated to further accommodate more information per symbol.

16 Claims, 26 Drawing Sheets

OTHER PUBLICATIONS

Sasase et al., "Multi-h Phase-Coded Modulation," IEEE Communications Magazine, Dec. 1991, pp. 46-56.

Hohubowicz et al., "Good Multi-T Phase Codes Under Bandwidth and Complexity Constraints," IEEE Transactions on Information Theory, vol. 40, No. 5, Sep. 1994, pp. 1699-1702.

Fonseka et al., "Nonlinear Continuous Phase Frequency Shift Keying," IEEE Transactions on Communications, vol. 39, No. 10, Oct. 1991, pp. 1473-1481.

Sundberg, "Continuous Phase Modulation," IEEE Communications Magazine, Apr. 1986, pp. 25-37.

Premji et al., "A Practical Receiver Structure for Multi-h CPM Signals," IEEE Transactions on Communications, vol. 35, No. 9, Sep. 1987, pp. 901-908.

Nyirenda and Korn "Acutocorrelation Function and Power Spectral Density of Complex Phase Modulated Signals Derived from Full Response CPM," IEEE Transactions on Communications, vol. 38, No. 10, Oct. 190, pp. 1649-1652.

Ginesi et al., "Symbol and Superbaud Timing Recovery in Multi-H Continuous Phase Modulation," IEEE Transactions on Communications, vol. 47, No. 5, May 1999, pp. 664-667.

Mujtaba, "A Novel Scheme for Transmitting QPSK as a Single Sideband Signal," IEEE, 1998, pp. 592-597.

Campenalla et al., "Optimum Bandwidth-Distance Performance in Partial Response CPM Systems," IEEE Transactions on Communications, vol. 44, No. 2, Feb. 1996, pp. 148-151.

Aulin et al., "Continuous Phase Modulation—Part I: Full Response Signaling," IEEE Transactions on Communications, vol. COM-29, No. 3, Mar. 1981, pp. 196-209.

Aulin et al., "Continuous Phase Modulation—Part II: Partial Response Signaling," IEEE Transactions on Communications, vol. COM-29, No. 3, Mar. 1981, pp. 210-225.

Tassduq et al., "OFDM-CPM Signals for Wireless Communications," Canadian Journal of Elect. Comput. Eng., vol. 28, No. 1, Jan. 2003, pp. 19-25.

Tassduq et al., "Performance of Optimum and Suboptimum OFDM-CPM Receivers over Multipath Fading Channels," Wireless Communications and Mobile Computing, vol. 5, 2005, pp. 365-374.

Tassduq et al., "PAPR Reduction of OFDM signals using Multiamplitude CPM," Electronic Letters, Aug. 2002, pp. 915-917.

Tassduq et al., "OFDM-CPM Signals," Electronic Letters, Jan. 2002, vol. 38, No. 2, pp. 80-81.

\* cited by examiner

SINGLE SIDEBAND AND QUADRATURE MULTIPLEXED CONTINUOUS PHASE MODULATION

This application is a continuation of U.S. patent application Ser. No. 11/253,730, filed Oct. 20, 2005, now U.S. Pat. No. 7,532,676.

BACKGROUND OF THE INVENTION

1. Field of the Invention

This invention relates generally to communication transmitters, receivers, and systems. More particularly, the invention relates to a class of single sideband frequency modulation (SSB-FM) algorithms and their use in designing trellis based modems.

2. Description of the Related Art

Modulation techniques that can pass more information through a fixed bandwidth are generally desirable. Specific needs exist for improved bandwidth-efficient modulation schemes for use in applications like DSL modems, cable modems, broadband wireless access (e.g., WiMAX, 802.16, 802.16a), wireless local area networks (e.g., WiFi, 802.11), personal area networks (e.g., Bluetooth), terrestrial HDTV channels, digital cable TV channels, satellite communications, cellular telephones, wide-area cellular telephony based endpoints (e.g., GSM EDGE, 2.5G, 3G and 4G terminals and base stations), and the like.

In the prior art, an example of a bandwidth-reducing modulation scheme is single sideband (SSB) modulation. SSB techniques use a Hilbert transform to halve the bandwidth that would have been needed to send the same information using double sideband AM. A suppressed-carrier double sideband amplitude modulated signal (DSB-AM) is formed by amplitude-modulating a real-valued message signal m(t), $$x_{DSB-AM}(t) = m(t) \quad (1)$$

A single sideband AM (SSB-AM) signal can be constructed by first constructing a SSB baseband signal according to $$x_{SSB-AM\pm}(t) = m(t) \pm j\hat{m}(t) \quad (2)$$

and then generating the SSB-AM signal at carrier frequency $\omega_c$ as $$s_{SSB\pm}(t) = \frac{A}{2}[x_{SSB-AM\pm}(t)e^{j\omega_c t} \pm x^*_{SSB-AM\pm}(t)e^{-j\omega_c t}] \quad (3)$$
$$= A\operatorname{Re}\{x_{SSB=AM\pm}(t)e^{j\omega_c t}\}$$
$$= Am(t)\cos(\omega_c t) \mp A\hat{m}(t)\sin(\omega_c t) \quad (4)$$

where, A is a scalar, $\hat{m}(t)$ is the Hilbert transform of m(t), and the subscripts + and − represent the upper lower sidebands respectively. The above SSB-AM signal can be viewed as a quadrature multiplexed signal where the message m(t) is transmitted on the in-phase (I) channel and the Hilbert transform of the message, $\hat{m}(t)$, is transmitted on the quadrature (Q) channel to cancel out one sideband of m(t)'s DSB spectrum.

Prior art SSB bandwidth reduction is predicated on the fact that the baseband signal is real. Hence, SSB-AM techniques are not typically applied to signaling schemes in which the baseband signal is complex, such as in angle modulation. Angle modulation includes frequency modulation (FM) and phase modulation (PM). In angle modulated systems, the baseband signal is of the form $$x_{FM,PM}(t) = e^{j\alpha(t)} \quad (5)$$

where α(t) is an information-carrying baseband phase function. When equation (5) is used to angle modulate a carrier, a constant-envelope double sideband (DSB) angle modulated passband signal results:

$$s_{FM,PM}(t) = ARe\{x_{FM,PM}(t)e^{j\omega_c t}\} = A\cos[\omega_c t + \alpha(t)], \quad (6)$$

where A is the signal amplitude. In FM, the instantaneous frequency of α(t) is varied according to an information signal, while in PM, α(t) is directly varied according to the information signal.

In the prior art, mathematical difficulties arise when one attempts to apply SSB-AM bandwidth reduction techniques to angle modulated signals. This is because SSB-AM methods assume a real message signal, which is processed according to equations (2) and (3) to generate the SSB-AM passband signal. On the other hand, angle modulated systems involve the complex baseband signal of equation (5). If the standard SSB-AM method of equation (2) is applied using m(t)= $x_{FM,PM}(t)$ of equation (5), information is destroyed and the demodulation and recovery of the FM or PM signal becomes complicated or impossible.

The same kinds of technical problems arise if one attempts to apply SSB-AM bandwidth reduction methodologies to digital modulation/demodulation (modem) schemes that use angle modulation such as phase-shift keying (PSK), continuous phase modulation (CPM), and quadrature amplitude modulation (QAM). The baseband signals for such digital communication methods are complex as opposed to being real-valued, thus complicating the application of SSB bandwidth reduction techniques to these classes of signals.

Some previous researchers have made attempts to apply SSB-AM bandwidth reduction techniques to restricted classes of angle modulated systems. Prior art methods typically apply SSB-AM methodology to the phase signal, α(t), to produce an SSB-AM phase signal [α(t)+jα̂(t)], and to then apply angle modulation using this modified, reduced bandwidth phase signal. When such prior art approaches are applied, the resulting modulated signal becomes:

$$s_\Phi(t) = ARe\{e^{j[\alpha(t)+j\hat{\alpha}(t)]}e^{j\omega_c t}\} = Ae^{-\hat{\alpha}(t)}\cos[\omega_c t + \alpha(t)]. \quad (7)$$

The prior art techniques, though, have some deficiencies. While the phase signal α(t) has its bandwidth reduced by one half, the actual modulated signal according to equation (7) is not really a SSB angle modulated signal, and generally has a bandwidth greater than exactly half the bandwidth of the corresponding DSB signal. In fact, in the Berosian reference, it was found that the signal in equation (7) reduces the bandwidth compared to the DSB signal by roughly one third as opposed to one half. Worse yet, due to the envelope term $e^{-\hat{\alpha}(t)}$ in equation (7), the modulated signal can have very high amplitude fluctuations. Still, because the phase angle α(t) in equation (7) remains the same as the standard FM or PM signal, demodulation reduces to equalizing the amplitude envelope and applying a standard FM or PM demodulator.

The Khan and Thomas reference discusses the bandwidth and the detection of the angle modulated signals of the form of equation (7). In the Chadwick reference, it is observed that for the special case of BPSK, x(t) in (5) reduces to a real quantity, and the signal in (7) is thus a true SSB-AM signal whose bandwidth is reduced by exactly one half. In the Nyirenda and Korn reference, the same method given by equation (7) is applied to full response continuous phase modulated (CPM) signals, to include minimum-shift keyed (MSK) signals. The results presented for MSK signals show that the bandwidth of the corresponding signal of equation (7) is about one third lower than that of ordinary MSK signals.

What is needed is a single sideband angle modulation technique that could reduce the bandwidth of a broad class of angle modulated signals by exactly one half. Also needed is a new class of quadrature multiplexed modems that use basic SSB bandwidth reduction concepts but have no need to compute Hilbert transforms in the transmitter and receiver structures.

It would be desirable to have SSB angle modulation techniques that could be applied to both continuous phase and discontinuous phase modulated signals. It would be desirable if such techniques could be applied to both constant-envelope signals and to non-constant envelope signals such as QAM and multi-amplitude CPM. It would be still more desirable to have optimum receiver structures that could achieve the same theoretical and measured probability of error performance as their DSB counterparts, but using half the bandwidth.

It would also be desirable to start with a bandwidth efficient modulation scheme like a CPM scheme and to apply an SSB technique to further reduce the already efficient bandwidth by half. It would be desirable to have new SSB based modulation techniques that could be used to design transmitters and receivers for SSB-processed CPM signals, including CPM signals such as CPM signals with full and partial responses, trellis coded CPM, multi-h CPM, multi-T CPM, and nonlinear CPM. It would be desirable if the SSB technique could reduce the spectral occupancy of already spectral efficient CPM signals by exactly half. It would be desirable to have SSB processing techniques that could be used to design digital communication systems that transmit and receive digital communication signals in a smaller bandwidth, such as one half the bandwidth required without using the SSB technique. It would be desirable to be able to apply such a technique to modulation schemes such as Gaussian minimum-shift keying (GMSK), quadrature phase shift keying (QPSK), offset QPSK (OQPSK), minimum shift keying (MSK), continuous phase frequency shift keying (CPFSK), quadrature amplitude modulation (QAM), orthogonal frequency division multiplexing (OFDM), vestigial side band (VSB), as well as other digital modem methods.

It would be desirable to have receiver structures that involve trellis decoders to decode the SSB-processed modem signals. It would be desirable to have trellis coded modulation schemes to improve minimum path distance in the trellis encoders. It would be desirable to integrate such receiver structures with turbo decoders, so that SSB-processed modem signals could be transmitted over noisy channels, and the extra 100% of bandwidth afforded by the SSB-processing could be used to carry turbo-encoded redundancy information. It would be desirable to be able to start with a modem, apply an SSB-processing technique to reduce the modem's bandwidth requirement by a factor of two, but to then send SSB-processed modem signals in both the upper and lower sidebands, to enable a communication mode whereby the double the information could be sent in the original DSB communication bandwidth. It would be desirable to have frequency division multiplexed communication systems that could efficiently multiplex two or more sidebands worth of SSB-processed information into a compact amount of bandwidth.

It would be still be more desirable to eliminate any need to compute a Hilbert transform or its inverse to achieve the same bandwidth halving as is available from SSB. That is, it would be useful to develop modem methods and apparatus that could double the supportable data rate over previous methods, while at the same time avoiding the use of the Hilbert transform.

It would be desirable to be able to map a complex baseband signal to a real-valued envelope signal that carried in its own trellis memory structure the same to information as the complex signal. It would be desirable if the mapping could preserve the bandwidth of the original complex baseband signal. It would be desirable to be able to then map two such real baseband signals into a pair of quadrature phase carriers to double the bit that could be transmitted in a unit of bandwidth. It would be still more desirable if the real-valued envelope signal could encode multi-bit symbols so that a super-highly bandwidth efficient modulation scheme could be constructed to improve the performance relative to QAM by 10 dB or more.

It would also be desirable to develop carrier recovery loops, symbol timing recovery loops, and equalization methods for practical receiver implementations to aid in the reception of such modulated signals. It would also be desirable to develop both optimal and sub-optimal, low cost receiver structures. Also needed are OFDM and other forms of multi-carrier based communication systems that would be able to take advantage of the extra bandwidth and performance available to each of the collection of channel built around the improved modulation techniques. It would further be desirable to develop communication systems that also incorporated spread spectrum techniques the mix the added capabilities of the new modulation methods with advantages of spread spectrum systems. It would further be desirable to use the inventive methods and combinations to develop communication systems, for example, to support applications like DSL modems, cable modems, broadband wireless access (e.g., WiMAX, 802.16, 802.16a), wireless local area networks (e.g., WiFi, 802.11), personal area networks (e.g., Bluetooth), terrestrial HDTV channels, digital cable TV channels, satellite communications, cellular telephones, wide-area cellular telephony based data endpoints (e.g., GSM EDGE, 2.5G, 3G and 4G), and the like.

SUMMARY OF THE INVENTION

The present invention solves the aforementioned problems of the prior art by providing new transmitter and receiver structures that make use of novel forms of trellis modulation. We refer loosely to a generalized class of communication signals and modulation methods invented herein as SSB-FM (single side band-frequency modulation). SSB-FM signals include SSB-CPM (SSB-continuous phase modulation), QM-CPM (quadrature multiplexed-CPM), MQM-CPM (multi-amplitude QM-CPM), CPM-PAM (CPM-pulse amplitude modulation), CPM-QAM (CPM-quadrature amplitude modulation), and various forms of DMCM (dense multi-carrier) to include various forms of OFDM-CPM (orthogonal frequency division multiplexed-CPM). In addition, various trellis coded modulation versions of these signaling schemes are also described herein. Various types of combinations of the above schemes can be formed, and more generalized schemes where paths through a complex signaling space are mapped to real-valued trellis signals can more generally be formed. Any such signaling scheme, as invented herein, defines a signal in a genus of signaling schemes, is coined to be an "SSB-FM signaling scheme" or an "SSB-FM signal" of the "SSB-FM" genus of signals.

The SSB-FM signals are typically mathematically derived by mapping paths through a complex signal space (such as trellis paths, often times phase trellis paths) onto a real-valued amplitude trellis signal that can be modulated using, for example, SSB-AM processing or quadrature multiplexing. In one form of the invention, a complex valued continuous phase modulated (CPM) signal is mapped to a multi-amplitude real-valued envelope signal that encodes information sequences into a trellis based memory structure. This real-valued envelope signal maintains the desirable bandwidth-efficient properties of the original CPM signal. Such real-valued envelope signals are then used to construct SSB and quadrature multiplexed trellis-based signaling schemes that provide large normalized-bandwidth-performance gains (e.g., 10 dB or more) over prior art QPSK, QAM and similar signaling schemes.

An aspect of the present invention is based on an observation that certain signals like continuous phase signals have their information encoded into a real-valued phase-trellis path. In the prior art, for the sake of bandwidth efficiency, this real-valued phase-trellis path is angle modulated onto a carrier, resulting in a complex-valued baseband signal. While the complex-valued baseband CPM signal has desirable spectral properties, the price paid is that the CPM baseband signal is complex valued, but only represents a real-valued phase-trellis path. The present invention develops transformations to map the complex-valued baseband (e.g. CPM) signal onto a real-valued envelope signal that retains the original trellis-path information and also retains the original spectral properties of its complex-valued counterpart (e.g., the desirable properties of CPM). For example, SSB-CPM techniques can be applied to send the CPM signal in half the bandwidth. Alternatively, quadrature multiplexing can be applied to transmit two of these so-derived real-valued envelope signals on quadrature-phase carriers at the same time, to send twice the amount of information in the same bandwidth occupied by the original CPM signal. When compared to prior art signaling schemes like QAM, normalized to the information rate per unit of bandwidth occupied, the present invention provides signaling schemes that provide north of 10 dB performance improvement.

In one aspect of the invention, an SSB-CPM modulator includes a baseband modulator that modulates an information stream onto a complex-valued baseband signal. The modulator uses a complex-to-real mapper that maps the complex-valued baseband signal onto a real-valued envelope signal. A Hilbert transformer then maps the real-valued envelope signal onto a corresponding real-valued Hilbert transform signal. An I/Q modulator then is used to modulate the real-valued envelope signal and the Hilbert transform signal onto a single sideband modulated signal.

Another aspect of the present invention involves a modulator that includes a baseband modulator that modulates an information stream onto a real-valued phase function. A signal mapper is employed to map the real-valued phase function to onto a real-valued envelope signal. A Hilbert transformer is used to map the real-valued envelope signal onto a corresponding real-valued Hilbert transform signal. An I/Q modulator then is able to modulate the real-valued envelope signal and the Hilbert transform signal onto a single sideband modulated signal. The spectral content of the single sideband modulated signal typically occupies half the bandwidth of a baseband signal obtained by mapping the real-valued phase function onto a complex-valued baseband signal that is related to the real-valued envelope signal through a point-wise complex-to-real signal transformation.

Another aspect of the present invention involves a modulator that includes a baseband modulator that modulates an information stream onto a real-valued phase function and a real-valued amplitude function. A mapping unit is used to map the real-valued phase function and the real-valued amplitude function onto a real-valued envelope signal. A Hilbert transformer is used to map the real-valued envelope signal onto a corresponding real-valued Hilbert transform signal. An I/Q modulator then maps the real-valued envelope signal and the Hilbert transform signal onto a single sideband modulated signal.

Another aspect of the present invention involves a modulator that includes a baseband modulator that modulates an information stream onto first and second real-valued phase functions. A signal mapper then maps the first and second real-valued phase functions onto first and second real-valued envelope signals. An I/Q modulator is then used to quadrature multiplex the first and second real-valued envelope signals respectively onto in-phase and quadrature-phase carrier signals.

Another aspect of the present invention involves a modulator that includes a baseband modulator that modulates an information stream onto first and second complex-valued baseband signals. A signal mapper is then used that maps the first and second complex-valued baseband signals onto a first and second real-valued envelope signals. An I/Q modulator is then used to quadrature multiplex the first and second real-valued envelope signals respectively onto in-phase and quadrature-phase carrier signals. The first and second real-valued envelope signals may be M-ary signals that carry multiple bits of information per symbol interval.

Another aspect of the present invention involves a modulator that includes a baseband modulator that modulates an information stream onto first and second real-valued envelope signals. An I/Q modulator is used that modulates the first and second real-valued envelope signals respectively onto in-phase and quadrature-phase carrier signals. The first and second real-valued envelope signals are point-wise related to respective first and second complex-valued baseband signals through a complex-to-real mapping. For example, the first and second complex-valued baseband signals could be TCM-QAM or TCM-PSK signals, the point-wise mapping could be the real-part operator ($\text{Re}\{\circ\}$), and the information could be recoverable from the trellis structures of the first and second real-valued envelope signals. This is an example of a SSB-FM signaling scheme where equations (8) and (9) are not needed. Still, CPM signals can be produced by this mapping by interpolating using a chosen interpolation function between signal states (constellation points) in the starting first and second complex-valued baseband signals.

BRIEF DESCRIPTION OF THE FIGURES

The various novel features of the present invention are illustrated in the figures listed below and described in the detailed description that follows.

ORGANIZATION OF THE DETAILED DESCRIPTION

Figure 1:
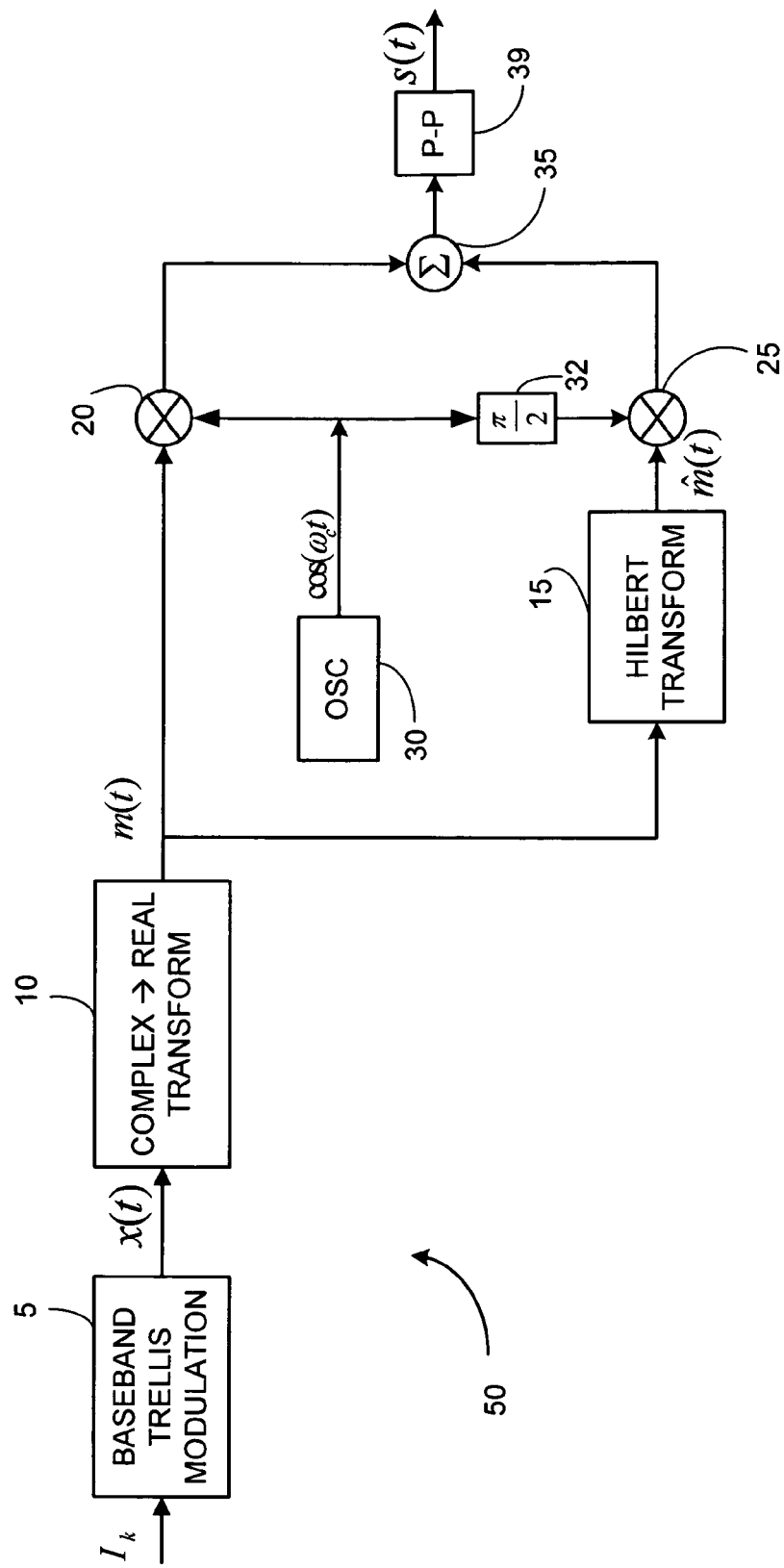
FIG. 1 is a block diagram representing an SSB-FM modulator structure (SSB-CPM, SSB-QAM, multi-amplitude SSB-CPM, etc.).

I. Single Sideband Continuous Phase Modulation (SSB-CPM)
II. Demodulation of SSB-CPM (Coherent detection)
III. Trellis Decoder Methods and Structures
IV. Bit Error rate performance analysis of SSB-CPM
V. Double Date Rate (DDR) SSB-CPM
VI. Quadrature Multiplexed CPM (QM-CPM)
VII. Multi-amplitude Quadrature-Multiplexed CPM (MQM-CPM)
VIII. Trellis Coded Modulation (TCM) versions of SSB-FM Signaling Schemes
IX. Carrier and Symbol Timing Recovery
X. Equalizer Based Processing, and CPM-PAM and CPM-QAM Receiver Structures
XI. Dense Multi-carrier Modulation (DMCM)
XII. SSB-FFT-OFDM, QM-FFT-OFDM and Recursive Modulation
XIII. SSB-CPM and MQM-CPM Systems Architectures and Services
XIV. Some Alternative Embodiments

DETAILED DESCRIPTION OF THE PREFERRED EMBODIMENTS

I. Single Sideband Continuous Phase Modulation (SSB-CPM)

Consider a signaling scheme where information is encoded into trellis paths between points or states of complex baseband signal. This is in contrast to signaling schemes whose alphabet is considered to be a set of signal constellation points. For example, many trellis coded modulation schemes encode information as trellis state transition sequences which can be modeled as real-valued trellis paths, even though the path is between different complex signal constellation points. Also, many types of complex baseband waveforms, such as continuous phase modulated (CPM) waveforms, have their information encoded into a phase trellis structure. While the CPM baseband itself signal takes on complex values, the corresponding time-varying phase angle can be represented as a real-valued signal. An aspect of the present invention is to recognize that trellis paths between constellation points in a complex signal space can be represented by purely real-valued signals, and this property can be used to develop efficient signaling schemes. That is, we can map a complex-valued signal involving transitions between complex signal points onto a real-valued signal. It is important to use a mapping that does not result in a loss of information and that does not adversely affect spectral properties. The resulting real-valued trellis-path signal behaves like an amplitude-modulated signal. In accordance with aspects of the present invention, various techniques can be applied to the resulting real-valued trellis-path signal to generate bandwidth efficient signaling schemes.

To demonstrate the general approach by way of a particularly bandwidth-efficient example, consider a continuous phase modulation (CPM) baseband signal model:

$$x(t) = A e^{j\alpha(t)} = A[\cos(\alpha(t)) + j \sin(\alpha(t))] \quad (8)$$

where, A is a constant amplitude, and $\alpha(t)$ is a phase function. Define an information sequence $I = (\ldots, I_{k-1}, I_k, I_{k+1}, \ldots)$; $I_k \in \{-1, +1\}$ and let the phase function be:

$$\alpha(t) = 2\pi h \sum_{k=-\infty}^{\infty} I_k \int_{-\infty}^{t} g(\tau - kT) d\tau + \beta \quad (9)$$

where, h is a modulation index, T is a symbol duration, g(t) is a baseband pulse-shape waveform, and $\beta$ is a fixed phase-offset. The power spectrum of x(t) in equation (8) is two-sided and x(t) is complex-valued. Hence if the Hilbert transform approach to generating an SSB signal as in equation (2) is used with m(t)=x(t), information will be lost.

In order to preserve information carried in both sidebands, but to represent the signal as a half-bandwidth SSB signal, one would need to map one sideband on to the other, however, without interfering directly with the spectral components already on that sideband. One way to accomplish this would be to map the complex baseband signal, x(t) onto a real-valued envelope signal, m(t). Such a mapping would need to be done in such a way that a receiver could later extract the information encoded into the trellis paths of x(t) by observing only a corrupted version of the real-valued envelope signal m(t), which is also referred to as the "message signal" herein.

In accordance with an aspect of the present invention, before application of SSB processing is applied to the signal of equation (8), a pre-transformation is performed to map the complex signal, x(t), onto the real-valued envelope signal, m(t). As is discussed below, we need a mapping $T_1[\circ]$: x(t)→m(t) that will allow us to map the complex signal to a the real-valued envelope signal in such a way that we can still recover the original information sequence embedded into the memory structure (trellis paths) of the complex baseband signal. Importantly, we seek a mapping that will preserve the spectral properties of x(t) so that after the transformation, the real-valued envelope signal, m(t), will occupy the same amount of bandwidth as the original complex baseband signal, x(t).

In one example mapping, let m(t)=Re{x(t)}. Note that complex constellation points of x(t) that are complex conjugate pairs (e.g., S1=a+jb and S2=a−jb) will map to the same value, a. While both constellation points S1 and S2 may map to the same single value, if a set of allowable phase transitions in and out of S1 and S2 constrain trellis paths so that a trellis path decoder can still discern the trellis paths from the signal, m(t), then this ambiguity can be resolved. What is important is to make sure the paths corresponding to merge events in m(t)'s resulting signal trellis are distinct. If the complex-to-real mapping is performed and this type of path-memory constraint is met, subsequent trellis decoding techniques will be able to recover the original information sequence from the real-valued envelope signal, m(t). Preferably, the present invention will be applied in such a way that the trellis paths of m(t) have a minimum distance equivalent or better than in x(t)'s phase trellis. This allows us to construct SSB-CPM signals that occupy half the bandwidth of DSB-CPM signals with no loss in bit error rate performance.

To understand this better, consider equation (9) and note that the information sequence is originally embedded into the real signal, $\alpha(t)$. When the real signal, $\alpha(t)$, is modulated according to equation (8), the CPM signal, x(t), results having very desirable spectral properties. An aspect of the present invention is to develop signals that are real, like $\alpha(t)$, but have the same bandwidth-efficient properties as the CPM signal, x(t). Such a real-valued envelope signal, denoted m(t), would lend itself to SSB processing and/or the quadrature multiplexing of two such signals onto a single carrier. Hence an opportunity exists to reduce the bandwidth needed to transmit a CPM signal by one half. Equivalently, the opportunity exists to double the data rate of a transmitted CPM signal in a fixed bandwidth while maintaining a constant performance level. As discussed later in this specification, the opportunity also exists to develop new QAM-like signaling schemes that can send the same amount of information as QAM in much less the bandwidth or can achieve a 10 dB or more bit error rate performance gain in the same bandwidth.

It should be understood throughout this specification that CPM is used as an example, and other modulation schemes that encode data onto trellis paths of complex baseband signals can be substituted for CPM signals in any of the discussion herein. That is, while the present specification contemplates the broader application of the techniques developed herein, CPM signals are used as a specific concrete example to show enablement and the presently known best mode. Some alternative embodiments and simplifications along these lines are discussed later in the specification.

A first goal is to convert the complex baseband signal to a real-valued envelope signal from which the original information sequence, $\{I_k\}$ can be recovered. A second goal is to preferably be able to recover the information without a loss in performance. One or both of these goals can be achieved in various ways. In a specific example, let a real message signal be derived from the complex baseband signal of equation (8) as follows:

$$m(t) = x(t) + jx^*(t) \quad (10)$$
$$= A[e^{j\alpha(t)} + je^{-j\alpha(t)}].$$
$$= A[\cos(\alpha(t)) + \sin(\alpha(t))] + jA[\cos(\alpha(t)) + \sin(\alpha(t))]$$
$$= A[y(t) + jy(t)] = A(1+j)y(t) \quad (11)$$

where $$y(t) = [\cos(\alpha(t)) + \sin(\alpha(t))] \quad (12)$$

and x*(t) denotes the complex conjugate of x(t). A brief mathematical analysis shows (see the Fonseka reference for details) that if the Fourier transform of x(t) is X($\omega$), then the Fourier transform of x*(t) is X(−$\omega$), and the spectrum of m(t) will be the same as that of x(t) for broad classes of signals, to include CPM signals. It is noticed that m(t) contains information on both sidebands of x(t), and can be viewed as a DSB-AM baseband signal.

The choice of the transform, $T_1[\circ]$: x(t)→m(t) is not unique. Another transform can be constructed as:

$$m(t) = \frac{x(t) + jx^*(t)}{A(1+j)} = y(t) = \cos(\alpha(t)) + \sin(\alpha(t)) \quad (13)$$

which will have the same spectral properties as the previous m(t) because equation (13) merely divides equation (11) by a complex constant. However, noting that $$y(t) = [\cos(\alpha(t)) + \sin(\alpha(t))] = \sqrt{2}\cos[\alpha(t) - \pi/4], \quad (14)$$

we see that we can simplify this further. Instead of defining m(t)=y(t), redefine m(t) as:

$$m(t) = \frac{e^{j\frac{\pi}{4}}(x(t) + jx^*(t))}{\sqrt{2}A(1+j)} = \frac{1}{A}\text{Re}\{x(t)\} = \cos(\alpha(t)). \quad (15)$$

As we can see, any transform that maps x(t) to a within an amplitude scaling and a phase shift of $\cos(\alpha(t))$ will suffice. Hence we use the transform of equation (15) and realize that linear combinations of such signals can be formed while still preserving the desirable spectral properties of the CPM baseband signal x(t).

For the analysis below, we assume a message signal of the form of equation (15), but we realize that any suitable choice of m(t) that is a real-valued envelope signal occupying the same bandwidth as x(t) and having a recoverable trellis-path-memory structure will suffice.

As is discussed section XI of this application, in multi-carrier systems such as OFDM systems, it is common compute inverse transforms involving vectors of complex-valued signal points, so that the inverse transformed signal is a real-valued signal, m(t). Any of the structures discussed in this patent application can be used with such signals as well. For example, in ADSL DMT (discrete multi-tone, i.e., FFT OFDM), we view the IFFT operation as the mapping of a complex-valued baseband vector signal, X(f) onto a real signal, m(t), i.e., $T_1[\circ]$: X(f)→m(t), where $T_1[\circ]$=IFFT([○]) or some other suitably chosen transform that generates a real signal from a complex baseband vector signal. In such cases, the signal m(t), may or may not inherit a trellis structure because as we will see, we will be able to recover the data with or without trellis information in the signal m(t) using the dense multi-carrier modulation (DMCM) methods described herein. However, it is important to understand that any of the inventive concepts disclosed herein may be used with this form of message signal m(t), which is also referred to as the real-valued envelope signal. Because this form of signal has different properties and error analysis, we defer to section XI to discuss this further.

Consider the standard Hilbert transform approach used to generate SSB-AM signals as per equation (3). We can apply this directly to our real-valued envelope signal obtained according to $T_1[\circ]$: x(t)→m(t). The low-pass equivalent of the SSB (upper sideband) signal can be written as $$z(t) = m(t) + j\hat{m}(t) \qquad (16)$$

where, $\hat{m}(t)$ is the Hilbert transform of m(t). That is, the SSB modulated signal at carrier frequency $\omega_c$ can be expressed as $$s_{\pm}(t) = ARe\{z(t)e^{j\omega_c t}\} \qquad (17)$$

$$= Am(t)\cos(\omega_c t) \mp A\hat{m}(t)\sin(\omega_c t) \qquad (18)$$

where the minus sign subscript gives the lower sideband and the plus sign subscript gives the upper sideband. In order to keep the notation simpler, but without loss of generality, focus on the upper sideband for now, which we can write $$s(t) = Am(t)\cos(\omega_c t) - A\hat{m}(t)\sin(\omega_c t), \qquad (19)$$

or, $$s(t) = A\sqrt{[m^2(t)+\hat{m}^2(t)]}\cos[\omega_c t + \theta(t)] \qquad (20)$$

where $$\theta(t) = \tan^{-1}\left[\frac{\hat{m}(t)}{m(t)}\right] \qquad (21)$$

is the phase variation of s(t). It is seen that the SSB signal is no longer a constant envelope signal, and it has a time varying phase variation.

The average transmitted power, $P_{avg.}$ and the average energy, $E_{avg.}$, of s(t) are given by $$P_{avg.} = \frac{A^2}{2}\overline{[m^2(t)+\hat{m}^2(t)]}, E_{avg.} = \frac{A^2 T}{2}\overline{[m^2(t)+\hat{m}^2(t)]} \qquad (22)$$

where the overbar denotes the average value over time. Observing that $\overline{m^2(t)} = \overline{\hat{m}^2(t)}$, $P_{avg.}$ and $E_{avg}$ can be simplified as $$P_{avg.} = A^2\overline{m^2(t)}, E_{avg.} = A^2 T\overline{m^2(t)}. \qquad (23)$$

If $\alpha(t)$ is continuous, m(t) and $\hat{m}(t)$ are continuous, hence, $\theta(t)$ is also continuous. Thus for the case of continuous phase modulated (CPM) signals, the continuous phase property of the signaling scheme is preserved through the transformation from DSB-CPM to SSB-CPM. That is, given an original double side band continuous phase modulated (DSB-CPM) signal as per equations (8)-(9) with $\alpha(t)$ continuous, if the above described transforms are applied to derive the single sideband signal according to equations (15)-(19), then the resulting signal is called a single sideband continuous phase modulated (SSB-CPM) signal. We note the SSB-CPM signal occupies exactly half the bandwidth as the corresponding DSB-CPM signal from which it was derived. While the SSB-CPM signal is not a constant-envelope signal like its DSB-CPM counterpart, the envelope fluctuation of the SSB-CPM signal is controlled and minimal, for example, between 1.2 and 1.8, and this is controllable by the length of the Hilbert transform filter (the more terms in the Hilbert transform filter, the higher the PAPR).

Various SSB-CPM signal types can be formed using equations (8), (9), and (15)-(18). For example, if minimum shift keying (MSK) is applied in equation (9), then the resulting signal is called an SSB-MSK signal. If Gaussian minimum shift keying (GMSK) is applied in equation (9), then the resulting signal is called an SSB-GMSK signal. If continuous phase frequency shift keying (CPFSK) is applied in equation (9), then the resulting signal is called an SSB-CPFSK signal. For further details about different types and classes of CPM signals that can be formed using equation (9), see J. G. Proakis, Digital Communication, $4^{th}$ Ed., pages 185-202, and other prior art references cited in the IDS herewith.

It is also contemplated that the SSB-CPM signal mapping technique described above can be directly applied to multi-amplitude CPM schemes as are known in the art (See J. G. Proakis, Digital Communication, $4^{th}$ Ed., pages 185-202, esp. 199-202). Care needs to be taken to map the multi-amplitude CPM trellis structure onto a real trellis whereby phase paths of the multi-amplitude CPM trellis are mapped onto amplitude paths in the multi-amplitude SSB-CPM trellis. Examples of how to do this are discussed in connection with FIGS. 9-15 herein below.

It should also be noted that in the case of CPM we actually start with a complex signal in equation (8) and we start with a corresponding real signal in equation (9). While the signal in equation (9) contains all the same information as equation (8), equation (9) does not tell us how to transmit this same information in the same bandwidth as equation (8). That is, if we amplitude-modulated equation (9) directly, we would loose CPM's spectral efficiency implicit in equation (8). In accordance with an aspect the present invention, we do not send equation (9) directly, but instead generate a real-valued function that has the same desirable spectral properties as the CPM signal of equation (8). In this patent application we typically discuss the generation of the real-valued function as a mapping from the complex baseband signal of equation (8) onto a real-valued envelope signal. In reality, we could view the mapping as a mapping of real-valued phase signal (i.e., equation (9)) to a real-valued envelope signal. The intermediate step of equation (8) might be skipped in actual implementations and is only a part of the mathematical derivation and concepts. As we can see, $m(t)=\cos(\alpha(t))$ can be obtained by transforming equation (9) directly. Still, we went through equation (8) to figure out that the spectral properties of this real-valued envelope signal will be the same as the CPM signal of equation (8). It is envisioned that now this type of mapping has been disclosed, that it will be useful to use the idea to directly derive signaling schemes without the need to explicitly form a complex signal such as the signal of equation (8). For example, it is envisioned that real-valued envelope signals will be generated directly from phase functions, as in $m(t)=\cos(\alpha(t))$.

Turning now to FIG. 1, a transmitter structure is shown that is used to generate an SSB-CPM signal or other type similar SSB-bandwidth reduced signal (e.g., multi-amplitude SSB-CPM, or trellis encoded SSB-QPSK, SSB-QAM, etc.). An information sequence, $I_k$, is applied to a baseband trellis modulator 5. Different embodiments of the baseband trellis modulator can generate various forms of CPM, a variety of trellis coded modulation types where information is encoded into trellis paths which can be mapped to real-valued trellis paths, or modulation types whose complex signal constellation points can be transformed to a set of discernable real-valued signal constellation points.

For example, in a preferred embodiment, the baseband trellis modulator 5 can apply equations (8) and (9) to generate an output signal, x(t). The output signal x(t) is then applied to a complex-to-real signal mapper 10. The complex-to-real signal mapper 10 preferably uses a mapping such as the mappings described in connection with equations (10)-(15) to derive a message signal, m(t). Other mappings such as $m(t)=\text{Im}(x(t))$ can be used with equal success, if, for example, specific properties like the bandwidth, continuous phase, and trellis path discernability properties are preserved.

The output of the complex-to-real signal mapper 10 is sent to a Hilbert transformer 15 which generates a Hilbert-transformed message signal $\hat{m}(t)$. The Hilbert transformer may be implemented, for example, using an FIR filter whose impulse response is designed using FIR design software to optimally approximate the Hilbert transform impulse response with a specified number of taps, to merely truncate the infinite impulse response of the Hilbert transform to an appropriate length, or to use other known Hilbert transform implementation techniques. The output of the complex-to-real signal mapper 10 is also routed to a mixer 20 where it is mixed with a carrier signal $\cos(\omega_c t)$ that is generated in an oscillator 30. The output of the oscillator 30 is applied to a phase shifter 32 to generate a quadrature phase carrier signal, $\sin(\omega_c t)$ which is applied to a mixer 25 along with the output of the Hilbert transformer 15. To generate an upper sideband signal, the output of the mixer 20 and the output of the mixer 25 are routed to a summing junction 35 where a subtraction is performed, and the output of this subtraction is provided to a post-processing block 39 to produce s(t) in accordance with equation (19) above. In addition to any amplitude scaling performed in the block 39, the post processing 39 may involve passing the SSB signal through a pulse shaper. The optional post processing pulse shaping may alternatively be performed individually in the I- and Q-channels. To generate the lower sideband, the summing junction 35 performs an addition operation instead of a subtraction. Hence the SSB modulator structure 50 can generate either the upper or lower sideband using equation (18). Also, an amplitude scale factor, A, may be applied to scale the transmitted signal in accordance with equation (18).

It is noted that the SSB modulator 50 can be implemented in various ways. While the structure was defined using a block diagram with discrete components, the same structure could be implemented in an ASIC, or in DSP software, for example. In such cases, a variety of implementation details could be varied in accordance with known methods in the art. For example the oscillator 30 and the phase shifter could be implemented by reading out values from a sine/cosine table in an appropriate sequence. It is noted that in this patent application, any block diagram could be implemented using dedicated hardware with discrete components or components integrated onto a chip, via programmable logic, firmware, software, or the like. For example, in a processor based system, as is well known, a physical structure would involve one or more processors such as DSP processors coupled to one or more memories that hold commands and/or data. Typically, the output of the summing operation 35 or the optional post processor 39 would then be routed to an output device such as a digital-to-analog converter coupled to a wireline connection, to a subsequent up-conversion modulator for wireless transmission, or via appropriate interface circuitry to an antenna. Throughout this application, then, it is to be understood that any of the block diagrams described can be implemented in accordance with such known digital hardware and/or processor/software based implementation techniques.

II. Demodulation of SSB-CPM (Coherent Detection)

When the transmitted upper sideband signal, s(t), of equation (19) is received, it will generally have the form:

$$r(t)=[Am(t)+n_c(t)]\cos(\omega_c t)-[A\hat{m}(t)+n_s(t)]\sin(\omega_c t) \quad (24)$$

where $n_c(t)$ and $n_s(t)$ are in-phase and quadrature-phase noise components, which are modeled as being statistically independent additive white Gaussian noise (AWGN) processes with zero mean and power spectral density $N_0$. The signal r(t) can be demodulated by first recovering an estimate of m(t) and applying that estimated signal to a trellis decoder based on a trellis structure embedded into the real-valued message signal, m(t).

The estimate of m(t) can be obtained by demodulating r(t) using a quadrature receiver structure to produce decision variables from the in-phase and quadrature components, of r(t), given respectively, by:

$$Z_I(t)=Am(t)+n_c(t) \quad (25)$$

$$Z_Q(t)=A\hat{m}(t)+n_s(t). \quad (26)$$

It is known that if $h_k$ is a Hilbert transformer's impulse response, that the inverse Hilbert transform's impulse response, $h_k^{-1}$ is given by $h_k^{-1}=-h_k$. Also, the Hilbert transform is an orthogonal transformation, so that the noise variance of a noise process is unchanged by the Hilbert transform and its inverse. Thus we can inverse Hilbert transform equation (26) to obtain a second independent estimate of m(t). When an inverse Hilbert transform is applied to both sides of equation (26) we obtain:

$$\hat{Z}_Q(t-D)=Am(t-D)+\hat{n}_s(t-D) \quad (27)$$

where D is a group delay associated with the inverse Hilbert transform. This signal corresponds to a delayed estimate of the same signal found on the in-phase branch:

$$Z_1(t-D) = Am(t-D) + n_c(t-D). \tag{28}$$

The independent estimates of equations (27) and (28) can be applied to separate trellis decoders, one augmented trellis decoder, or added together and applied to a single trellis decoder.

In a preferred embodiment, the two message signal estimates of equations (27) and (28) are added together and applied to a single trellis decoder designed to decode the trellis path structure inherent in the signal m(t). Hence in this type of embodiment, the signal used for detection can be written (ignoring the delay D for notational convenience):

$$Z(t) = \frac{(Z_I(t) + \hat{Z}_Q(t))}{2A} = \frac{2Am(t) + (n_c(t) + n_s(t))}{2A} = m(t) + n(t) \tag{29}$$

where n(t) is Gaussian noise with spectral density $N_0/2A^2$. Hence we see that processing the quadrature-phase channel provides a 3 dB gain in performance over recovering the message from the in-phase channel alone using equation (25). The cost of obtaining this 3 dB improvement is the need to compute an inverse Hilbert transform in the receiver and the presence of the delay, D, added to the processing chain as per equations (27) and (28).

If the noise margin permits, an alternative preferred embodiment estimates m(t) directly from equation (25). In this case the demodulated in-phase signal is applied directly to the trellis decoder. In such embodiments, we alter equation (29) to become $Z(t)=(Am(t)+n_c(t))/A$. Looking only at the recovered m(t) signal on the cosine channel of equation (25), the noise is $n(t)=n_c(t)/A$, with a noise power of $N_0/A^2$. This embodiment eliminates the inverse-Hilbert transform processing of equation (27) and the associated delay, D, but with a 3 dB cost in BER performance.

Figure 2:
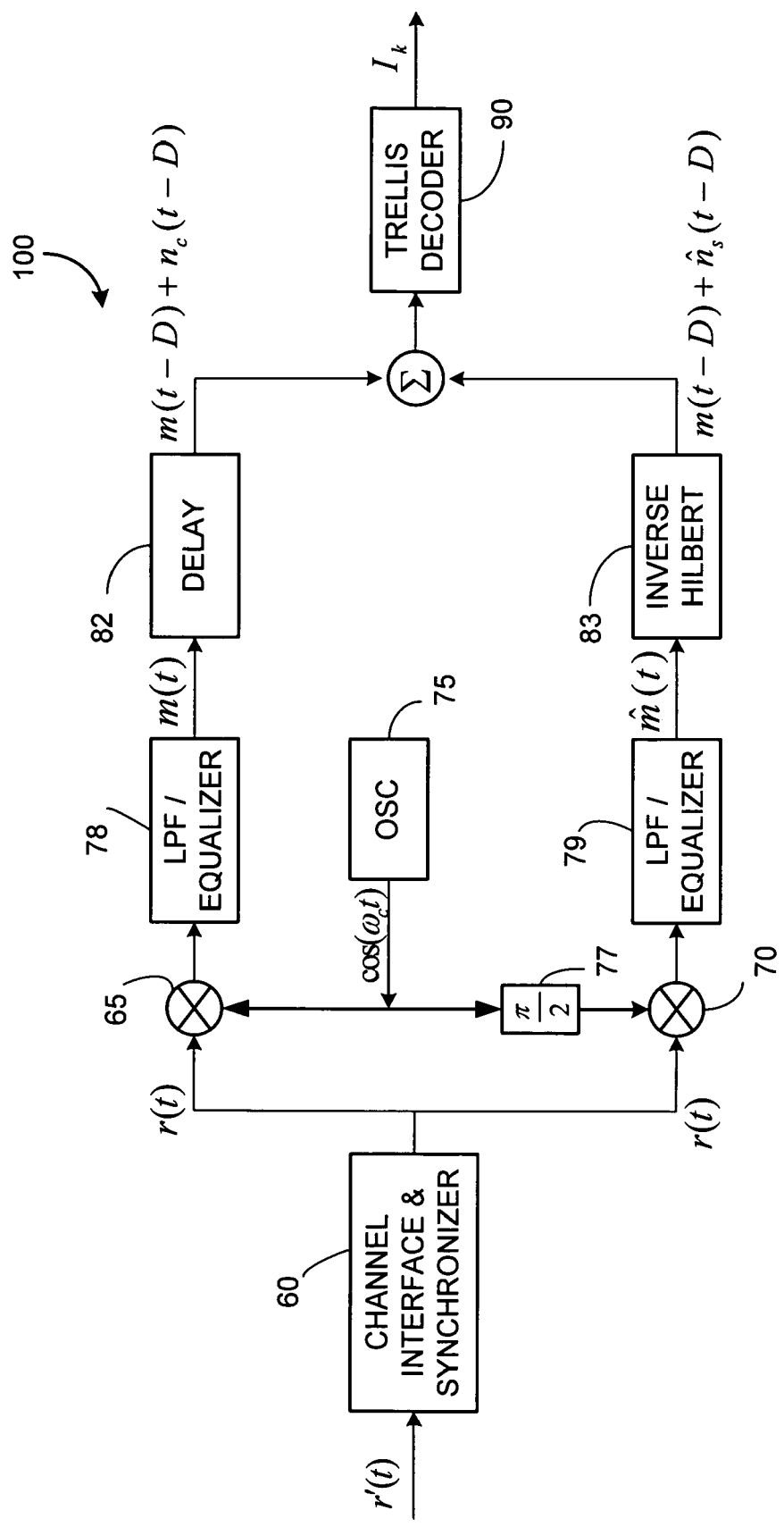
FIG. 2 is a block diagram representing a trellis-based SSB-FM demodulator structure (SSB-CPM, SSB-QAM, multi-amplitude SSB-CPM, etc.)

Turning now to FIG. 2, a receiver structure 100 for receiving SSB-CPM (and other similar types of trellis based SSB modulation schemes) is shown. The received signal, r(t), modeled according to equation (24), is received from a channel. The received signal is typically amplified and digitized in a channel interface and synchronizer 60. In some cases the channel interface and synchronizer 60 also down-converts the received signal from a radio frequency to an intermediate frequency and applies applicable pre-filtering prior to digitization. In some embodiments the digitization operation can be moved down stream in the signal path to any specified point, but in a preferred embodiment, the digitization is performed at the channel interface and synchronizer 60.

The synchronizer aspect of the channel interface and synchronizer 60 performs carrier recovery, symbol timing recovery, and optionally, channel equalization. These aspects of the invention are discussed herein below in connection with FIGS. 18-21.

The output of the channel interface and synchronizer 60 is next applied to a pair of mixers 65, 70, which respectively apply a pair of recovered carrier signals, $\cos(\omega_c t)$, $\sin(\omega_c t)$, generated from a carrier-locked oscillator 75 and phase shifter 77. The carrier locking is preformed with the assistance of the synchronizer portion of block 60. The outputs of the mixers 65, 70 are applied to respective low pass filters (LPFs) 78, 79. The coefficients of the low pass filters can be scaled so that the output signal is properly scaled for subsequent trellis decoding. Optionally, the coefficients of the low pass filters 78, 79 can be trained using adaptive signal processing algorithms as discussed in further detail in connection with FIG. 21. The output of the mixer 78 is applied to a delay circuit 82 while the output of the mixer 79 is applied to an inverse Hilbert transformer 83. The inverse Hilbert transformer can be implemented as an FIR filter. Alternatively, it could be implemented using reduced-delay types of Hilbert transform structures (e.g., see U.S. Pat. No. 6,667,760 (incorporated herein by reference) at block 24 of FIG. 1 and blocks 241-248 of FIG. 2). The length of the delay 82 is preferably matched to the group delay of Hilbert transformer 83.

In a preferred embodiment, the output of the delay element 82 and the output of the Inverse Hilbert transformer 83 are summed in a summing junction 85. This corresponds to adding equations (27) and (28). In this way, the two independent message signal estimates add coherently, while the corresponding noise components add incoherently. The output of the adder 85 is applied to a trellis decoder 90. The output of the trellis decoder 90 is the recovered information sequence, $I_k$. In accordance with the aforementioned alternative preferred embodiment, if the noise margin permits, the delay circuit 82, the quadrature signal path (70, 79, 83) and the adder 85 may be eliminated, but with a 3 dB degradation in BER performance.

III. Trellis Decoder Methods and Structures

A maximum likelihood decoder can be constructed to decode m(t) by applying the Viterbi decoding algorithm. Equation (9) imposes a state-memory structure onto the phase signal α(t). This memory structure gets embedded into the signal x(t) via equation (8) and is transformed to a corresponding memory structure in the signal of m(t) through the transformation of equation (15). As is known in the art, the memory structure introduced by equation (9) may be viewed using a phase trellis diagram.

A Viterbi decoder is a structure that performs Maximum Likelihood Sequence Detection (MLSD) and is optimal when the noise processes in the receiver structure are additive white Gaussian noise. When correlated noise is present, equalization, prewhitening, and/or and noise cancellation preprocessing can be employed to move the noise component in equation (29) as close as possible to being additive white Gaussian noise. The Viterbi decoder, as is known in the art, makes use of a trellis pruning algorithm that keeps track of most likely observed sequences and throws away less likely sequences.

Figure 3:
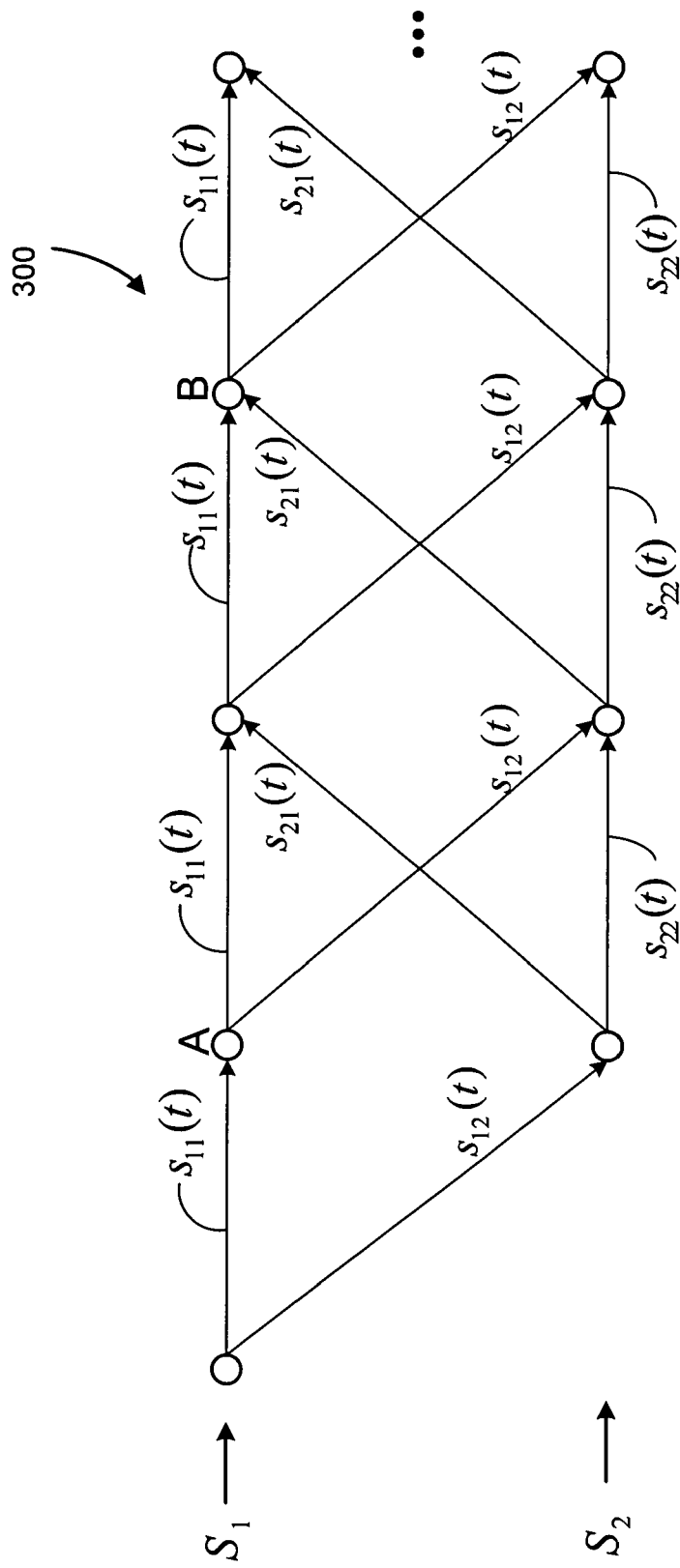
FIG. 3 is a trellis state diagram illustrating a two-state trellis.

FIG. 3 depicts an exemplary trellis diagram depicting a two-state trellis structure imposed onto m(t) by equations (8), (9) and (15) for the case of MSK signaling. The trellis has two states, labeled $S_1$ and $S_2$. Suppose at a time interval k, we start in state $S_1$ as depicted as the upper-left node in FIG. 3. Then depending on the binary information bit in the information sequence, $I_k$, one of two possible transition signals, $s_{11}(t)$ and $s_{12}(t)$ are sent, indicating to the trellis decoder in the receiver whether the trellis state is to transition, respectively, back to state $S_1$ or to state $S_2$. Likewise, if the trellis state is currently at $S_2$, then depending on the binary information bit in the information sequence, $I_k$, one of two possible transition signals, $s_{21}(t)$ and $s_{22}(t)$ are sent, indicating to the trellis decoder in the receiver whether the trellis state is to shift to state $S_1$ or to stay at state $S_2$.

Consider the points A and B in FIG. 3. Suppose the current state in the transmitter is state $S_1$ at point A, and the information bits to be transmitted are {−1 −1}. Then the trellis transitions via path {$s_{11}(t)$, $s_{11}(t)$} to point B. Again starting at point A, suppose that the information bits {1, −1} were to be transmitted. In this case, the trellis state transitions via path {$s_{12}(t), s_{21}(t)$}, again to point B. Because these two paths both started at point A and merged back together at point B, their merging at point B is called a "merge event." We see in this trellis that paths merge every two symbol intervals. Bit error rate performance is determined by the minimum distance between merging paths in the trellis structure.

Next consider the problem of decoding a received signal that is known to have a memory structure that can be modeled via a trellis structure. Specifically, in FIG. 3, assume for now that the state A is already known to the receiver and the receiver needs to determine which sequence, {−1, −1}, {−1, 1}, {1, −1}, or {1, 1} were transmitted. To the receiver, the problem is to determine, respectively, which sequences is most likely given the received signal. Inspection of the trellis diagram shows that only certain paths are possible given a previous state of the trellis. For example, if the state at point A were $S_1$, then paths to state $S_1$ at point B could only be {$s_{11}(t), s_{11}(t)$} or {$s_{12}(t), s_{21}(t)$}. On the other hand, if the state at point A were $S_2$, then the only possible paths to state $S_1$ at point B are {$s_{21}(t), s_{11}(t)$} or {$S_{22}(t), S_{21}(t)$}.

The Viterbi algorithm evaluates the different paths at each merge event, prunes the less likely paths, and retains only the most likely path leading into each state. The paths that are retained after such pruning are called "survival paths." While the most recent intervals will still include multiple survival paths, states further back in the trellis will only have a single surviving possibility, so that a delayed decision can be made.

Figure 4:
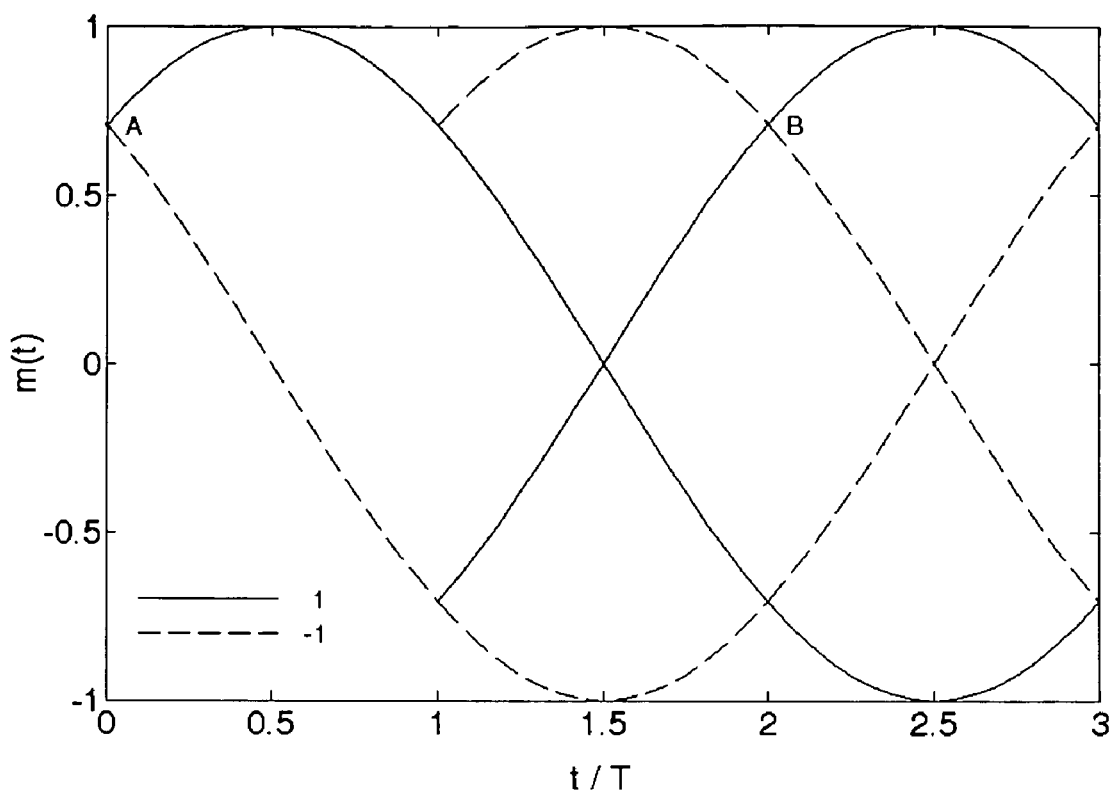
FIG. 4 is a trellis state diagram used to describe the embedded trellis structure of the real-valued message signal m(t) for the specific case of CPM-MSK signaling.

For the case of MSK signaling, FIG. 4 is a signal diagram illustrating the signal m(t) in terms of its embedded trellis structure imposed by equations (9), (8) and (15). The signal m(t) is a real-valued envelope signal that smoothly transitions between different states, using the same trellis structure as depicted in FIG. 3. A set of transition signals, $m_{11}(t)$, $m_{12}(t)$, $m_{21}(t)$ and $m_{22}(t)$ can be defined as the signal values of m(t) between symbol instants (times kT) in FIG. 4. The transition signals, $m_{11}(t)$, $m_{12}(t)$, $m_{21}(t)$ and $m_{22}(t)$, correspond logically to the state transition signals $s_{11}(t)$, $s_{12}(t)$, $s_{21}(t)$ and $s_{22}(t)$ in FIG. 3. To help understand the similarity between FIG. 3 and FIG. 4, the pair of reference points A and B used in FIG. 3 have been inserted into FIG. 4 and the transition signals use corresponding subscripts.

To begin decoding, the Viterbi decoder correlates the received with the possible transitions that can occur during the current interval, $kT \leq t < (k+1)T$. That is, in the exemplary trellis of FIG. 4, the processed received signal, Z(t) is compared with each possible transition signals to a set of compute branch metrics according to:

$$B_{11}(k) = \int_{kT}^{(k+1)T} [Z(t) - m_{11}(t)]^2 dt \quad (30)$$

$$B_{12}(k) = \int_{kT}^{(k+1)T} [Z(t) - m_{12}(t)]^2 dt$$

$$B_{21}(k) = \int_{kT}^{(k+1)T} [Z(t) - m_{21}(t)]^2 dt$$

$$B_{22}(k) = \int_{kT}^{(k+1)T} [Z(t) - m_{22}(t)]^2 dt.$$

It should be understood throughout this specification that integrals may be computed digitally by calculating sums of a finite number of points. For example, if ten points are available per symbol interval, then the above integrals may be computed by summing the squared distances at these ten sample points. In the limit, the branch metrics might only be computed at one point per symbol interval, for example at the symbol times themselves or at a point of maximal separation between points, such as the (½)kT points half way between the state times, kT, in FIG. 4. This type of embodiment is discussed in connection with FIGS. 18-21 which provide details concerning a carrier recovery loop, a symbol timing recovery loop, and an equalizer. In some embodiments analog or digital filters such as matched filters can be used to compute correlation integrals.

Consider the point A in FIG. 4 and define first and second path metrics respectively leading to states $S_1$ and $S_2$ at t=kT (point A) to be $PM_{S_1}(k)$ and $PM_{S_2}(k)$. At t=(k+1)T, the total path metrics along the two paths arriving at state $S_1$ can be recursively found as 1) [$PM_{S_1}(k)+B_{11}(k)$] along the transition from $S_1$ to $S_1$ and 2) [$PM_{S_2}(k)+B_{21}(k)$] along the transition from $S_2$ to $S_1$. The "survival path" at state $S_1$ at t=(k+1)T is selected by selecting the path with the lower path metric leading into that state. For example, if [$PM_{S_1}(k)+B_{11}(k)$]< [$PM_{S_2}(k)+B_{21}(k)$], the Viterbi decoder appends the state transition $S_1 \rightarrow S_1$ to the end of a survival path data structure and updates the survival path metric according to $PM_{S_1}(k+1)=PM_{S_1}(k)+B_{11}(k)$. The Viterbi decoder then discards the entire path containing the transition from $S_2$ to $S_1$.

If, on the other hand, [$PM_{S_1}(k)+B_{11}(k)$]>[$PM_{S_2}(k)+B_{21}(k)$], then the Viterbi decoder appends state transition $S_2 \rightarrow S_1$ to the end of a survival path data structure and updates the survival path metric according to $PM_{S_1}(k+1)=PM_{S_2}(k)+B_{21}(k)$. In this case the Viterbi decoder discards the entire path containing the transition from $S_1$ to $S_1$.

At time t=(k+1)T second survival path is similarly selected between the two possible merging paths leading into state $S_2$. This process is continued at the end of every symbol interval. The process of discarding paths with higher path metrics will cause certain states several symbol intervals earlier in the surviving trellis paths to be the only surviving state left, and thus delayed decisions can be made.

The complexity of the Viterbi decoder can be reduced by truncating the trellis to L intervals back in time. Symbol decisions are made a fixed number of intervals back in time by selecting the transition on the more likely path, even if there are competing survivors. While this simplification increases the error probability, it is known that if L is greater than a quantity called the "path memory length," the increase in error probability is not significant. The path memory length is the minimum number of intervals required to ensure that the distance between any two paths, merged or unmerged, is less than the minimum distance of the signals. Hence it is to be recognized that any such modifications and simplifications to the Viterbi algorithm may be applied for use with the present invention (e.g., reduced state Viterbi Algorithm, etc.).

For the specific example where the SSB-CPM signals correspond to SSB-MSK signals, we can apply the Viterbi algorithm to the trellis of FIG. 4. FIG. 4 shows a trellis with two states corresponding to $$S_1 = \left\{m(t) = \frac{1}{\sqrt{2}}\right\} \text{ and } S_2 = \left\{m(t) = -\frac{1}{\sqrt{2}}\right\}.$$

The transition signals are given by $$m_{11}(t) = \cos\left(\frac{\pi t}{2T} + \frac{3\pi}{4}\right);$$

$$m_{12}(t) = \cos\left(\frac{\pi t}{2T} - \frac{3\pi}{4}\right)$$

-continued $$m_{21}(t) = \cos\left(\frac{\pi t}{2T} + \frac{\pi}{4}\right) \text{ and};$$

$$m_{22}(t) = \cos\left(\frac{\pi t}{2T} - \frac{\pi}{4}\right).$$

The processed receiver signal, Z(t) is then compared against the transition signals as discussed above. In the embodiment where the inverse Hilbert processing in the quadrature-phase channel is not computed, the branch metric calculations can optionally be moved from baseband to passband by multiplying the transition signals by the cosine carrier in the branch metric calculations.

In general, the branch metric for the state transition from state $S_u$ to state $S_v$, using the transition signal $m_{uv}(t)$ can be calculated using the decision variable Z(t) during the interval (kT≦t<(k+1)T) by taking the squared Euclidean distance between the processed received signal, Z(t), and the transition signal $m_{uv}(t)$:

$$B'(S_u, S_v) = \int_{iT}^{(i+1)T} [Z(t) - m_{uv}(t)]^2 dt \qquad (31)$$

$$= \int_{iT}^{(i+1)T} Z^2(t)dt - 2\int_{iT}^{(i+1)T} Z(t)m_{uv}(t)dt +$$

$$\int_{iT}^{(i+1)T} m_{uv}^2(t)dt.$$

Since the first term in (31) is common to all paths it can be dropped from the metric. The last term, which is the energy of the signal $m_{uv}(t)$, i.e., $E_{uv}$, does not depend on the received signal and can be pre-calculated and stored for different signals at the receiver. The middle term, $\Psi_{uv}(k)$, is a correlation of Z(t) with a stored signal $m_{uv}(t)$. A simplified branch metric for the state transition from state $S_u$ to state $S_v$ during the interval kT≦t<(k+1)T may thus be written:

$$B_{uv}(k) = \int_{iT}^{(i+1)T} m_{uv}^2(t)dt - 2\int_{iT}^{(i+1)T} Z(t)m_{uv}(t)dt \qquad (32)$$

$$= E_{uv} - \Psi_{uv}(k)$$

where $E_{uv}$ and $\Psi_{uv}(k)$ are shorthand for the integral values in equation (32) or approximations thereof.

In a preferred embodiment, the decoder 90 computes the correlations $\Psi_{uv}(k)$ subtracts them from the constants $E_{uv}$ for each possible state transition $S_u \rightarrow S_v$. The decoder can be constructed to use the Viterbi algorithm as described above to retain the most likely paths as survival paths and to discard the less likely paths. In some embodiments the correlations $\Psi_{uv}(k)$ and/or the branch metrics $B_{uv}(k)$ may be computed outside the decoder 90 because these quantities may be used by other receiver elements as well, for example, by the synchronizer in the block 60. Similar results may be achieved using alternative embodiments that compute other quantities such as branch metrics based on transformed signals or discrete approximations of the branch metrics of equations (30)-(32). In the limit, a single point such as one taken halfway between state times, i.e., at times (½)kT in FIG. 4 could be used in some embodiments to simplify the receiver design to only require on point to be processed per sample and to use this point as a branch in a Viterbi algorithm. This is an artifact of the fact that, due to the inventive mapping and processing disclosed herein, the signal in FIG. 4 behaves like a trellis-encoded binary PAM signal and can therefore be processed using reduced cost receiver techniques.

Figure 5:
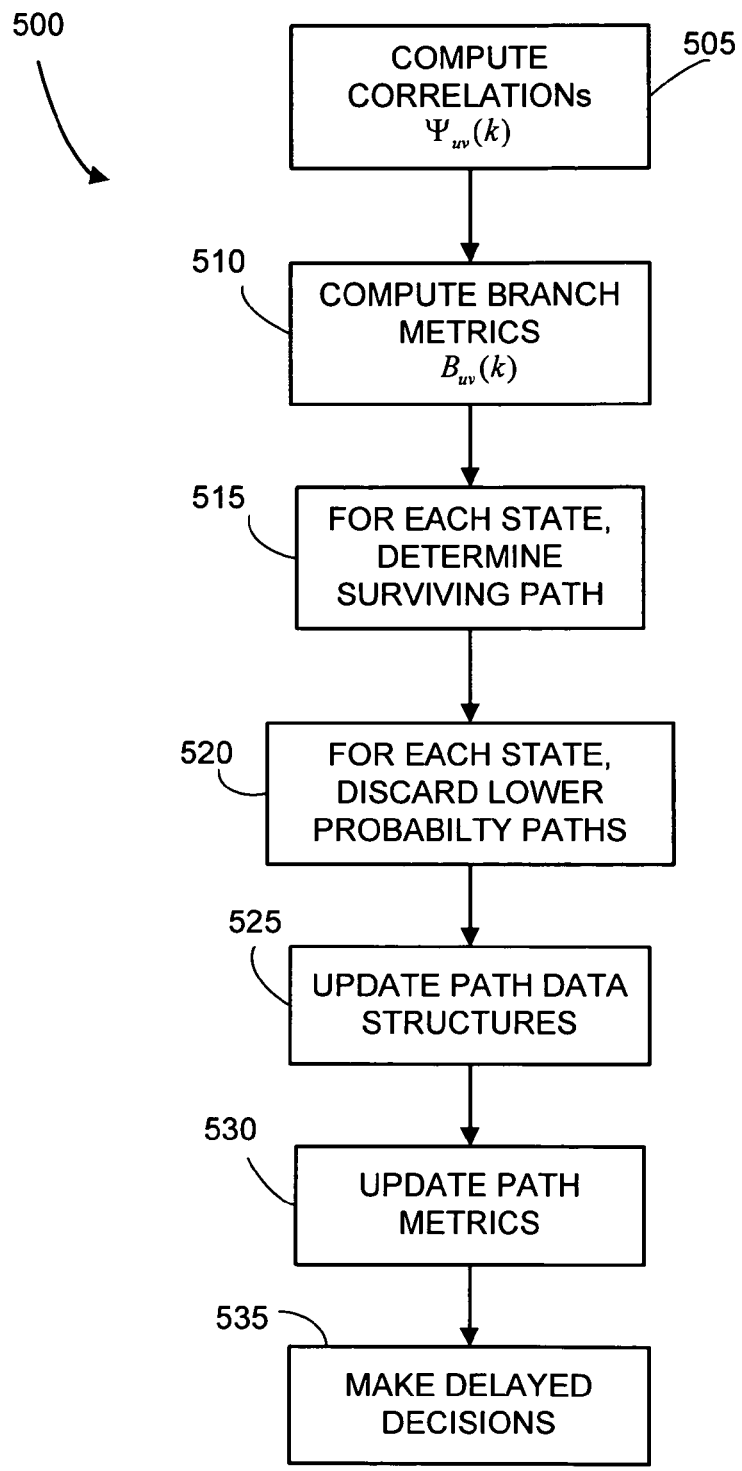
FIG. 5 is a flow chart representing the operation of the trellis decoder 90 of FIG. 2.

Referring now to FIG. 5, a flow chart is provided to show the actions taken in a preferred embodiment of the Viterbi decoder block 90. At block 505 the correlation terms $\Psi_{uv}(k)$ are computed to compare the processed received signal Z(t) to each of the transition signals $m_{uv}(t)$. At block 510 the subtraction $E_{uv} - \Psi_{uv}(k)$ is computed in accordance with equation (32). At block 515, for each trellis state, the appropriate branch metric is added to each candidate incoming trellis path metric and a survival path is determined as the path with the lowest path metric. At block 520 all paths that are not survival paths are discarded. At block 530, portions of the path data structure that keep track of the survival paths are updated, and at block 535 the path metrics for the survival paths are updated. At block 535, delayed symbol decisions are made, for example, L symbol periods back, or once no competing paths offer alternative possibilities.

It is noted that many variations on the exact ordering of the blocks 505 to 535 can be implemented, and various blocks can be merged. Other modifications can be made to save steps by making approximations, using soft decisions, reduced-state designs, combined trellis decoders that also jointly compensate for channel ISI (intersymbol interference), and the like. Similarly, alternative branch metrics may be defined (e.g., using log-likelihood manipulations, or using equalizers and demodulating trellis coded PAM based on samples taken, for example, at times (½)kT in FIG. 4. In some cases branch metrics can be defined so that larger branch metrics and path metrics correspond to the most likely or minimum mean square error path, for example. In such cases the survival path has the larger branch metric. Hence it is to be understood that all such alternative embodiments and other similar variations are in the scope and spirit of the present invention.

IV. Bit Error Rate Performance Analysis of SSB-CPM

It is known that the probability of error of trellis based signaling scheme depends on the distance between the paths, and the asymptotic bit error probability $P_{be}$ is determined by the minimum Euclidean distance:

$$P_{be} \approx kQ\left(\sqrt{d_{min}^2 \frac{E_b}{N_0}}\right) \qquad (33)$$

where $E_b$ is the energy in a bit, $d_{min}$ is the normalized minimum distance, k is the average number of merging events with minimum distance that a bit is associated with, and Q(•) is the standard Q-function. Similarly, the performance of the proposed SSB-CPM signals also depend on the distance, but, in contrast to ordinary CPM signals, these distances are measured in terms of the real-valued signal, m(t), as opposed to the phase trellis of x(t).

Consider the performance of SSB-MSK signals whose trellis signal diagram is shown in FIG. 4. This trellis diagram was generated in accordance with equation (9) with β=−π/4. In order to find the minimum distance, we find the squared distance between the two signals of a merging event during the first and the last intervals. Since the shortest merging event is of length 2, the contributions from the first and the last intervals determine the minimum distance. Considering the two paths that originate and end at α(t)=−π/4 (starting at point A and re-merging at point B in FIG. 4) corresponding to message sequences (+1, +1) and (−1, +1) the squared distance between the paths of the merging event can be found by taking twice the distance between the signals during the first interval is $$D^2 = 2\int_0^T \left\{\left[\cos\left(\frac{\pi t}{2T} - \frac{\pi}{4}\right)\right] - \left[\cos\left(-\frac{\pi t}{2T} - \frac{\pi}{4}\right)\right]\right\}^2 dt \quad (34)$$

$$= 4\int_0^T \sin^2\left(\frac{\pi t}{2T}\right)dt = 2T.$$

It can be similarly found that the merging events that originate from other values of $\alpha(t) = \{\pi/2, \pi, 3\pi/2\}$ also generate the same distance. Hence, the minimum squared distance of SSB-MSK signals is $D_{min}^2 = 2T$. The event error probability corresponding to the above merging event follows from the distance as $$P_e = Q\left(\frac{D_{min}}{2\sigma}\right), \sigma^2 = \frac{N_0}{2A^2} \quad (35)$$

$$P_e = Q\left(\sqrt{\frac{A^2 T}{N_0}}\right).$$

For SSB-MSK signals, since $\overline{m(t)} = \frac{1}{2}$, so the average energy per bit in equation (23) is given by $E_{avg} = E_{b,avg} = A^2 T/2$, where $E_{b,avg}$ is the average energy per bit.

Observing that k=1 for SSB-MSK (and also for ordinary MSK), the bit error probability at high signal to noise ratios (SNR), can therefore be approximately written following (33) as $$P_{be} \approx Q\left(\sqrt{\frac{2E_{b,avg}}{N_0}}\right) \quad (36)$$

which is the same as traditional MSK, but in half the bandwidth. As previously discussed, if the noise margin permits, the $\hat{m}(t)$ signal may be discarded to reduce receiver complexity and to eliminate the delay associated with the inverse Hilbert transform in the receiver. The amount of noise margin that will be lost via this simplification is 3 db of bit error rate performance. Hence in the low-cost/low-delay version of the receiver, the bandwidth is halved with a modest reduction of 3 db on bit error rate performance. It is also observed that, like regular MSK, the signals transmitted for +1 and −1 from any state are orthogonal to each other.

To understand how SSB-CPM compares to regular CPM, compare it to an ordinary CPFSK modulation whose modulation index is determined to send the same information sequence as DSB-MSK system, but in half the bandwidth. Using the 99% bandwidth, the normalized bandwidth of MSK is $B_{99}T=1.18$. A modulation index of h=0.15 would be needed to define a CPFSK signal whose normalized bandwidth is halved, i.e., $B_{99}T=1.18/2=0.59$. The normalized minimum distance of this CPFSK signal with h=0.15 is $d_{min}^2 = 2[1 - \{\sin(2\pi h)\}/(2\pi h)] = 0.283$. Meanwhile, $d_{min}^2$ for MSK is 2.0. Thus the low-cost/low-delay SSB-MSK scheme that only processes the in-phase component performs 5.5 dB better than the bandwidth-equivalent CPFSK scheme with h=0.15. Moreover, the full SSB-MSK implementation that processes the inverse Hilbert transform in the quadrature phase channel performs 8.5 dB better than the same bandwidth-equivalent CPFSK scheme.

V. Double Date Rate (DDR) SSB-CPM

Compared to prior art CPM, the SSB-CPM techniques of the present invention can be used to send the same amount of data in half the bandwidth, or alternatively, to send double the data in the same bandwidth.

A first way to transmit at a double data rate in a fixed bandwidth using SSB-CPM is to start with a double-data-rate signal $x_{DDR}(t)$ of the form of equation (8) that has been modulated with a double-data-rate sequence and a double bandwidth pulse shape g(t) in equation (9). That is, we start with a DSB-CPM baseband signal that has double the data rate and double the bandwidth as compared to a single data rate signal x(t). Next SSB-CPM processing is applied to generate $m_{DDR}(t)$, and to map it to a carrier according to equation (18) so that it occupies the same bandwidth as needed to send a single-data-rate DSB-CPM signal that carries half the amount of information. That is, the SSB-CPM modulation of the present invention can be used to send double the data rate in the same bandwidth as occupied by a DSB-CPM signal. To create a DDR SSB-CPM signal, we define the DSB-CPM signal in equations (8) and (9) to carry double the data rate in double the bandwidth, knowing that the needed transmission bandwidth will be cut in half later when $x_{DDR}(t)$ is mapped onto an SSB-CPM signal.

In a second type of embodiment, we start with two single-data-rate baseband CPM waveforms of the form of equation (8), i.e., $x_1(t)$, $x_2(t)$, and map them to two real-valued envelope signals, $m_1(t)$, $m_2(t)$ in accordance with equation (15) (or any of equations (10)-(15), or any other suitably selected complex to real transform). Next we map $m_1(t)$ to a lower sideband signal and $m_2(t)$ to an upper sideband signal in accordance with the upper/lower sideband variations of equation (18). The resulting upper and lower and lower sideband signals are then added together and transmitted in the same bandwidth as required to send one signal of the form of equation (8). The receiver structure to demodulate this type of signal can use a band-split filter to separate the upper and lower sideband signals. After isolation via frequency demultiplexing, the upper- and lower-sideband SSB-CPM signals can be demodulated individually using the SSB-CPM demodulation techniques disclosed herein.

This second embodiment may be advantageous if it is desired to keep the two information sequences separate. For example, we may want to keep two user's signals separate in a frequency multiplexed type communication system, or we may want to decorrelate errors, for example to send an information bearing signal in the upper sideband and associated forward error correction codes (e.g., parity bits of a block, convolutional, or turbo code) in the lower side band. Similarly, we may wish to apply separate FEC in the upper and lower sidebands so that errors made in either channel do not affect or otherwise influence the FEC in the other channel. For example, if each of the upper and lower sideband channels use respective trellis coders, an error in the upper sideband channel will not affect path metric calculations in the lower sideband channel. Likewise, if a Reed-Solomon code is used in each of the upper and lower sideband channels, errors in the upper sideband channel will not count toward the correctable error budget of the lower sideband channel.

The present invention contemplates that some of the added bandwidth supported by the modulation scheme may be used for FEC parity bits to provide further dB needed to obtain a desired noise margin on a particular channel. In an aspect of the present invention, a handshake sequence may be used whereby probing signals are sent, performance is analyzed, and the transmitter and receiver agree upon a particular amount of FEC coding needed for a particular connection. In some embodiments a framing structure is used to send training signals and/or FEC decoder error rates are detected during normal data transmission operation, so that the amount of FEC coding needed can be adaptively adjusted during normal channel use to maintain a given level of performance or noise margin. As discussed below, beside regular FEC channel coding, trellis coded modulation schemes may be employed in addition to or instead of FEC channel coding. The basic idea is to use some or all of the additional bandwidth afforded by the SSB-FM processing to accommodate FEC bits to thereby trade away some or all of the extra bandwidth for BER performance.

Another advantage of the second embodiment is that data rate and the pulse width used in equation (9) for each of the upper and lower sidebands is the same as in a single-data-rate scheme. That is, frequency division multiplexing of the upper and lower sidebands is a two-channel form of orthogonal frequency division multiplexing. This lowers the data rate in each channel and reduces the operating frequency (and required MIPS) in each channel. For example, the inverse Hilbert transforms and the computations of the branch metrics can be performed at a lower frequency, thus saving computations.

VI. Quadrature Multiplexed CPM (QM-CPM)

As previously discussed, a trellis signal like the CPM signal x(t) of equation (8) can be mapped to a real-valued envelope signal, m(t), (e.g., using equation (15)). The real-valued envelope signal, m(t), occupies the same bandwidth as x(t), retains the continuous phase property, and represents the phase-trellis memory structure of x(t) in a corresponding amplitude-trellis memory structure. As discussed above, we can map two versions of m(t) to upper and lower sidebands, and send two signals at once in the same bandwidth occupied by the baseband DSB-CPM signal, x(t). However, to do this involves computing Hilbert and inverse Hilbert transforms as well as a band-split filtering operation to separate the upper and lower sideband signals at the receiver. All of these operations introduce side lobes and group delay, so it would be advantageous to consider other ways to achieve a similar result.

Another way two transmit two real-valued envelope signals simultaneously in the same bandwidth is to multiplex them onto a pair of quadrature-phase carriers, cos($\omega_c$t), sin ($\omega_c$t). That is, instead of mapping m(t) and m̂(t) onto the cosine and sine carriers as per FIG. 1, we map two separate information streams encoded onto two real-valued envelope signals, $m_1$(t), $m_2$(t) and then modulate these two real-valued envelope signals onto cosine and sine carriers as per FIG. 6.

Figure 6:
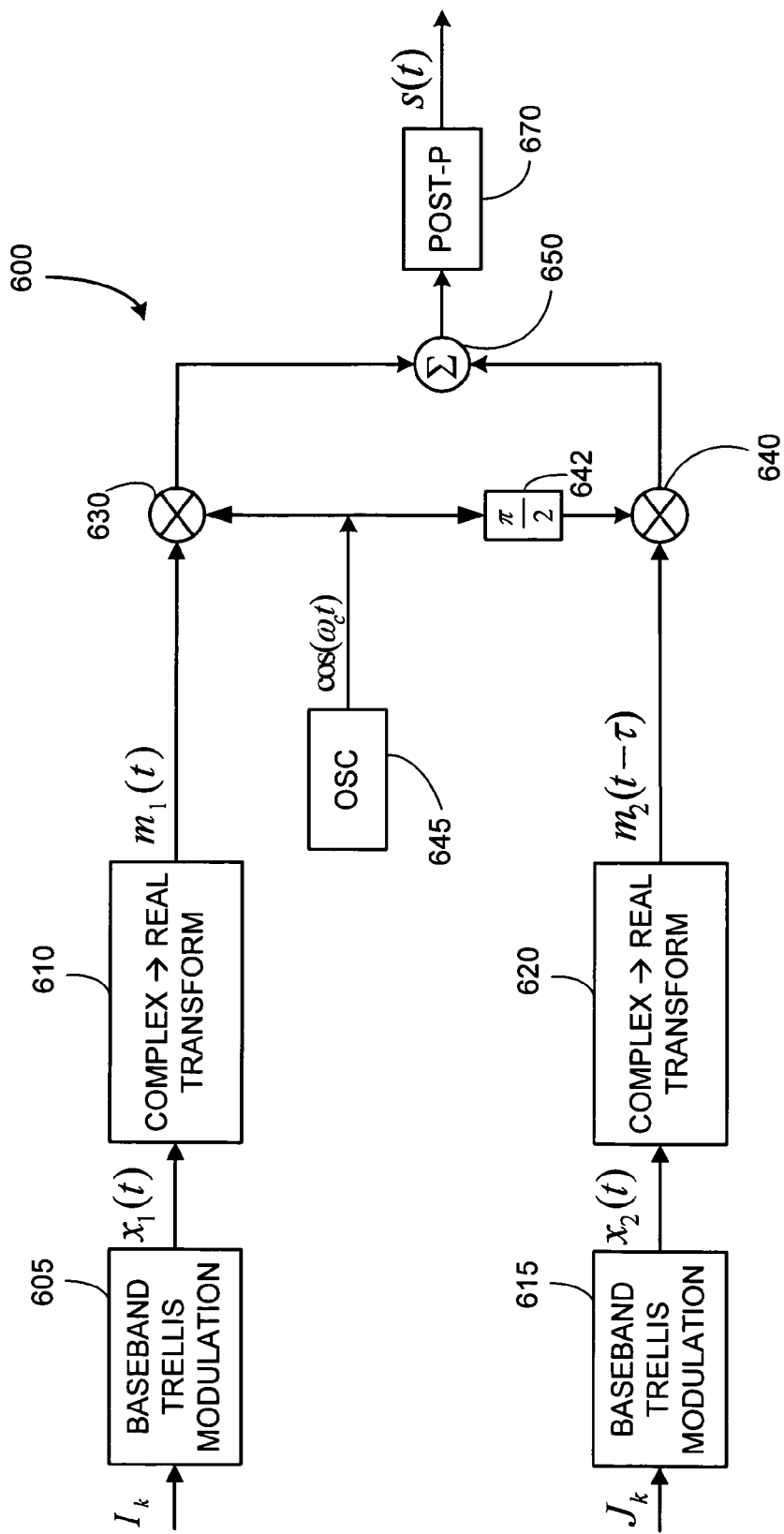
FIG. 6 is a block diagram illustrating a transmitter structure for quadrature-multiplexed CPM (QM-CPM), and similar quadrature-multiplexed SSB-FM signaling schemes, showing how to place two information sequences into the bandwidth occupied by a single corresponding complex-valued signal.

In the embodiment of FIG. 6, two information sequences, $I_k$, $J_k$ are modulated in baseband modulators 605, 615 in accordance, for example, with equations (8) and (9) to generate complex baseband signals $x_1$(t), $x_2$(t). Each of these complex baseband signals are then mapped via complex-to-real transformation blocks 610, 620 to real-valued envelope signals, $m_1$(t), $m_2$(t), for example, in accordance with equation (15). We note that the output of each complex-to-real transformation blocks 610, 620 can in general involve a complex scaling. In an illustrative embodiment, assume both transformations generate the same amplitude scaling, A, and the sine transformation block 620 imparts an optional time-shift, τ. The real-signal outputs of the transforms 610 620 are then respectively modulated onto in-phase and quadrature-phase carriers in mixers 630 and 640. These mixer signals are then added together in summing junction 650 to produce an output signal. This is provided to an optional post processor 670 which applies optional amplitude scaling to produce:

$$s(t)=A[m_1(t)\cos(\omega_c t)+m_2(t-\tau)\sin(\omega_c t)]. \quad (37)$$

where A is a scalar that determines the amplitude of the output signal, and τ is a suitably chosen time-shift. In addition to any amplitude scaling performed in the optional block 670, the post processing may involve passing the output signal through a pulse shaper. The post processing pulse shaping may alternatively be performed individually in the I- and Q-channels, for example, prior to mixing by the mixers 630, 640. In polar form, we can write s(t) as:

$$s(t) = A\sqrt{[m_1^2(t) + m_2^2(t-\tau)]} \cos[\omega_c t + \theta(t)] \quad (38)$$

where $$\theta(t) = \tan^{-1}\left[\frac{-m_2(t-\tau)}{m_1(t)}\right] \quad (39)$$

is the phase variation of s(t). If α(t) in equation (9) is continuous, $m_1$(t) and $m_2$(t) will be continuous, so that θ(t) will also be also continuous. The quadrature multiplexed signal, s(t), has both a time varying envelope and time varying phase. Without loss of generality, to simplify the bit error rate performance analysis we consider here signals generated starting from CPM signals with rectangular baseband phase pulses which include all CPFSK and partial response L-REC signals as are known in the CPM art. We can select the time-shift parameter, τ, to minimize the peak-to-average-power ratio (PAPR). For example, with MSK signaling, we select τ=T/2 and find that the minimum PAPR is 1.707. If in a particular embodiment the time-shift is not desired, it can be set to zero or otherwise eliminated.

For the types of signals mentioned above, we note that $$\overline{m_1^2(t)} = \overline{m_2^2(t-\tau)} = 1/2,$$

so that assuming independent information sequences, $I_k$, $J_k$, the average transmitted power, $P_{avg}$ of s(t) is given by $$P_{avg} = \frac{A^2}{2}\overline{[m_1^2(t) + m_2^2(t-\tau)]} = \frac{A^2}{2} \quad (40)$$

where the overbar denotes the average value over time. This is the same as the original CPM signal with only one information sequence transmitted. Because $m_1$(t) and $m_2$(t) have the same bandwidth as x(t) in equation (8), the transmitted signal s(t) in equation (37) also has the same bandwidth as the DSB-CPM baseband signal of equation (8).

Note that the energy per bit in s(t) is half the average energy per bit as compared to SSB-CPM (two bits transmitted each symbol interval instead of one). See equation (33) and note that this provides the same factor of two (3 dB) improvement we obtained by performing the inverse-Hilbert transform processing to get a redundant estimate of m(t) in the SSB-CPM approach. That is, with QM-CPM we achieve double the data rate of DSB-CPM in the same bandwidth and get the same bit error rate performance as DSB-CPM. The price that is paid is the loss of the constant envelope property, but the PAPR is very modest, i.e., 1.707.

We see that QM-CPM offers the same performance as the full inverse-Hilbert transform embodiment of SSB-CPM, but eliminates the need to compute the inverse Hilbert transform and eliminates the associated delay and any non-ideal behavior of the filter used to implement the inverse Hilbert transform. As we will see, QM-CPM also serves as a basis to develop QAM-like signaling schemes that outperform ordinary QAM by 10 dB or more when compared in the same bandwidth. However, it can also be noted that for any QM-CPM method, a corresponding DDR SSB-CPM technique with the same data rate and bit error rate performance can be derived as previously discussed.

In one type of embodiment like the one shown in FIG. 6, a modulator includes a baseband modulator that modulates an information stream onto first and second real-valued phase functions. A signal mapper then maps the first and second real-valued phase functions onto first and second real-valued envelope signals. An I/Q modulator is then used to quadrature multiplex the first and second real-valued envelope signals respectively onto in-phase and quadrature-phase carrier signals.

In another type of embodiment like the one shown in FIG. 6, a modulator includes a baseband modulator that modulates an information stream onto first and second complex-valued baseband signals. A signal mapper is then used that maps the first and second complex-valued baseband signals onto a first and second real-valued envelope signals. An I/Q modulator is then used to quadrature multiplex the first and second real-valued envelope signals respectively onto in-phase and quadrature-phase carrier signals.

In another type of embodiment like the one shown in FIG. 6, a modulator includes a baseband modulator that modulates an information stream onto first and second real-valued envelope signals. An I/Q modulator is used that modulates the first and second real-valued envelope signals respectively onto in-phase and quadrature-phase carrier signals. The first and second real-valued envelope signals are point-wise related to respective first and second complex-valued baseband signals through a complex-to-real mapping. For example, the first and second complex-valued baseband signals could be TCM-QAM or TCM-PSK signals, the point-wise mapping could be the real-part operator (Re{○}), and the information could be recoverable from the trellis structures of the first and second real-valued envelope signals. This is an example of a SSB-FM signaling scheme where equations (8) and (9) are not needed. Still, CPM signals can be produced by this mapping by interpolating using a chosen interpolation function between signal states (constellation points) in the starting first and second complex-valued baseband signals.

Figure 7:
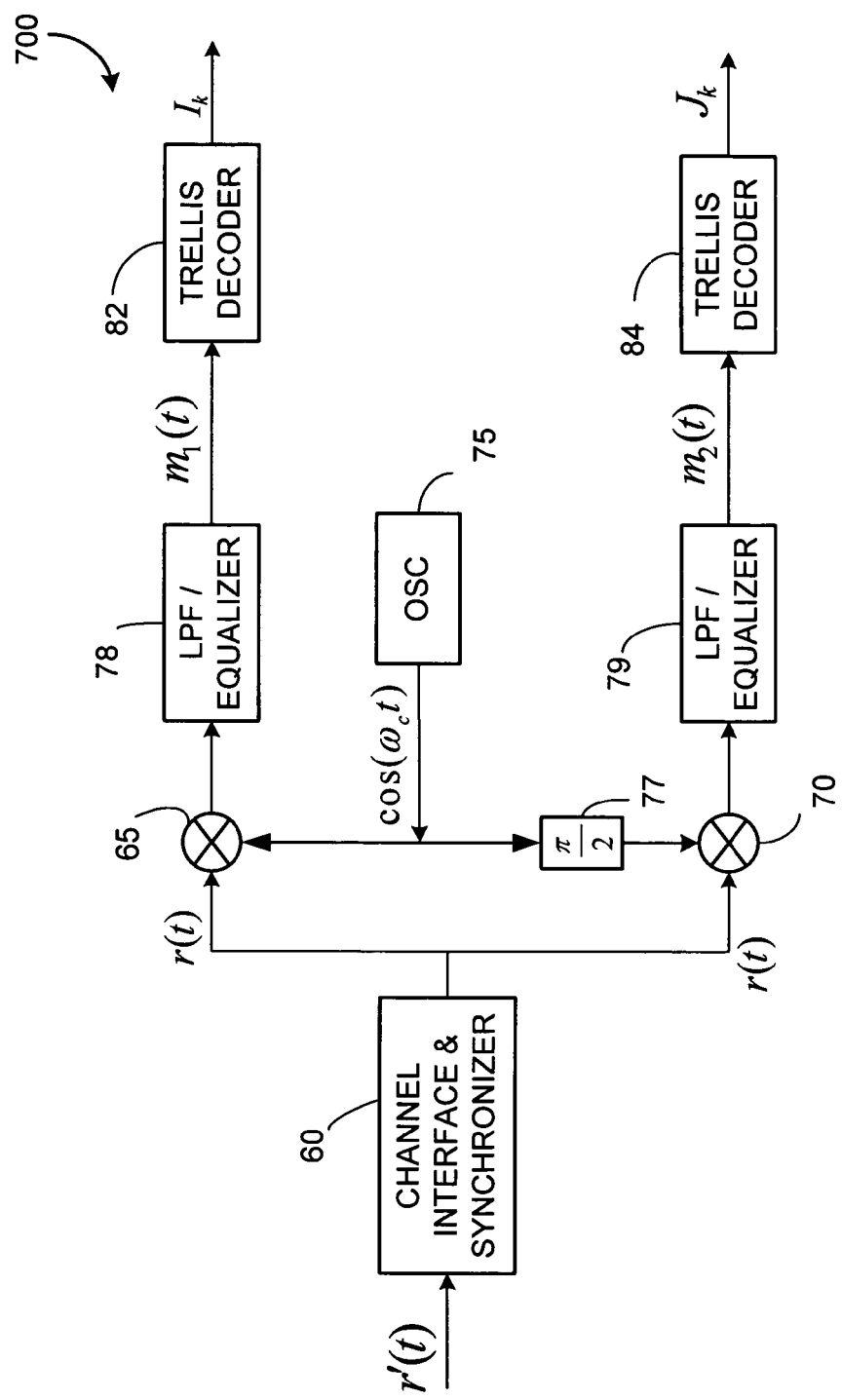
FIG. 7 is a block diagram of a receiver structure used to demodulate a received signal such as the one generated from the transmitter shown in FIG. 6.

FIG. 7 shows an embodiment of a receiver structure similar to the one described in connection with FIG. 2, but designed to demodulate a signal generated in accordance with FIG. 6. Instead of inverse Hilbert transforming in the quadrature-phase channel (70, 79, 83) to obtain a redundant estimate for m(t), instead we demodulate an independent quadrature-phase signal and trellis decode it in trellis decoder 84 to detect the second information sequence, $J_k$.

As previously discussed, some or all of the added bandwidth of the sequence $J_k$ can be traded for performance by sending FEC parity bits to protect $I_k$. For example, convolutional coded parity bits, block code parity bits (e.g., Hamming code bits, Reed-Solomon parity symbols), or turbo code redundancy bits could be sent in the $J_k$ sequence to further improve the bit error rate performance of the overall system. Similarly, such coding could be mixed along with information bits in both the $I_k$ and $J_k$ sequences to improve the bit error rate performance by using some or all of the added bandwidth to carry FEC parity bits. For example, depending on channel quality measurements, an amount of forward error correction coding could be added to support a particular bit rate at a specified coded bit error rate level of performance.

VII. Multi-Amplitude Quadrature-Multiplexed CPM (MQM-CPM)

The SSB-CPM and QM-CPM approaches so far have been used to map one or more constant-envelope baseband signals, x(t), onto one or more real-signals, m(t). The application of SSB-CPM or QM-CPM processing to the one or more real-valued envelope signals produces a non-constant envelope signal, s(t) with a very modest PAPR. In accordance with an aspect of the present invention, we can also modify equation (8) to accommodate more information in the complex baseband signal, x(t), before it is mapped to an SSB-CPM or a QM-CPM waveform.

One way to pack more information into the fixed bandwidth of a CPM baseband signal is to use multi-amplitude signaling. Similar to PAM and QAM systems, where constellations with intermediate to large numbers of points are commonly constructed to pack many bits of information into each transmitted symbol, multi-amplitude CPM schemes are known that use both amplitude and phase information to increase the amount of information per symbol. In accordance with an aspect of the present invention, we start with a selected multi-amplitude CPM scheme (e.g., see Proakis, Digital Communications, 4th Ed., pages 199-202), and then apply SSB-CPM or QM-CPM to respectively modulate one or two of such signals. Some specific examples of this approach are provided below, but it is recognized that this general approach of mapping two multi-amplitude CPM signals onto two real-valued envelope signals and then modulating these two real-valued envelope signals onto I and Q channels can be used to construct a large genus of signaling schemes. Alternatively, a single multi-amplitude baseband signal can be modulated using SSB-CPM as previously discussed to halve the bandwidth or double the data rate, as needed for a particular application.

To better understand the approach, let there be N complex-valued baseband CPM signals generated in accordance with equations (8) and (9). A linear combination of such signals may be written:

$$x_{MA}(t) = \sum_{i=1}^{N} a_i e^{j\alpha_i(t-\tau_i)} \quad (41)$$

$$= \sum_{i=1}^{N} a_i \begin{bmatrix} \cos(\alpha_i(t-\tau_i)) + \\ j\sin(\alpha_i(t-\tau_i)) \end{bmatrix}$$

where $x_{MA}(t)$ is a multi-amplitude, complex-valued CPM baseband signal whose spectrum is the same as each of its component CPM signals. Application of the complex-to-real transform of equation (15) to the above yields:

$$m_{MA}(t) = T\left[\sum_{i=1}^{N} a_i e^{j\alpha_i(t-\tau_i)}\right] \quad (42)$$

$$= \sum_{i=1}^{N} a_i \cos(\alpha_i(t-\tau_i)).$$

In the above expression, $m_{MA}(t)$ is a real-valued envelope signal whose amplitude describes the amplitude-phase trellis of the multi-amplitude baseband signal, $x_{MA}(t)$ of equation (41). Just as PAM can be used to encode more and more bits per dimension, so can equations (41)-(42) be used to pack more and more bits of information onto the time-varying-trellis amplitude structure of $m_{MA}(t)$. Just as two such PAM signals can be quadrature multiplexed to form an $N^2$-point QAM signal constellation, so can two such $m_{MA}(t)$ signals be quadrature multiplexed to form a signaling scheme with $N^2$ possible trellis path combinations. Hence we can mix the bandwidth efficiency of multi-amplitude CPM with complex-to-real transformations and quadrature multiplexing to obtain signaling schemes similar to QAM, except with significantly improved normalized-bandwidth bit error rate performance. As discussed in further detail in connection with FIG. 13, MQM-CPM schemes can provide a 10 dB or more of bit error rate performance gain over QAM in a fixed bandwidth, or can provide about the same or slightly better performance as QAM, but in a much narrower bandwidth.

Multi-amplitude SSB-CPM and MQM-CPM respectively use the same transmitter and receiver structures as the SSB-CPM and QM-CPM as per FIG. 1, FIG. 2, FIG. 6 and FIG. 7. The only difference is the baseband trellis modulation blocks 5, 605, 615 now use equation (42) instead of equation (8). Also, separate copies of equation (9) are used to map a plurality of information sequences, possibly with different phase offsets, $\beta_i$, to the collection of phase trellis signals $\alpha_i(t)$ as used in equation (42).

We note there are a collection of free parameters, i.e., ($\{a_i\}$, $\{\beta_1\}$, $\{\tau_i\}$) that can be varied in equations (9) and (42) that influence the trellis signal $m_{MA}(t)$. Other parameters that can be varied in equation (9) to affect trellis path minimum distance are the pulse shape and the use of full and/or partial response CPM signaling, the parameter h, the use of multi-h and/or multi-T CPM signaling, and/or the use of nonlinear CPM. Other parameters can also be added and manipulated. For example, another parameter that can be added is a constant frequency shift $\omega_d$ that can be added to each phase function $\alpha(t)$. Trellis coded modulation techniques can also be applied to modify the number of constellation points and add in trellis path constraints to increase the minimum distance in the trellis. Any such free parameters and trellis-coding path constraints can be used to generate different trellis-modulated signals with desirable minimum distance properties.

Figure 8:
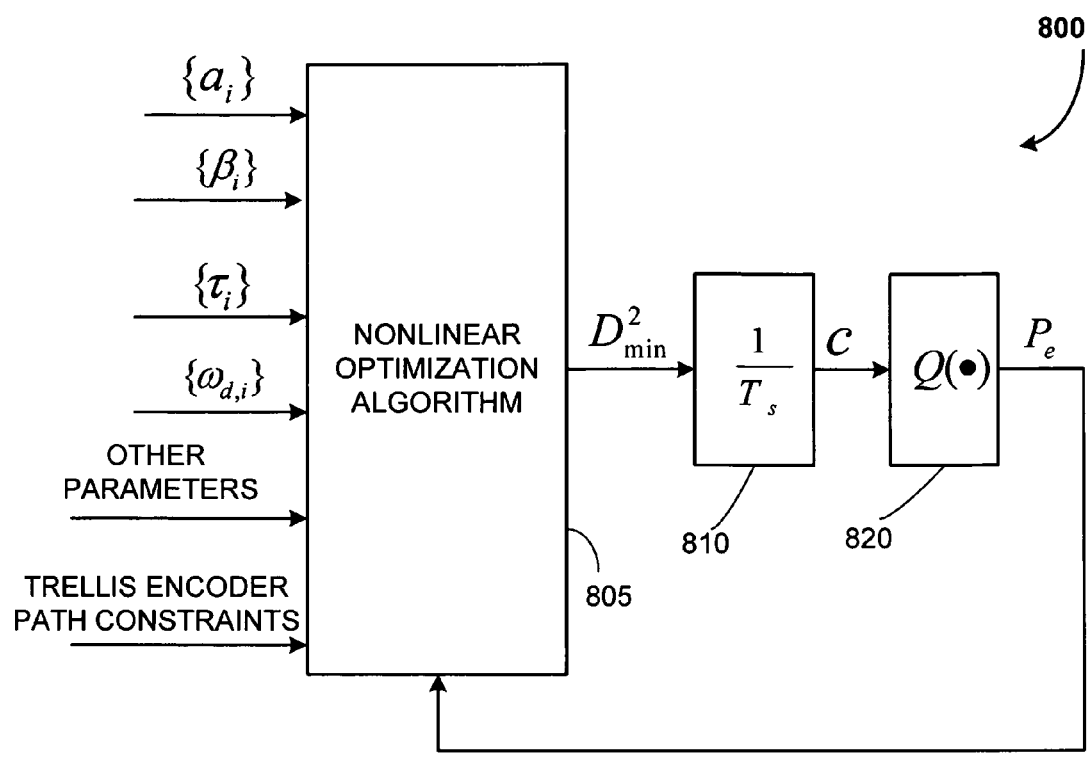
FIG. 8 is a block diagram/flow chart representing a computerized code search strategy used to derive parameter sets that design message signals optimized trellis properties in a transformed message signal.

The free parameters are used as shown in FIG. 8 in order to generate a trellis structure in m(t) or $m_{MA}(t)$ with a maximized normalized distance. This process can be done by hand, or by using software that searches for combinations of the free parameters that generate the real-valued signals m(t) or $m_{MA}(t)$ with desirable spectral and/or minimum distance properties. A nonlinear function can be minimized using software based search algorithms, for example, using nonlinear conjugate gradient searches, the Shanno algorithm, Newton-Raphson searches, neural networks, code-space search algorithms similar to the ones used to find good codes for TCM, and the like. Just as search programs are used to search for good codes to use in trellis coded modulation schemes, in accordance with an aspect of the present invention, similar software-encoded search algorithms can be used to search the set of free parameters mentioned above for good (or optimal) SSB-CPM trellis modulated signaling schemes. Once a good m(t) or $m_{MA}(t)$ has been determined, it may be used in an SSB-CPM signaling scheme or may be quadrature multiplexed to form a respective QM-CPM or MQM-CPM scheme.

The optimization can be performed by hand (and using interactive computer aided tools) to find "good" solutions. A good solution provides a trellis structure in $m_{MA}(t)$ that has a good minimum distance, $D_{min}^2$ in and a good normalized parameter $c=D_{min}^2$ in/$T_s$, where $T_s$ is the symbol interval in $m_{MA}(t)$, because the probability of error, as is derived below in equation (51), is given by:

$$P_e \approx Q\left(\sqrt{\frac{cA^2 T_s}{4N_0}}\right). \tag{43}$$

The embodiment of FIG. 8 preferably searches for a set of free parameters that produce an optimal (or "good") value of $c=D_{min}^2/T$, where $T_s$ is fixed over the search so that the probability of error of equation (43) will be minimized. The software of FIG. 8 can also search for good trellis coded modulation schemes to use to further improve the performance of SSB-CPM and MQM-CPM. The search space is typically constrained to trellis schemes that maintain the spectral properties of the signal of equation (42). As discussed below, in some cases a controlled amount of bandwidth expansion is allowed to achieve an improvement in bit error rate performance.

As shown in FIG. 8, other parameters as discussed above that affect the trellis structure of the message signal may also be added and used in the optimization process. Likewise, additional path constraints may be imposed onto the trellis structure by constructing a trellis coded modulation scheme that obeys a set of path constraints. For example, a convolutional encoder can be used with signal set expansion to limit the allowable transition paths in a trellis that has an expanded set of states and/or a corresponding expanded set of constellation points in the modulation's signal space. Constraints that limit the number of allowable paths are typically used to derive coded trellis structures with increased minimum path distances. A set of trellis coded modulation techniques and structures for use with various types of SSB-FM type signals are discussed in Section VIII below.

While the above preferred embodiments are useful, other embodiments of MCM-CPM or their multi-amplitude SSB counterparts can also be constructed. For example, in equation (8), the constant amplitude, A, can be replaced by an envelope function, A(t). The envelope function can be used to carry information components. For example, a modulator apparatus can be constructed using a baseband modulator that modulates an information stream onto one or more real-valued phase functions and onto one or more real-valued, time-varying amplitude functions, such as A(t). That is, information symbols can be represented similar to a polar-coordinate version of QAM. One or more mapping units then map the one or more real-valued phase functions and the one or more real-valued time-varying amplitude functions onto one or more real-valued baseband signals. For example, if the mapper generates a single real-valued baseband signal, then a Hilbert transformer is used to map the real-valued baseband signal onto a corresponding real-valued Hilbert transform signal. An I/Q modulator can then be used to map the real-valued baseband signal and the Hilbert transform signal onto a single sideband modulated signal (multi-amplitude SSB-CPM type embodiment). Alternatively, if the information stream is modulated onto two independent real-valued baseband signals, then the I/Q modulator can be used to map the two independent real-valued baseband signals onto a modulated signal (MQM-CPM type embodiment).

In the type of embodiment that uses time varying amplitude functions, the spectrum of the real-valued baseband signal is equal to the spectrum of the phase component of the real-valued baseband signal (equation (8)) convolved with the spectrum of A(t). In equation (42), this type of embodiment replaces one or more of the constant values, $a_i$ with respective time-varying functions, $a_i(t)$. The use of time-varying envelope functions provides yet another degree of freedom for use in the optimization problem of FIG. 8. Similarly, the use of time-varying amplitude functions can be used in TCM schemes such as the one discussed in connection with FIG. 17 to periodically interrupt merge events or to implement signal set expansion for TCM signaling.

While this section provides various general structures for developing trellis based modulation techniques that map complex constellations onto real-valued envelope signals and perform trellis decoding on the transformed real-valued envelope signals, we provide several exemplary embodiments to aid in the understanding of the underlying concepts. Three exemplary embodiments are provided in this section together with performance comparisons to help understand how the new modulation techniques compare with CPM and QAM. A fourth example is provided in Section VIII specifically showing how multi-h CPM signaling can be used to implement a particular TCM-MQM-CPM scheme.

Exemplary Embodiment I 4-ary SSB-MSK and 16-ary MQM-MSK
Comparable with QPSK and 16-QAM In this exemplary embodiment define two message signal $m_I(t)$ and $m_Q(t)$ as $$m_I(t)=A \cos [\alpha_1(t)]+Ar \cos [\alpha_2(t)]; m_Q(t)=A \cos [\alpha_3(t)]+Ar \cos [\alpha_4(t)] \quad (44)$$

where, r is an amplitude scaling factor. The signals $m_I(t)$ and $m_Q(t)$ are respectively applied to mixers 630 and 640 in FIG. 6 to generate the QM-CPM signal s(t) in FIG. 6. The transmitter structure of FIG. 6 thereby generates on each of its in-phase and quadrature phase channels a 4-ary scheme with average transmitted power $A^2(1+r^2)/2$ and an average symbol energy given by:

$$E_{avg.} = \frac{A^2 T_s (1+r^2)}{2}. \quad (45)$$

The signal on the in-phase channel, $m_I(t)$ is the real part of a 4-ary CPM signal given by $$x(t)=e^{j\alpha_1(t)}+re^{j\alpha_2(t)}. \quad (46)$$

Figure 9:
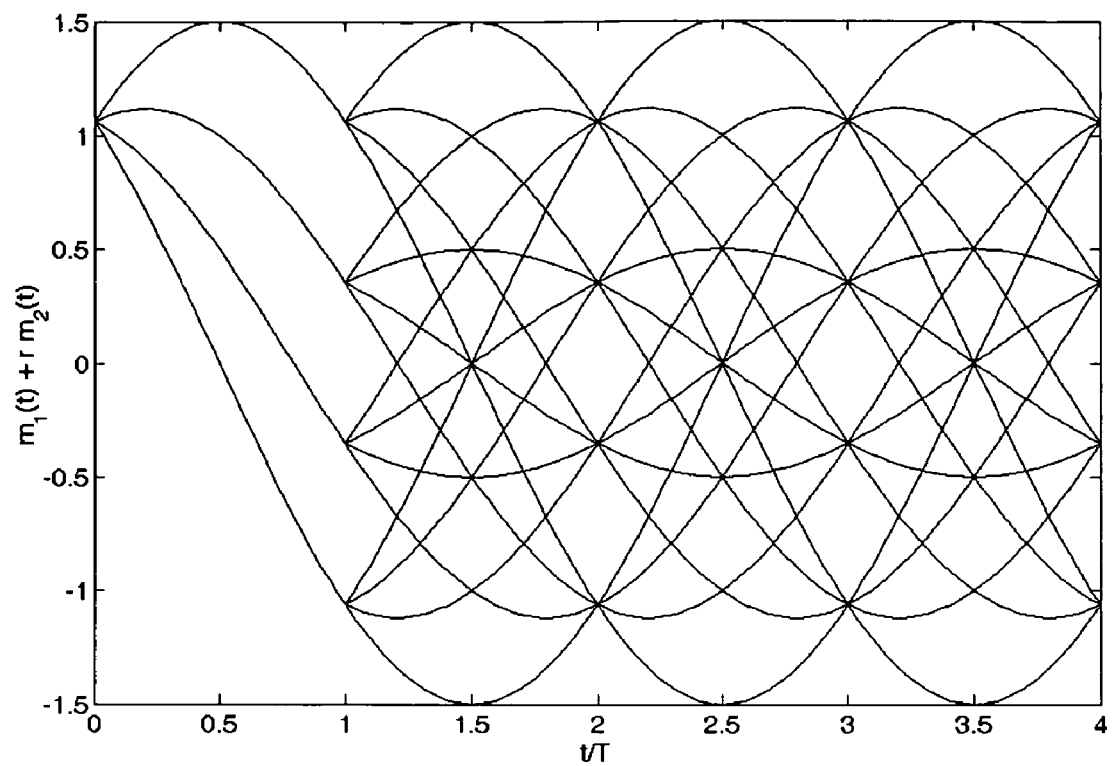
FIG. 9 shows a real-valued trellis signal that generated by mapping a 4-ary multi-amplitude CPM signal through a complex-to-real transformation.
Figure 10:
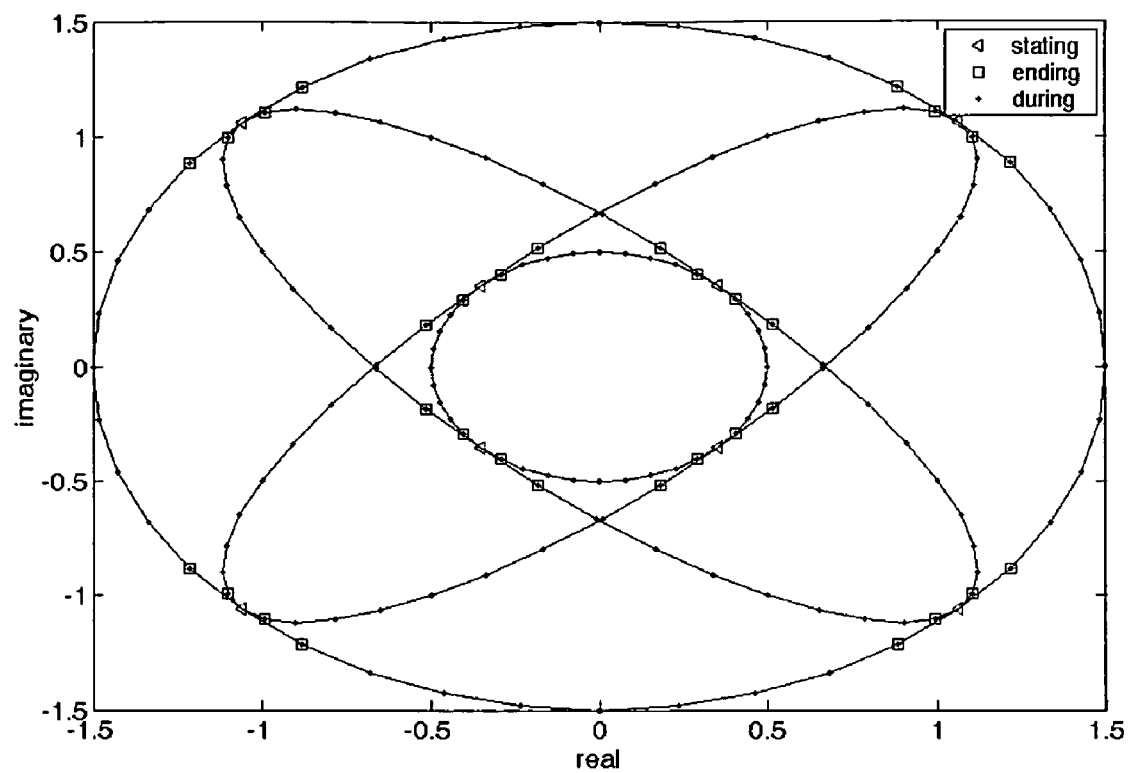
FIG. 10 shows a phase trellis state diagram in the complex signal space of the 4-ary multi-amplitude CPM signal used to generate the real-valued signal of FIG. 9. This diagram represents a trellis-signal analogy of a QPSK signal constellation.

In this exemplary embodiment, we set r=½ and use MSK signals ($h_1=h_2=0.5$) whose phase functions are:

$$\alpha_1(t) = 2\pi h_1 \sum_k I_k \int_{-\infty}^{t} g(\xi - kT) d\xi + \beta_1 \quad (47)$$

$$\alpha_2(t) = 2\pi h_2 \sum_k J_k \int_{-\infty}^{t} g(\xi - kT) d\xi + \beta_2 \quad (48)$$

where g(t)=[u(t)−u(t−T)] is a rectangular pulse between 0 and T with unit amplitude and $\beta_1=\beta_2=-\pi/4$ and. FIG. 9 illustrates a 4-ary trellis structure of the signal $m_I(t)$. FIG. 10 shows the trajectories of x(t) in equation (44) for different message symbols using ten samples per symbol interval. It is seen from FIG. 10 that the signal x(t) can be viewed as a narrow-band version of QPSK. FIG. 10 demonstrates how the transitions occur between constellation points in order to generate the trellis structure of $m_I(t)$.

In the receiver of FIG. 7, the signal $m_I(t)$ is demodulated by the in-phase channel and is applied to the trellis decoder 82. From FIG. 9, we see that the 4-ary modulation gives rise to a 4-state trellis structure with four incoming branches per state. Thus the trellis decoders 82, 84 are implemented using four-state trellis decoders that keeps track of four survival path metrics and compute a total of sixteen branch metrics per symbol interval. See discussion of FIG. 5 for further details of the Viterbi algorithm used in the trellis decoders 82, 84. The decoders 82, 84 are in this case are adapted to decode the trellis structure of FIG. 9 instead of the ones previously discussed that decoded the trellis structure of FIG. 4.

Because the demodulation/decoding of the in-phase channel is essentially the same as the quadrature-phase channel, we focus our attention on the processing of the in-phase channel only. The after scaling, the in-phase channel received signal is $$Z_I(t) = m_I(t) + \frac{n_c(t)}{A} \quad (49)$$
$$= m_I(t) + n_1(t)$$

where the psd of $n_1(t)$ is $N_0/(A^2)$. The error probability can be written as $$P_e \approx Q\left(\frac{D_{min}}{2\sigma}\right), \sigma^2 = N_0/(A^2) \quad (50)$$

where $D_{min}$ is the minimum distance between two paths on the trellis of $m_I(t)$. Using $D_{min}^2=cT_s$, we can write the probability of error as $$P_e \approx Q\left(\sqrt{\frac{cA^2 T_s}{4N_0}}\right) \quad (51)$$

or, $$= Q\left(\sqrt{\frac{cE_{avg}}{2(1+r^2)N_0}}\right). \quad (52)$$

The pair of 4-ary signals, $m_I(t)$ and $m_Q(t)$, taken together provide a 4×4 set of possible trellis paths and thus provide a 16-ary scheme. Therefore, $T_s=4T_b$ and $E_{avg}=4E_{b,avg}$ and $P_e$ can be expressed as $$P_e \approx Q\left(\sqrt{\frac{2cE_{b,avg}}{(1+r^2)N_0}}\right) = Q\left(\sqrt{\frac{d_e^2 E_{b,avg}}{N_0}}\right). \quad (53)$$

In equation (53), $d_e^2$ is the effective normalized minimum squared Euclidian distance of the signals.

For the case shown in FIG. 9 and FIG. 10, it was found by computer simulation that c=0.5 and $d_e^2$=0.8. As we demonstrate below, if compared at the same 99% bandwidth, which results in a low ISI (intersymbol interference), then the 16-ary MQM-MSK performs 56 B better than a QAM scheme that occupies the same bandwidth and carries the same amount of information. If compared at the 90% bandwidth, 16-ary MQM-MSK performs 3.98 dB better (although we note the 90% bandwidth is typically too low for practical usage). At a somewhat typical normalized bandwidth of 96% operating point, the gain is above 10 dB as discussed below.

While this example focused on a 16-ary MQM-MSK scheme, that the signal $m_I(t)$ could have been used as the signal m(t) in a double-data rate 4-ary SSB-MSK scheme. The 4-ary DDR SSB-MSK version carries the same amount of information as the 16-ary MQM-MSK scheme and has the same bit error rate performance as the 16-ary MQM-MSK scheme. The DDR SSB-MSK version uses twice the symbol rate and involves the use of the Hilbert and inverse Hilbert transforms, but is otherwise equivalent and equally well suited to multi-amplitude signal.

Exemplary Embodiment II

QM-CPM Comparable with Offset QPSK and 16-QAM

In this example, we study a 16-ary approach where we use a time delay between component signals to form:

$$m_I(t) = m_1(t) + m_3\left(t - \frac{T}{2}\right), m_Q(t) = m_2(t) + m_4\left(t - \frac{T}{2}\right). \quad (54)$$

We apply the $m_I(t)$ and $m_Q(t)$ signals above in FIG. 6 to the mixers 630, 640 to produce the transmitted signal:

$$s(t) = A[m_I(t)\cos(\omega_c t) - m_Q(t-\tau)\sin(\omega_c t)]. \quad (55)$$

In this example, we selected the τ's to minimize the PAPR. Observing that $$\overline{m_I^2(t)} = \overline{m_Q^2(t)} = 1,$$

the average transmitted power $$\overline{s^2(t)} = A^2.$$

compared with equations (23)-(24), the transmitted power in the signal of equations (54)-(55) has doubled due to the addition of two new bit-carrying component signals. This approach also provides a 16-ary signaling scheme with similar performance properties as in the previous example.

Figure 11:
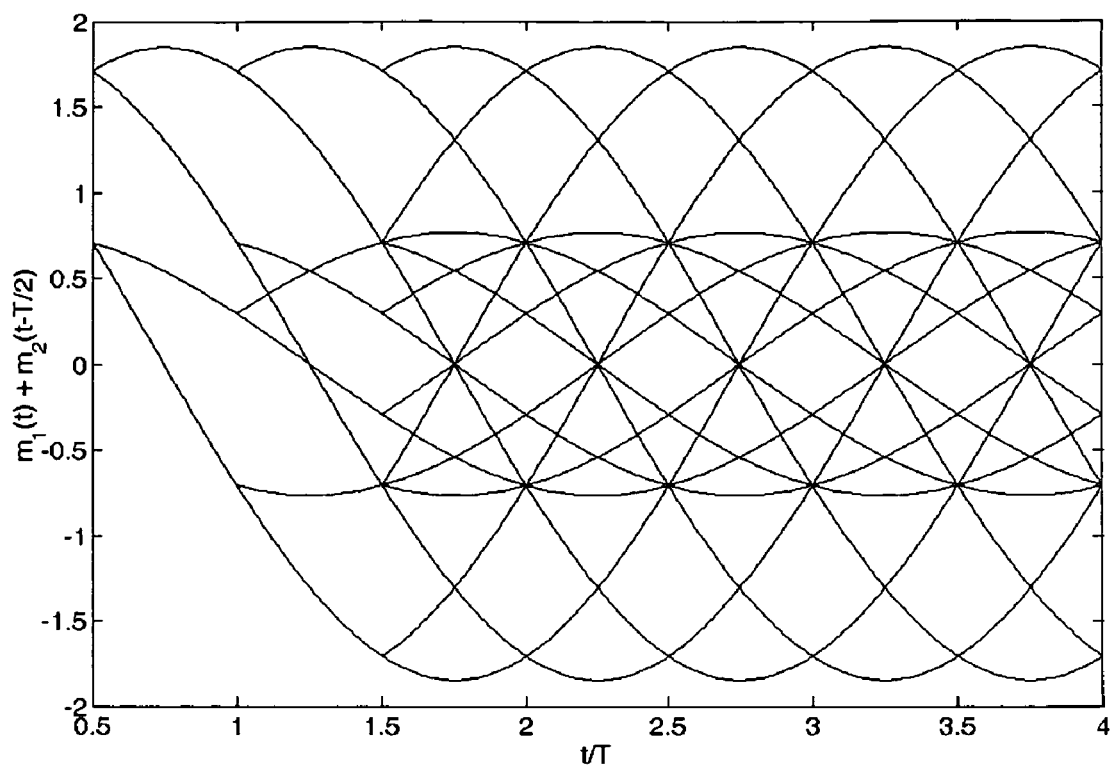
FIG. 11 shows a real-valued trellis signal that uses both multi-amplitude and delay-offset signaling.
Figure 12:
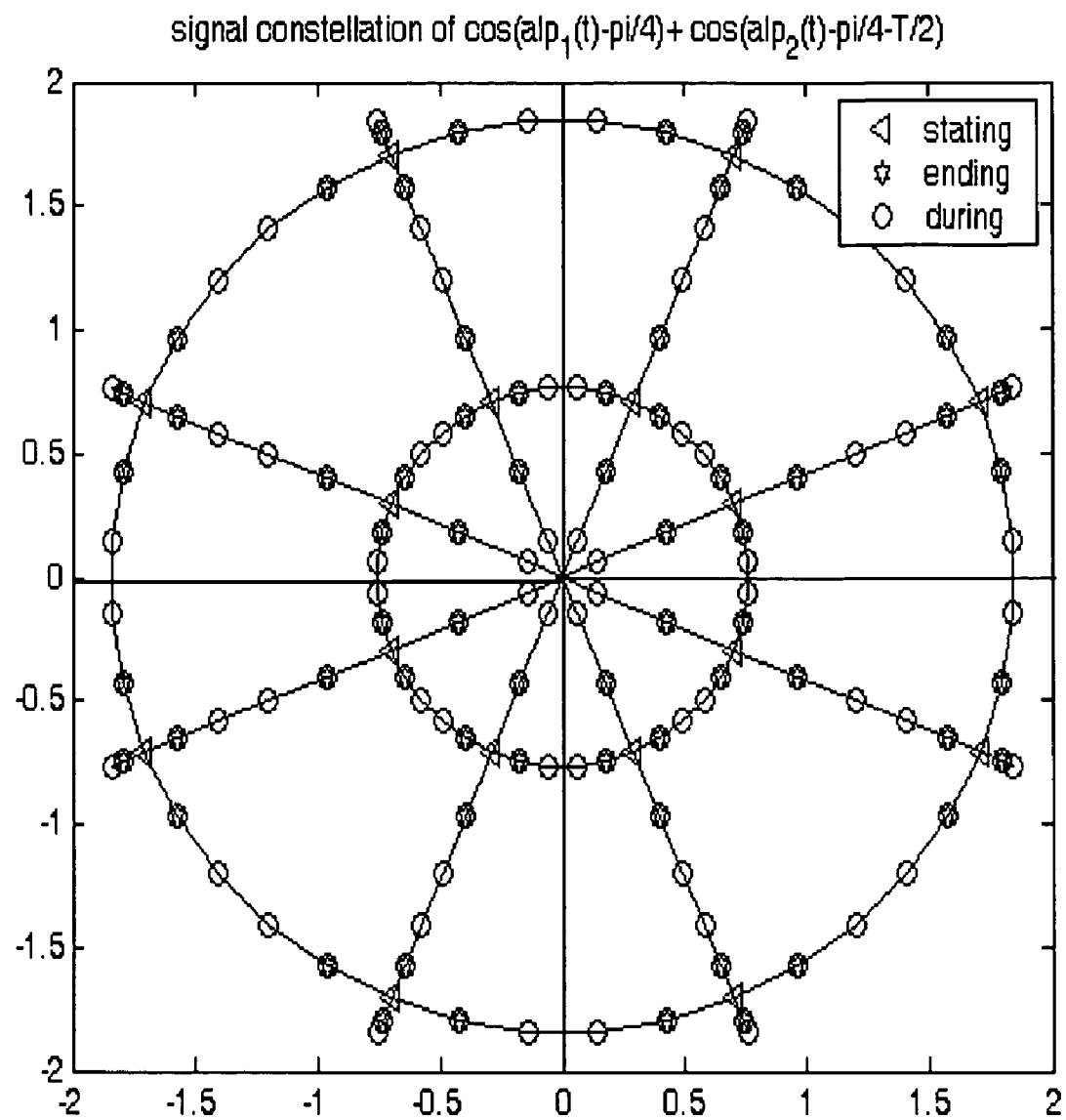
FIG. 12 shows a phase trellis state diagram in the complex signal space of the offset multi-amplitude CPM signal used to generate the real-valued signal of FIG. 11.

The concepts of exemplary embodiments I and II can be combined as shown in FIG. 11 and FIG. 12. FIG. 11 shows the real-valued trellis structure of $m_I(t)$ constructed with MSK signals with $\beta_1 = \beta_2 = -\pi/4$ using the baseband signaling scheme of equation (54). Note that the signal in FIG. 11 has states both at multiple amplitudes and shifted times. FIG. 12 shows the complex domain signal state transition diagram of the complex-valued baseband signal x(t) for this scheme. It is found that the minimum distance of this scheme is $d_e^2 = 0.978$. Note that FIGS. 11 and 12 only show the in-phase signal, and when equation (55) is applied, there will be two such signals transmitted with another optional offset from one another. Comparison of 4-ary QM-MSK and 16-ary MQM-MSK Embodiments with QAM In this section, we compare the performance of the 4-ary QM-MSK and the 16-ary MQM-MSK schemes of exemplary embodiments I and II with prior art QAM schemes. 4-ary QM-MSK corresponds to mapping the real-valued MSK trellis signal of FIG. 4 onto the I and Q channels of a QM-CPM scheme of section VI, and 16-ary MQM-CPM corresponds to generally to examples I and II of the current section (VII). We also note that the channel capacity and performance of binary DDR SSB-MSK is the same as that of 4-ary QM-MSK and the channel capacity and performance of 4-ary DDR SSB-MSK is the same as that for 16-ary MQM-MSK. Therefore, the comparative discussion that follows we only discuss the performance of 4-ary QM-MSK and 16-ary MQM-MSK, realizing that the same applies to their DDR SSB equivalents.

In order to make a head-to-head comparison, we compare QM-MSK and MQM-MSK with QAM at the same normalized bandwidth. As is common in the electronic communications arts, the bandwidth of a digitally modulated signal is expressed in terms of its percentage-in-band power, such as the 90% and 99% bandwidth (respectively $B_{90}$ and $B_{99}$). These bandwidth measures indicate the fraction of the total signal power contained within the specified bandwidth.

In practical communication systems, it is practical to use a bandwidth closer to $B_{99}$. To understand why, we can imagine an ideal low pass filter whose cutoff frequency is at a signal's 90% bandwidth. If this filter's output signal is all we have at the receiver, 10% of the signal's power will be lost, and this lost power will correspond to the signal's higher frequency components. Therefore the filtered signal will be smoothed out and distorted, having lost its ability to make relatively rapid changes. For example, the signal state points of FIG. 4 and FIG. 9 will smear away from the sample times and all the paths in between symbol times will run together. In terms of equalization theory, FIG. 4 and FIG. 9 can be thought of as "eye diagrams" and at the 90% bandwidth these diagrams will have their "eyes" "closed" or partially closed. Meanwhile, if the 99% bandwidth is used, FIG. 4 and FIG. 9 will have their trellis structure in tact, i.e., their "eyes" will be "open". This open-eye condition will allow a Viterbi decoder to do a much better job decoding the signal as compared to what it can do with a received signal having only a 90% bandwidth.

In order to help understand performance advantages over a range of bandwidths that might be used in actual systems implementations, we compare performance at $B_{90}$, $B_{96}$, and $B_{99}$. Practical implementations will typically operate somewhere close to $B_{96}$ (for example GMSK in the GSM standard uses $B_{96}$). The use of $B_{90}$ and $B_{99}$ allows us compare performance at the endpoints of a range of practical bandwidths. The use of these percentage in-band power bandwidths allows us to compare the performance of different modulation schemes normalized to the amount of information that is passed over the channel. However, in some schemes a controlled amount of correctable bandwidth overlap also possible. Such methods may also be applied to multi-carrier and OFDM schemes that use SSB-FM signal types.

One should also note that in an FDM system employing 90% bandwidth per channel, 10% of the power of the signals would be passed onto adjacent channels, or lost due to filtering. In the design of OFDM and other types of multi-carrier systems, the 99% bandwidth is typically assumed so that the transmitted signal can be received without any interference from adjacent channels and without significant distortion due to ISI.

The 4-ary QM-MSK and the 16-ary MQM-MSK schemes have the same power spectral density (psd) functions as ordinary MSK signals. The psd of an MSK signal is given by [Proakis]:

$$S_{MSK}(f) = \frac{16T}{\pi^2}\left(\frac{\cos 2\pi fT}{1 - 16f^2T^2}\right)^2 \quad (56)$$

Similarly, the psd of a QAM signal is given by [Proakis]:

$$S_{QAM} = T^2\left(\frac{\sin \pi fT}{\pi fT}\right)^2 \quad (57)$$

where T in the above equations is the duration of one interval. The fractional out-of-band power variation for any type of a signal is found according to [Proakis]:

$$S_{ob}(B) = 1 - \frac{\int_{-B/2}^{B/2} S(f)df}{\int_{-\infty}^{\infty} S(f)df}. \quad (58)$$

Figure 13:
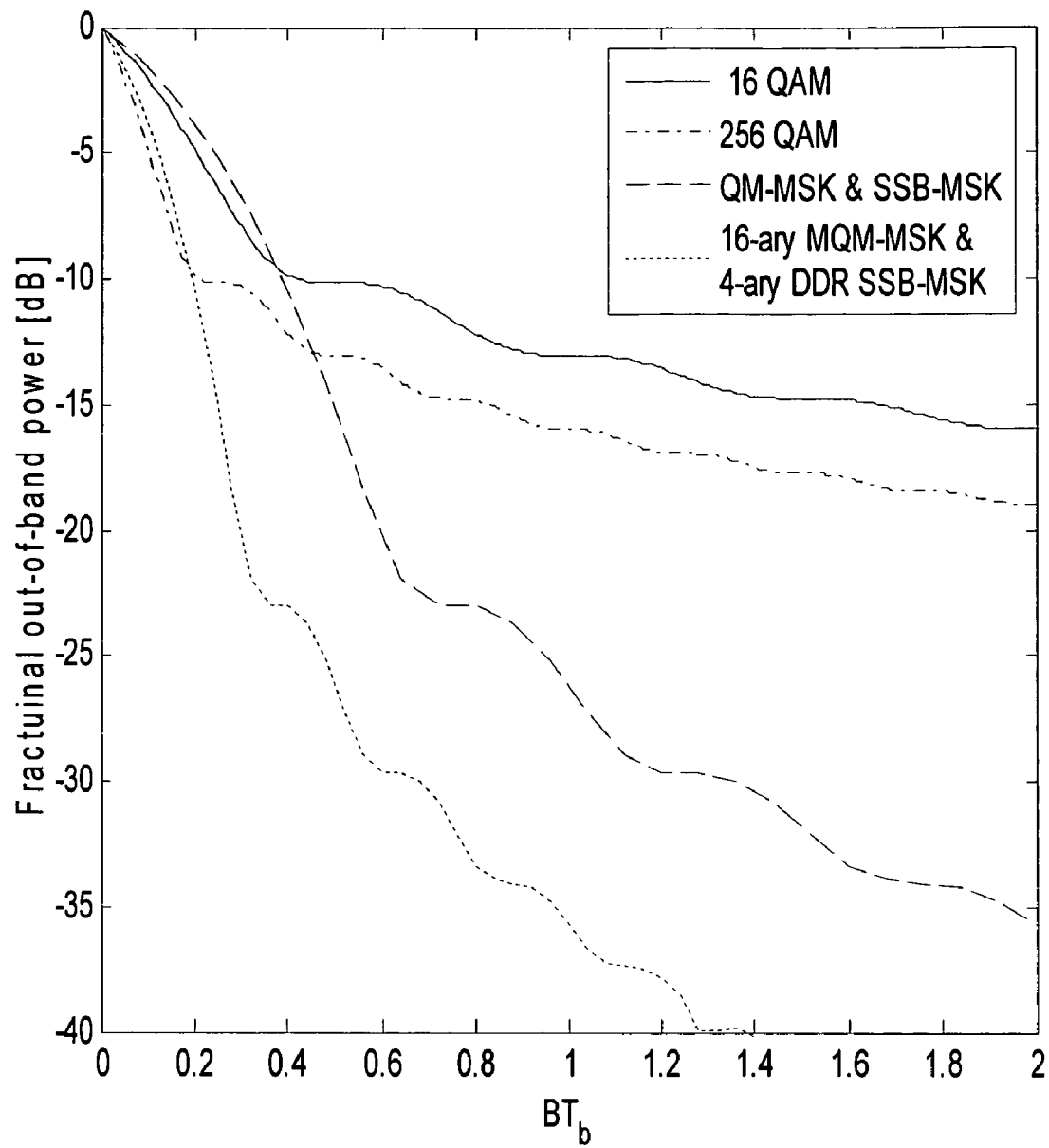
FIG. 13 is a normalized bandwidth curve used to compare the bandwidth tradeoff of different modulation schemes as a function of the amount of information carrier per unit of bandwidth.

The bandwidth per bits/sec., which is the bandwidth normalized to the bit rate, can be found by considering the bit duration $T_b$ as $T_b = T/m$, where m is the number of bits transmitted during one interval. In the 4-ary QM-MSK example, m=2, while for the 16-ary MQM-MSK and 16-ary QAM, m=4 ($m = \log_2 M$ for an M-ary scheme). FIG. 13 compares the fractional out-of-band power in dB as a function of bandwidth per bits/sec ($BT_b$) for 4-ary QM-MSK, 16-ary MQM-MSK, and rectangular-constellation 16-ary and 256-ary QAM.

The performance of M-ary QAM with a rectangular constellation is given by [Proakis, page 278]:

$$P_e \leq 4Q\left(\sqrt{\frac{3E_{avg}}{(M-1)N_0}}\right) \quad (59)$$

$$= 4Q\left(\sqrt{\frac{3E_{b,avg}\log_2 M}{(M-1)N_0}}\right). \quad (60)$$

Comparing 4-ary QM-MSK at $B_{90}$ (at −10 dB in FIG. 13), it is seen that 4-ary QM-MSK can send the same amount of information in as 16-ary QAM can in the same 90% bandwidth. It follows from equation (53) that the normalized squared minimum distance of 16-ary QAM is 0.8, while it follows from equation (34) that of the normalized squared minimum distance of 4-ary QM-MSK is 2.0. Therefore, when compared at the 90% bandwidth, 4-ary QM-MSK performs 3.98 dB better than 16-ary QAM while carrying the same amount of information.

Comparing 4-ary QM-MSK at $B_{96}$ (at −14 dB in FIG. 13), it turns out that 1024-ary QAM would be required to send the same amount of information as 4-ary QM-MSK can in the same 96% bandwidth. Using equation (53) the normalized squared minimum distance of 1024-ary QAM is computed to be 0.0293, while the normalized squared minimum distance of 4-ary QM-MSK is 2.0. Therefore, when compared at $B_{96}$, 4-ary QM-MSK is able to carry the same amount of information as 1024-ary QAM while performing 18.33 dB within the restricted bandwidth of $B_{96}$.

Comparing 4-ary QM-MSK at the upper end of the range, i.e., $B_{99}$ (at −20 dB in FIG. 13), it turns out that $2^{26}$-ary QAM would be required to send the same amount of information as 4-ary QM-MSK can in the same 99% bandwidth. Using equation (53) the normalized squared minimum distance of $2^{26}$-ary QAM is computed to be $1.162 \times 10^{-6}$, while the normalized squared minimum distance of 4-ary QM-MSK is 2.0. Therefore, when compared at $B_{99}$, 4-ary QM-MSK is able to carry the same amount of information as $2^{26}$-ary QAM while performing 62.3 dB within the restricted bandwidth of $B_{99}$.

Now comparing 16-ary MQM-MSK, it is seen from FIG. 13 that 16-ary MQM-MSK has about the same 90% bandwidth as 256-ary QAM. The exemplary embodiments I and II have respective normalized squared minimum distances of 0.8 and 0.978, while 256-QAM's minimum distance is computed to be 0.094. Hence, the 16-ary MQM-MSK of exemplary embodiments I and II respectively perform 9.16 dB and 10.17 dB better than a QAM scheme that carries the same amount of information in the same 90% bandwidth.

Comparing 16-ary MQM-MSK at $B_{96}$ (at −14 dB in FIG. 13), it turns out that $M = 2^{21}$-ary QAM would be required to send the same amount of information as the 16-ary MQM-MSK in the same 96% bandwidth. Using equation (53) the normalized squared minimum distance of $2^{21}$-ary QAM is $3.0 \times 10^{-15}$, while the normalized squared minimum distance of 16-ary MQM-MSK is 0.8. Therefore, when compared at $B_{96}$, 16-ary MQM-MSK is able to carry the same amount of information as $2^{21}$-ary QAM while performing 44.25 dB within the restricted bandwidth of $B_{96}$.

Comparing 16-ary MQM-MSK at the upper end of the range, i.e., $B_{99}$ (at −20 dB in FIG. 13), it turns out that $M = 2^{52}$-ary QAM would be required to send the same amount of information as the 16-ary MQM-MSK in the same 99% bandwidth. Using equation (53) the normalized squared minimum distance of $2^{52}$-ary QAM is $3.46 \times 10^{-14}$, while the normalized squared minimum distance of 4-ary QM-MSK is 2.0. Therefore, when compared at $B_{99}$, 16-ary MQM-MSK is able to carry the same amount of information as $2^{24}$-ary QAM while performing 123.6 dB within the restricted bandwidth of $B_{99}$.

The above discussion shows that a significant performance gain can be expected over QAM using the techniques of the present invention. To bracket the range of practical bandwidth operating points as being selected somewhere between $B_{90}$ and $B_{99}$, 4-ary QM-MSK or the binary DDR SSB-MSK can send the same amount of information as QAM with between 3.98 and 62.3 dB of noise margin improvement. Similarly, at a fixed noise margin, a significantly higher amount of data could be packed into a given limited amount of bandwidth. If 16-ary MQM-MSK or 4-ary DDR SSB-MSK is used, then between 10 dB and 133.6 dB of noise margin improvement could be obtained, or more significantly more data could be transmitted in the same bandwidth at a fixed noise margin. Using $B_{96}$ as an approximate guideline for use in practical systems, we find that the present invention should provide gains on the order to 18.33 to 44.25 in practical embodiments. Given other factors like noise introduced by imperfections in carrier phase and symbol timing tracking loops, we estimate that 10 dB or more of performance improvement will be attainable in actual communication system embodiments.

Another way to compare these schemes is at the same order of signaling, i.e., number of bits per symbol. For example, if 4-ary QM-MSK is compared with QPSK, they both have the same bit error rate performance, but QPSK occupies twice the 90% bandwidth and 13 times the 99% bandwidth. Hence, 4-ary QM-MSK can transmit twice amount of information as QPSK at $B_{90}$ without sacrificing performance, or it could use a rate ½ code to improve performance by approximately between 2 and 10 dB, depending on the complexity of the ½ rate code. Also, 4-ary QM-MSK can transmit 13 times the amount of information as QPSK at $B_{99}$ without sacrificing performance, and it could use any portion of this extra bandwidth to send parity codes to improve the overall coded system performance.

Similarly, it is found that 16-ary MQM-MSK can send twice the amount of information as 16-ary QAM when compared at the 90% bandwidth. To this is added a 0.87 dB increase in BER performance as well. Therefore 16-ary MQM-MSK can transmit at twice the data rate with a slight performance gain or could use a rate ½ code to improve performance by between 2 and 10 dB, depending on the complexity of the ½-rate code. Also, 16-ary MQM-MSK can transmit 13 times the amount of information as 16-ary QAM at $B_{99}$ with a slight performance gain, and it could use any portion of this extra bandwidth to send parity codes to further improve the overall coded system performance.

Exemplary Embodiment III

Use of a Frequency Shift Parameter to Improve $D_{min}^2$

In this example we apply a frequency shift to improve upon the normalized $D_{min}^2$ value obtained from the resulting trellis structure. We start with a frequency-shifted CPM baseband signal $$x(t) = e^{j[\alpha(t) + \omega_d t]}, \quad (61)$$

where $\omega_d$ represents the frequency shift. Next we apply equation (15) to obtain:

$$m(t) = \cos[\alpha(t) + \omega_d t] = \cos \gamma(t). \quad (62)$$

We can use this shift to modify the trellis structure of m(t) so as to improve upon a corresponding value of the normalized $D_{min}^2$. We can select $\omega_d$ so that $\gamma(t)$ does not decrease for any symbol. For example, for $\alpha(t)$ corresponding to binary CPFSK with h=¼, we can select $$\omega_d = \frac{\pi}{4T},$$

so that during the $k^{th}$ interval, $\gamma(t)$ can be written $$\gamma(t) = \begin{cases} \gamma_k & I_k = -1 \\ \left(\gamma_k + \frac{\pi t}{2T}\right) & I_k = +1. \end{cases} \quad (63)$$

where $\gamma_k$ is the value of $\gamma(t)$ at the beginning of the $k^{th}$ interval. It is found that the above modification can significantly improve the minimum distance over the signals with $\omega_d=0$.

Figure 14:
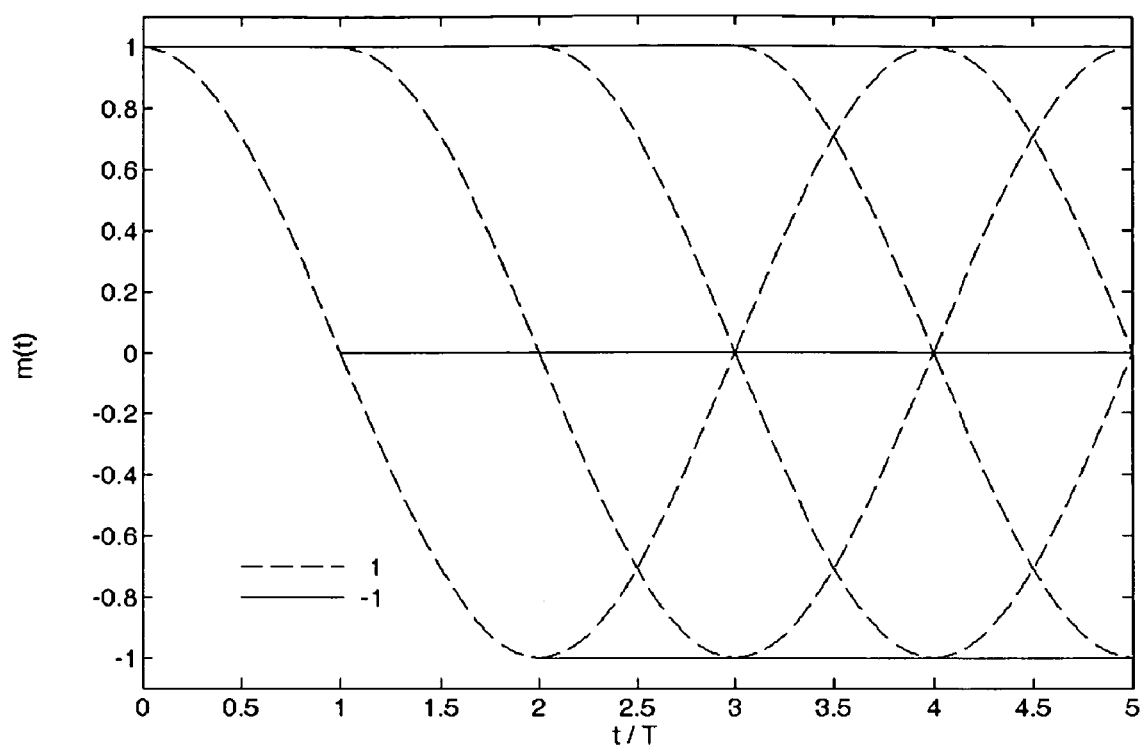
FIG. 14 shows a trellis signal that uses a frequency offset parameter to control the number of times a signal needs to shift from one signal level to another and to add additional minimum distance to the trellis structure of the signal.

FIG. 14 shows the trellis structure of and SSB-CPFSK signal m(t) for the case where $$\omega_d = \frac{\pi}{4T}.$$

Note how the frequency shift has reduced the amount of state transition activity because the bit $I_k=-1$ causes the system to maintain its state and only $I_k=+1$ causes a transition to a different state. It was found through computer simulation that the m(t) in equation (62) could be optimized using with a modulation index of h=¼ and a frequency shift $$\omega_d = \frac{\pi}{4T}.$$

The resulting normalized $D_{min}^2$ of the trellis structure of m(t) of the resulting SSB-CPFSK signal was $d_e^2=0.726$, while the best $D_{min}^2$ achievable with $\omega_d=0$ was $d_e^2=0.213$. The normalized $D_{min}^2$ of ordinary CPFSK with the frequency shift and with h=¼ was also 0.726, showing that this technique can improve performance both in ordinary CPFSK and SSB-CPFSK (i.e., with or without the complex-to-real transformation). In general, this is a design parameter that can be used to improve performance on any SSB-FM signal and also the original complex baseband signals from which the SSB-FM signals are derived.

The use of a non-zero $\omega_d$ broadens the bandwidth of (m t) beyond that with $\omega_d=0$. It can be shown that the psd m(t) is given by $$S_m(f) = S_x(f-f_d) + S_x(f+f_d); f_d = \omega_d/(2\pi) \quad (64)$$

It was numerically found that the normalized 99% bandwidth of the SSB signals generated with CPFSK signals with h=¼ and $$\omega_d = \frac{\pi}{4T}$$

was 0.51, as compared to 0.45 when $\omega_d=0$ (about a 10% increase). Hence, this while the use of a frequency shift can improve the normalized $D_{min}^2$, this is at the expense of a slight increase in bandwidth. In the presence of a frequency shift, the average energy in equation (45) may need adjustment due to the possibility of constant m(t) variations (constant transition signal) during certain intervals, depending on the specific frequency shift. The average energy can be numerically calculated by averaging over all possible transition signals weighted by the signal transition probabilities for the case that the signal transition probabilities are not equal.

As illustrated in FIG. 8, $\omega_d$ is in general a parameter that can be used, for example, in combination with the parameters used in examples I and II described above. For example, combining it with example I, we started with MSK, $\beta_1=\beta_2=-\pi/4$, $\omega_{d1}=\omega_{d2}=\pi(2T)$, and r=0.66, to generate a scheme with c=0.88 and a normalized bandwidth of 1.47 (as opposed 1.2 without any frequency shift). This combination of parameters version performs 1.85 dB better than 16-ary QAM in a non-bandwidth normalized comparison. When compared at a fixed normalized bandwidth (e.g., $B_{90}$ or $B_{99}$), the performance gains are on the same order of magnitude as those discussed in connection with 4-ary QM-MSK and 16-ary MQM-MSK.

VIII. Trellis Coded Modulation (TCM) Versions of SSB-FM Signaling Schemes

As discussed in connection with FIG. 8, trellis path constraints may be considered as free parameters when designing the real-valued baseband trellis structure of m(t). While various forms of channel coding may be used, to include scrambling, interleaving, and any form of FEC, trellis encoding can be mixed with signal set expansion to formulate signal space codes to create trellis coded modulation versions of any SSB-FM signaling scheme of the present invention.

To impose additional trellis constraints, in accordance with an aspect of the present invention, we perform signal set expansion and trellis coded modulation to obtain new forms of trellis coded modulation. For example, the extra signal dimension afforded by QM-CPM over ordinary CPM can be used to generate extended-state trellis structures. Likewise, extra constellation points and/or trellis states can be added using the previously discussed multi-amplitude trellis based techniques. The expanded signal sets are then used to support signal space coding, i.e., trellis coded modulation.

To apply trellis coding to the various inventive modulation techniques such as the exemplary SSB-CPM related schemes developed in detail herein, we can start with a pre-selected number of constellation points (or trellis states) and enforce path constraints on how signals transition in and out of the constellation points (or trellis states). In some cases there may be a one-to-one mapping between constellation points and trellis states, but this is not necessary in all embodiments. Phase states of a complex-valued baseband signal (e.g., x(t) in equation (8)) are mapped via a complex-to-real transform (e.g., via equation (15)) to the real-valued signal, m(t). The trellis coding design problem solved herein is to embed a suitable trellis structure into the signal m(t) whose states and state transitions increase the minimum distance between merge events, while at the same time maintaining a desired power spectrum constraint. For example, in exemplary embodiments I and II, the power spectrum of the resulting waveforms all had the power spectrum of the starting MSK signal, and in exemplary embodiment III, about a 10% increase in bandwidth was traded for 1.87 dB of performance increase. Now we show how to additionally use trellis coded modulation (TCM) to improve $D_{min}$ in such schemes while maintaining the same kind of power spectrum constraint.

Before developing general design guidelines and computer-aided design algorithms to design optimal or near optimal TCM-based trellis structures, we consider an exemplary physical coding structure used to trellis encode a bit stream for use with any of SSB-FM modulation techniques of the present invention (e.g., SSB-CPM, QM-CPM and MQM-CPM). A mapping device that maps a bit stream onto one or more real-valued trellis signals suitable for use with SSB-CPM, QM-CPM, MQM CPM or any of the other versions of the inventive SSB-FM modulation genus is shown in FIG. 15.

Figure 15:
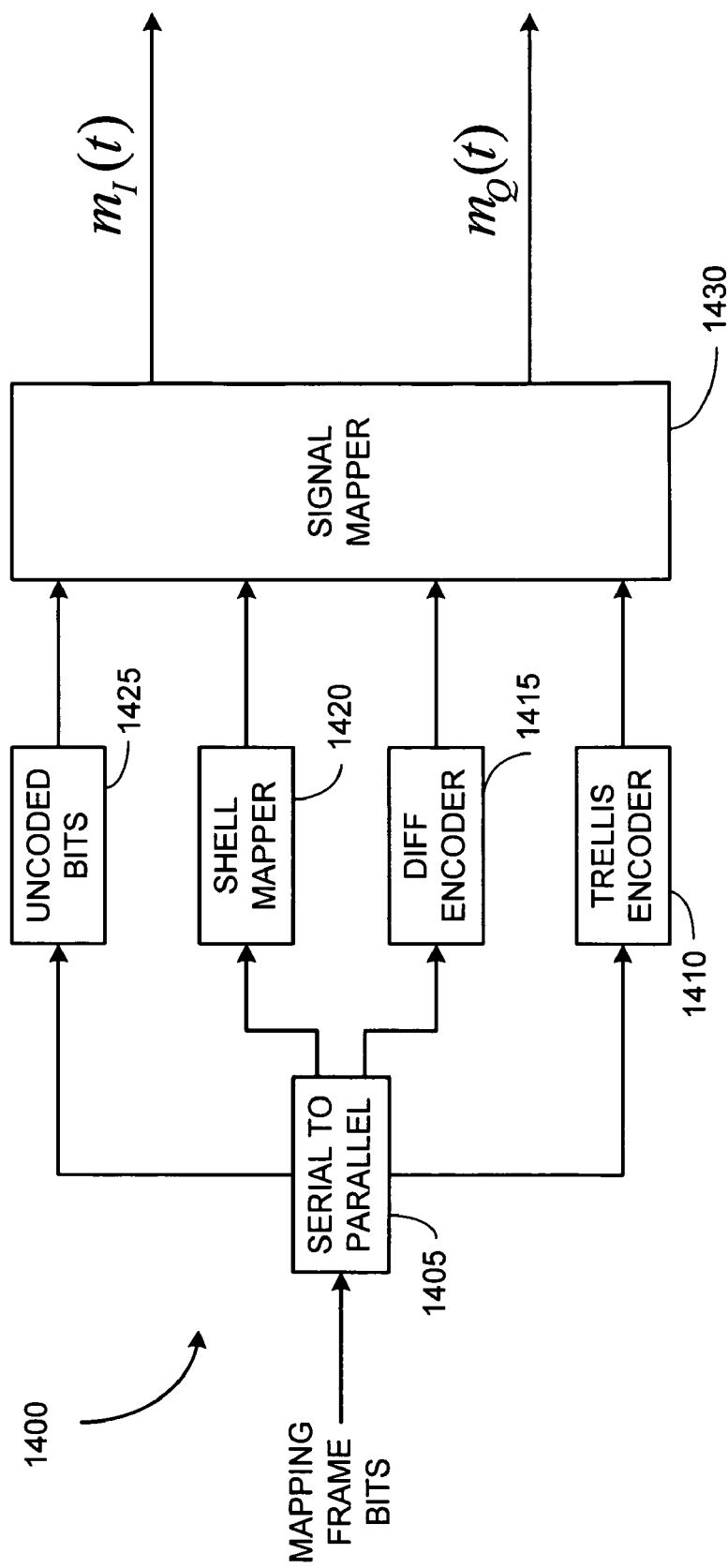
FIG. 15 is a block diagram representing a frame mapper for trellis coded modulation (TCM) based implementations of various types of SSB-FM modulator structures.

FIG. 15 shows the architecture of frame mapper 1400 used to map an input bit stream that is segmented into a sequence of mapping frames onto a sequence of trellis-coded information symbols. Before being applied to the input of the frame mapper 1400, the input bit stream may optionally undergo scrambling, interleaving, and channel coding FEC (e.g., block, convolutional, Reed-Solomon, turbo codes). The input bit stream is divided into a sequence of mapping frames which are input to a serial-to-parallel converter 1405 which generates a set of S/P output bits. A first bit group of the S/P output bits are routed to a trellis encoder 1410. The first bit group typically contains between two bits to all of the bits in the input mapping frame, depending on the embodiment. A second bit group of the S/P output bits are routed to an optional differential encoder 1415. The second bit group, if the differential decoder is present, typically uses one or two bits. A third bit group of the S/P output bits are routed to an optional shell mapper 1420. The number of bits in third bit group depends on the embodiment. The job of the shell mapper is to perform constellation shaping. Typically a set of bits in the mapping frame are used to cause sequences of symbols to be generated whose average power level is controlled to so as to improve the PAPR of the overall coded system. Any shell mapping or constellation shaping algorithm used to control PAPR may be used to implement the shell mapper 1420. A fourth bit group of the output bits are optionally left uncoded, as illustrated by the optional uncoded-bits block 1425.

The outputs of any of the present blocks 1410, 1415, 1420, and 1425 are sent to a signal mapper 1430. The signal mapper 1430 maps the bits of the mapping frame onto one or more trellis-coded symbols. In some embodiments, the output of the symbol mapper only generates a single real-valued signal, $m_I(t)$, while in others it generates both $m_I(t)$ and $m_Q(t)$. In some embodiments, two information sequences $I_k$ and $J_k$ are individually and independently mapped to respective real-valued signals which are then used to modulate the in-phase and quadrature-phase channels for transmission similar to the transmitter of FIG. 6. In essence, the baseband processing of paths {605, 610} and {615, 620} of FIG. 6 can be replaced by either one joint I/Q frame mapper 1400 or two single-channel versions frame mapper 1400.

It should be noted that a mapping frame may optionally span more than one channel symbol interval. Also, the serial-to-parallel converter 1405 may perform permutation and various forms of bit interleaving. The trellis encoder 1410 may be selected to add one parity bit per symbol, or may optionally use a multi-dimensional trellis code that spans more than one symbol interval, for example to add one or more parity bits to groups of N channel symbols. Here by "channel symbol" we mean specifically the transition signal sent onto the channel during a symbol interval, and we recognize that in an associated code space, that groups of N channel symbols could be treated as N-dimensional code words. If the same trellis code is applied jointly to derive both the in-phase and quadrature-phase channel symbol streams, then the individual channel symbols may be constituent two-dimensional symbols of a 2N-dimensional code word. All such embodiments are known in the art of trellis coded modulation and any such code, for example the Wei codes, can be used to implement the trellis encoder 1410.

The size of the mapping frame may be equal to one group of N channel symbols (for N≧1), one group of 2N channel symbols, or may comprise M such groups of N or 2N channel symbols to allow the shell mapper to perform constellation shaping on longer sequences of symbols. Such features are optional, but may be used in specific embodiments. Likewise, the trellis encoder may map trellis constraints jointly into both $m_I(t)$ and $m_Q(t)$, or separate, independent trellis encoders may be used for each of $m_I(t)$ and $m_Q(t)$. Any of the blocks 1410, 1415, 1420, and 1425 may individually code only in one of the I- and Q-channels, or may jointly encode into both of the I- and Q-channels. In SSB-CPM embodiments, only the $m_I(t)$ is trellis encoded and a quadrature phase signal is derived by computing the Hilbert transform of $m_I(t)$.

Next consider a set of design procedures and guidelines that can be used to design trellis coded modulation schemes for any of the SSB-FM modulation types of the present invention. Again, by way of example, specific attention is paid to SSB-CPM, QM-CPM, and MQM-CPM, however any approach that involves a mapping of a complex baseband signal constellation or trellis structure onto a real baseband trellis signal would fall into the domain aspects of the present invention.

Figure 16:
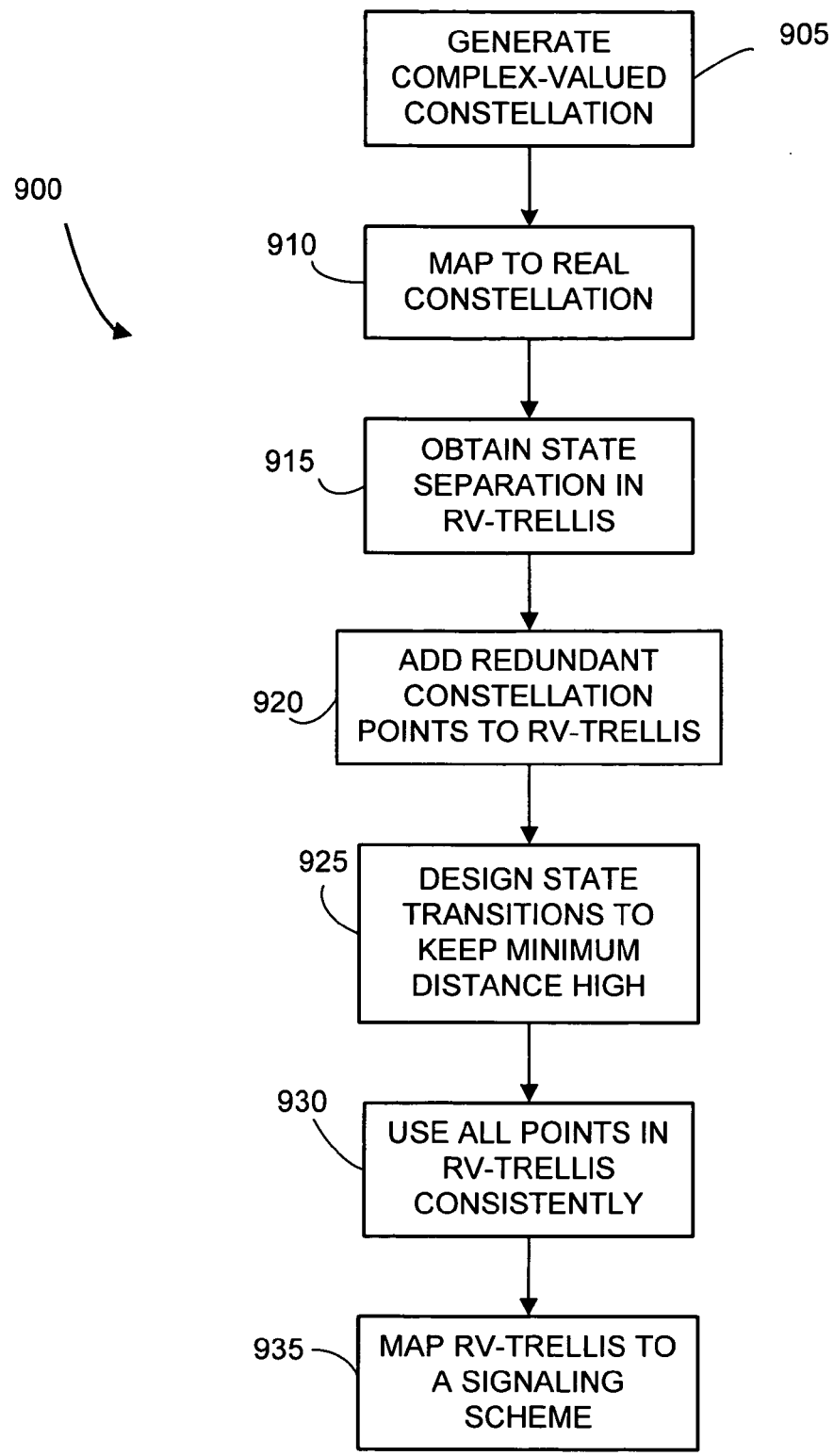
FIG. 16 is a flow chart showing an exemplary code search algorithm that can be used with the computerized code search structure of FIG. 8 to find a set of free parameters that give rise to a real-valued trellis signal with desirable or optimal properties.

Turning now to FIG. 16, a method 900 of signal design for SSB-FM signals is illustrated in flow chart form. The design guidelines can be automated into computer search programs that systematically search for good combinations of free parameters as discussed in connection with FIG. 8. That is, when FIG. 8 is implemented as a computer program, the flow chart of FIG. 16 may be used to help select optimal or good sets of path constraints to improve the trellis coded system performance.

FIG. 16 illustrates the method 900 for use with the computerized search techniques of FIG. 8, although the flow chart of FIG. 16 could also be used to design codes by hand or with the aid of computerized visualization and analysis tools. The idea is to provide a design methodology that can be used specifically to find good trellis coded modulation schemes for any SSB-FM modulation type. The technique below is described in the context of these examples, but it is understood the same techniques apply to the broader genus of modulation types provided by the present invention.

In a step 905 we generate a complex constellation such as a CPM constellation of the signal $x(t)$ in equation (8). Examples of the complex constellation structures of some exemplary CPM waveforms are illustrated in FIG. 10 and FIG. 12. In a step 910, the complex valued baseband signal (or its inherent trellis structure) is mapped to a real-valued envelope signal, $m(t)$, (or to a data structure used to represent, implicitly or explicitly, $m(t)$'s trellis structure). We define a "state value" in $m(t)$ as a value onto which is mapped one or more signal constellation points of $x(t)$. In many such mappings, more than one complex constellation points map onto a single value of $m(t)$.

For example, when the mapping is computed according to equation (15), the complex-to-real mapping can map complex conjugate pairs of constellation points of $x(t)$ onto single state values of $m(t)$. For example the mapping of equation (15) causes complex conjugate pairs of constellation points of $x(t)$ to map to the real part thereof in $m(t)$. Hence we realize that the state values of $m(t)$ may correspond to one or more signal constellation points of $x(t)$. The $x(t)$'s signal constellation points and $m(t)$'s state values typically correspond to the respective signal's value as measured at the symbol times, $kT_s$, where k is an integer and $T_s$ is the symbol interval. To construct M-ary signals, we generate an $m(t)$ with at least M distinct state values and preferably use M paths emerging from any state, although we can construct M-ary schemes that use more or fewer allowable transitions between the states.

It can be noted that in certain embodiments the blocks 905 and 910 may be merged. That is, a computer program could know in advance how the mathematics will convert the complex-valued signal structure to a real-valued signal structure and could therefore generate the real-valued signal structure directly. The present invention involves starting with a complex modulation and mapping it to a real waveform with desirable trellis structure inherited from its complex-valued counter part. Any computer mechanization of this process that skips an intermediate step is within the scope of the present invention.

While the combination of $x(t)$'s signal constellation and the complex-to-real mapping may map complex-conjugate pairs of constellation points of $x(t)$ onto single points of $m(t)$, the combination may be selected to cause the complex-conjugate pairs (or other selected pairs) to map to distinct points in $m(t)$. We note in the latter approach, the resulting $m(t)$ will have twice the number of distinct state values as in the former approach. While the latter approach will produce an $m(t)$ having twice as many state values as the former approach, as we will see, this will allow us to skip a step later that causes the number of states to be doubled.

In a step 915 we observe the state separation in the trellis structure of the $m(t)$ that results from using steps 905 and 910. To keep things simple, we assume that the former approach discussed in the previous paragraph is used so that pairs of signal constellation points in $x(t)$ map to single state values in $m(t)$. The step 915 measures the distance between state values in $m(t)$ and generally favors situations where the state values are evenly spaced and as large as possible when normalized by the average signal energy. The step 915 may optionally filter out combinations 905, 910 that have poor qualities in this regard.

For example, in the SSB-MSK trellis signal diagram shown in FIG. 4, there are two state values, one at $m(t)=1/\sqrt{2}$ an the other at $m(t)=-1/\sqrt{2}$. Onto each of these state values are mapped two constellation points of the original MSK signal, $\alpha(t)=\pm\pi/4$ at $m(t)=1/\sqrt{2}$ and $\alpha(t)=\pm3\pi/4$ at $m(t)=-1/\sqrt{2}$. The separation of the state values are subjectively far apart, but we might favor a mapping that shifts the symbol time over a half sample interval.

In a step 920 a set of redundant state values are added into the trellis structure of $m(t)$. This may optionally be performed by adding redundant signal constellation points into the signal $x(t)$ and then performing the complex-to-real mapping step again. If the mapping approach caused complex conjugate pairs (or other types of pairs) of $x(t)$'s constellation points to be mapped to single corresponding state values, then the step 920 preferably adds new constellation points to $x(t)$ and causes the new complex-conjugate pairs of constellation points to map to new state values in $m(t)$. The step 920 seeks to maintain a clear separation between the state values in terms of $m(t)$ after the new points have been added. Often, the step 920 causes the number of state values in $m(t)$ to be doubled. The step 920 often attempts to add the new state points to maximize the minimum state separation normalized to the average signal energy. In some cases offset methods are used so that the new signal points can be shifted, for example, by half a symbol relative to the original state points. For example, equation (42) may be used to add in new state values similar to the technique used in the examples of equations (44) and (54). The step 920 can further filter out combinations that are deemed undesirable when the constellation size increase step 920 is carried out.

The step 920 can be alternatively skipped, or integrated into the steps 905 and 910. This happens when the $x(t)$'s signal constellation and the complex-to-real mapping is selected so that individual ones of the constellation points of $x(t)$ map to individual state values in $m(t)$. In this case the doubling of state values is implicit in the steps 905 and 910. The net result is still an $m(t)$ with twice the number of states as are needed in the non-TCM versions of SSB-CPM, QM-CPM, and MQM-CPM as discussed in the previous sections.

In a step 925, state transitions between the state values are designed to maximize the minimum path distance of the trellis. One heuristic rule is to keep the distance as large as possible between paths of $m(t)$ during the first and the last intervals of each merging event. Paths emerging from a starting state preferably only have merge events at different states, and preferably have merge events at states that have large normalized distance from the starting state. Paths can be designed to make transitions from the starting state to the same starting state. However, the paths re-merging at any state should preferably be arriving from different states. Any of these heuristics can be used by a human designer or by a computerized program to sift through various trellis coding possibilities to find good or optimal codes for use in creating trellis coded versions of the present invention. A step 930 works along with the step 925 and attempts to apply the coding heuristics in such a way as to use all the states in the trellis diagram as consistently as possible.

For embodiments of the method 900 that design in the complex domain using the signal $x(t)$, there may be more than one way to transition between individual signal constellation points. For example, if the signal constellation points lie on a circle, it is desirable to use transition signals that correspond to moving the shorter way around the circle to the destination signal point. This has the effect of controlling bandwidth expansion which could otherwise occur if this policy is not followed.

The method 900 ends with a step 935 where the resulting trellis structure is mapped to a physical signal. For example, the resulting expanded signal structure can be mapped using multi-amplitude modulation as discussed in connection with equations (42) and exemplary equations (44) and (54). Alternatively, trellis coded signals could be mapped directly to complex-valued symbols of QM-CPM or MQM-CPM waveforms. If multidimensional codes are used, the expanded trellis coded signals could be mapped to channel symbol sequences of any individual or combination of SSB-CPM, QM-CPM, MQM-CPM waveforms. In embodiments where the mapping maps directly to a complex TCM scheme, the complex-to-real transformation steps could be skipped and a TCM-QAM type approach could be applied directly or with minor modification.

The step 935 may also involve a mapping that realizes state transitions by adjusting the modulation index for different symbols at different states (constellation points). That is, at the step 935, full and partial response signaling CPM, non-linear CPM, multi-h CPM, multi-T CPM schemes may be employed to implement the extra state values in m(t). Likewise, pulse shape modifications could be made or any other technique could be employed to accommodate the extra states in a finite trellis structure.

The method 900 can also be used to form non-clustered TCM signaling schemes. In this type of embodiment, steps 905-920 typically start with a standard TCM code search approach to find a code like an Ungerbock code or a Wei code for a constellation like a QPSK constellation or a QAM constellation. We call this a "starting TCM scheme" and note that the starting TCM scheme may be found using known results or known code search programs that search for good TCM codes for known prior art constellation types. In accordance with an aspect of the present invention, known TCM schemes are then converted to corresponding TCM schemes defined over the real-valued message signal, m(t).

For example, a set of complex valued signal points from a complex constellation can be mapped to a real-valued signal, m(t). For example, 4×4 TCM-QAM constellation can be mapped to a 16×1 TCM-PAM constellation, or a TCM-8PSK constellation can be viewed directly as a 8-ary TCM-PAM phase function, $\alpha(t)$. In general, real-valued signals $m_{MA}(t)$ of the form of equation (42) can be constructed to hold the starting complex-valued signal points as trellis state values of the real-valued signal $m_{MA}(t)$. In many cases, original complex-valued constellation points of the starting signal x(t) can be mapped to a TCM-PAM signal that may be considered to be a phase function, $\alpha(t) \in [0,2\pi]$. As such, the resulting TCM-PAM signal becomes analogous to equation (9). This phase function may be viewed as an M-ary, real-valued, TCM-PAM phase function, and can be mapped to a corresponding real-valued trellis signal, using, for example, m(t)=cos($\alpha(t)$). This general approach allows us start with a known TCM signaling scheme and to quickly generate an SSB-FM signaling scheme therefrom. As discussed above, it is often desirable to allow two of the original complex valued constellation points (i.e. TCM "trellis states") to map to a single phase state in the real-valued envelope signal, m(t), but this is not required and is left to the implementation. Also, we note it is convenient to view M-ary PSK (e.g., BPSK, QPSK, 8-PSK) as a corresponding M-ary PAM signal, and to map this to an M-ary phase function, $\alpha(t) \in [0,2\pi]$. Similarly, waveforms like PAM and 8-VSB can be mapped to $\alpha(t)$ and then m(t)=cos($\alpha(t)$) can be used with any of the SSB-FM schemes. The idea here is that once we have a PSK, PAM, or VSB signaling scheme that uses TCM, we can use that as a candidate for SSB-FM.

If we are starting with an M×M TCM-QAM constellation, we could first map this to an $M^2$-point PAM constellation and treat that as a phase function. Similarly, we could map the M×M TCM-QAM constellation onto a multi-amplitude signal using equation (42).

To understand the general approach, let us focus on a simple example. Start with a QPSK uncoded constellation, and apply Ungerbock's rules to arrive at an 8PSK TCM scheme with improved minimum distance. This provides us with a starting signal, x(t). Now select a mapping, such as m(t)=cos($\alpha(t)$). Next evaluate to see whether this mapping has affected the minimum distance, and if it did, check other mappings to see if any can be selected that maintain the minimum distance. Now apply a pulse shape to improve smoothness of transitions between states to enhance spectral performance. Similarly, the paths between phase points in the PSK scheme can be connected by linear transitions, so when m(t)=cos($\alpha(t)$) is applied, a nice CPM type signal results. These approaches provide an examples of TCM SSB-FM modulation scheme that are not necessarily derived from CPM using equations (8) and (9). The steps of the method 900 are modified to implement this method, and a resulting signal in accordance with an aspect of the present invention is produced. The method 900 so modified, may also be used for computer generation of desirable TCM schemes. The same code search algorithms as, for example, Ungerbock's search algorithms or Wei's search algorithms are used, except the evaluation portion needs to test the code's performance when mapped to the real-valued signal m(t).

To understand how a TCM-QAM constellation could be mapped, consider a 4×4 TCM-QAM constellation that uses a Wei code. This constellation (assumed to already be signal set expanded) has 16 constellation points, so we could, for example, map it to sixteen phase points equally spaced over [0,2π], or we could use equation (42) and map each of the constellation points in the TCM-QAM constellation using equations (41) and (42) to a multi-amplitude waveform with eight or sixteen distinct trellis state values. State transitions between constellation points in the TCM-QAM code would preferably be interpolated so that the signal generated in equations (41) and (42) would have good spectral properties. Smoother splines or other forms of interpolation between constellation points or sequences of constellation points may also be used to improve spectral performance.

In a preferred version of this kind of embodiment, we start with a known TCM-QAM scheme, and map it according to equation (41) and (42). We represent states in polar form and use both smooth amplitude and magnitude functions. We apply equations (41) and (42) to map these phase and amplitude functions to a smooth real-valued multi-amplitude signal. The method 900 checks the mapping to see if the code, once mapped, has a desirable minimum distance property. If it does, the code is kept, if it does not, the code is discarded. Otherwise a new starting code is selected, for example in accordance with an Ungerbock code search or a Wei code search over the original QAM constellation.

The example below focuses on the cluster based mapping approach. The example demonstrates how to use multi-h signaling to implement the clusters.

Exemplary Embodiment IV

TCM MQM-MSK using multi-h CPM Signaling

The current example illustrates some how a trellis coded modulation scheme can be implemented to improve the performance of the specific MSK-based real-valued envelope signal of FIG. 4. We demonstrate how multi-h signaling can be used to implement additional states so as to produce an m(t) with an increased minimum distance. Consider FIG. 4 and note that a merging event occurs after two intervals. Our aim is to disrupt the merging event by adding states to m(t). These additional states are added to FIG. 4 by employing a different modulation index for the transitions from $1/\sqrt{2}$ to $-1/\sqrt{2}$ and from $-1/\sqrt{2}$ to $1/\sqrt{2}$. In order to consistently disrupt merging events, the modulation index is periodically varied at the end of each of the two-symbol interval of FIG. 4.

Figure 17:
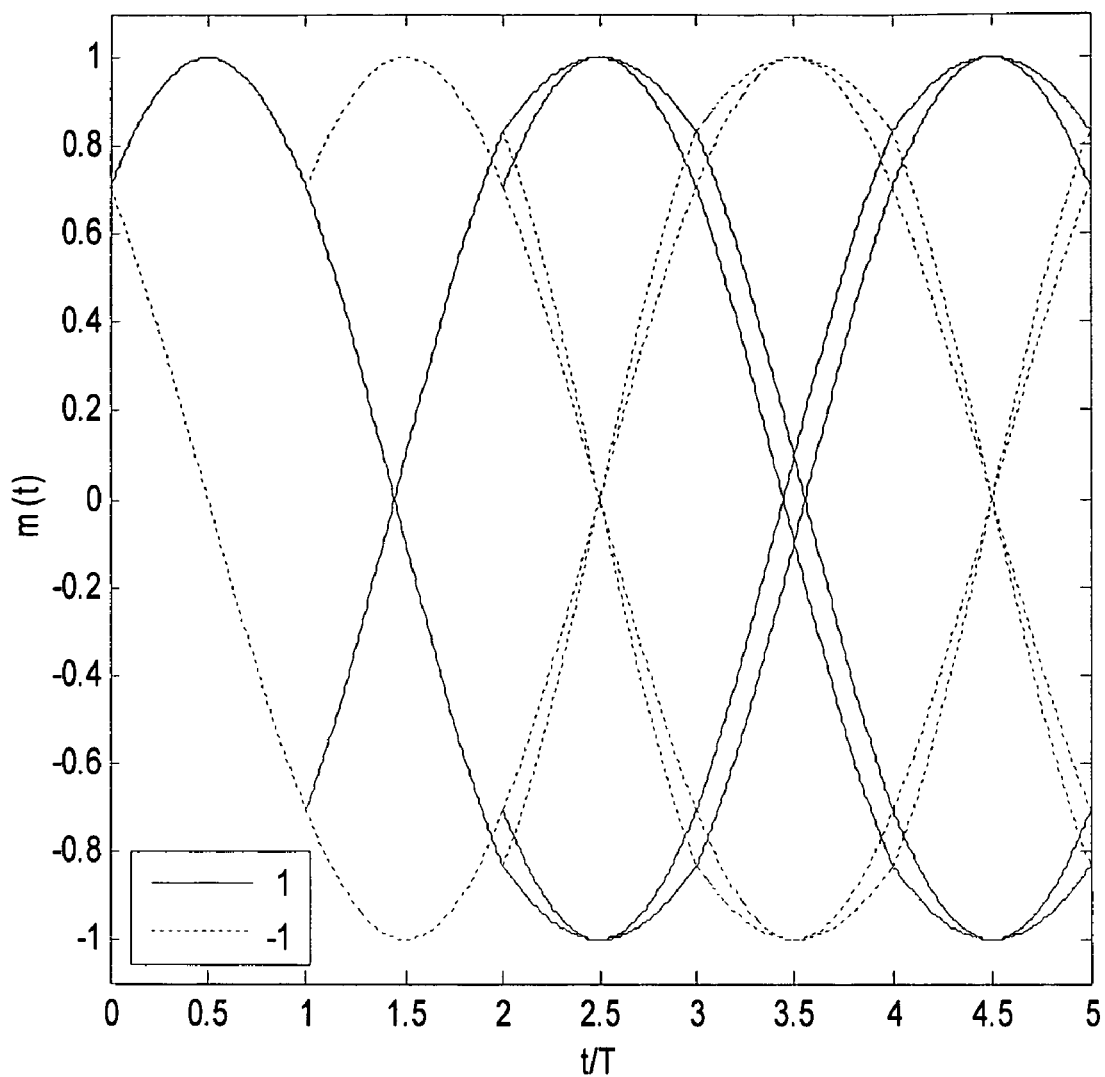
FIG. 17 shows a particular SSB-FM baseband message signal that is a real-valued trellis signal that employs a TCM code with multi-h CPFSK signaling to for signal set expansion.

FIG. 17 shows the trellis structure of an expanded-state version of m(t) that uses m(t)=±cos(3π/16) and m(t)=±cos(π/4) at the beginning of every interval. Merging events are consistently disrupted by periodically employing different modulation indices at the end of every other interval. Specifically, during all odd intervals, if at the start of the interval, m(t)=±cos(π/4), the modulation index is set to h=½, irrespective of what symbol is transmitted during the odd interval. If at the start of the odd interval, m(t)=±cos(3π/16), then the modulation index is set to h=⅝ if the transmitted symbol is −1 but the modulation index is set to h=⅜ if the transmitted symbol is +1. During even intervals, if at the start of the interval, m(t)=±cos(π/4), then the modulation index is set to h=½ if the symbol is −1, but is set to h=9/16 if the transmitted symbol is +1. If at the start of the even interval, m(t)=±cos(3π/16), then the modulation index is set to h=⅜ if the transmitted symbol is −1 and the modulation index is set to h=9/16 if the transmitted symbol is +1.

The signal of FIG. 17 is a real-valued envelope signal m(t), so any of the SSB-CPM/QM-CPM/MQM-CPM related modulation techniques may be used to modulate one or more of these into a corresponding CPM bandwidth. An analysis of this method shows that it gives rise to a modulation type with a normalized squared minimum distance of $d_e^2=3.045$ with a normalized bandwidth of $B_{99}T_b=0.605$. Comparing this with the SSB-MSK signals of FIG. 4, this scheme performs 1.8 dB better (with a negligible increase in bandwidth from 0.59 to 0.605).

Recall that x(t) of the original SSB-MSK scheme had a total of four phase states (constellation points) and the corresponding m(t) in FIG. 4 has two states. An underlying trellis structure associated with the baseband CPM signal x(t) corresponding to FIG. 17 has eight phase states (constellation points) and the associated m(t) takes on four state values. That is, FIG. 17 corresponds to a trellis coded version of the original SSB-MSK of FIG. 4 with double the number of states as the signal of FIG. 4 which does not involve TCM based signal set expansion. Different embodiments having similar properties as the m(t) of FIG. 17 can be implemented in accordance with an aspect of the present invention similar by periodically varying any selected free signal parameter to disrupt merging events, as long as the modification meets a target spectral constraints. For example, periodic pulse shape changes or periodic elongations and contractions of the symbol period would have similar effects.

To better understand FIG. 17's trellis structure, note that the signal's state takes on only 4 state values either from the set {(π/4, 3π/16, 5π/4, 19π/16} or from the set {−π/4, 3π/4, −3π/16, 13π/16}. Hence, the scheme in FIG. 17 can also be implemented by following the state transitions without the knowledge of the current interval. That is, a rate ½ convolutional code may be followed by a 4-ary CPFSK with h=¼.

The scheme shown in FIG. 17 is constructed starting with a known eight-state trellis coded with states {0, ±π/4, ±3π/4, ±π/2, π}. It is known that the this eight-state code can be used to generate CPFSK waveforms having a minimum squared distance of $d_e^2=3.0$ and a normalized bandwidth of $B_{99}T_b=1.37$, as compared to ordinary MSK signals with $d_e^2=2.0$ and $B_{99}T_b=1.18$. To construct a SSB-CPM signal, we first modify the constellation to one with a cluster structure {±π/4, ±3π/4, ±3π/16, ±13π/16}. Note that π/4=4π/16≅3π/16 and 3π/4=12π/16≅13π/16, i.e., we have moved certain points together, giving rise to the cluster structure. Next we select transitions following steps 925, 930 to construct the trellis of for the signal of FIG. 17, in this case using the known code. The SSB-CPFSK embodiment of this code achieves $d_e^2=3.045$ and $B_{99}T_b=0.605$, i.e., maintains the same minimum distance as can be achieved with a complex-valued CPFSK counterpart, but in half the normalized bandwidth.

IX. Carrier and Symbol Timing Recovery

Figure 18:
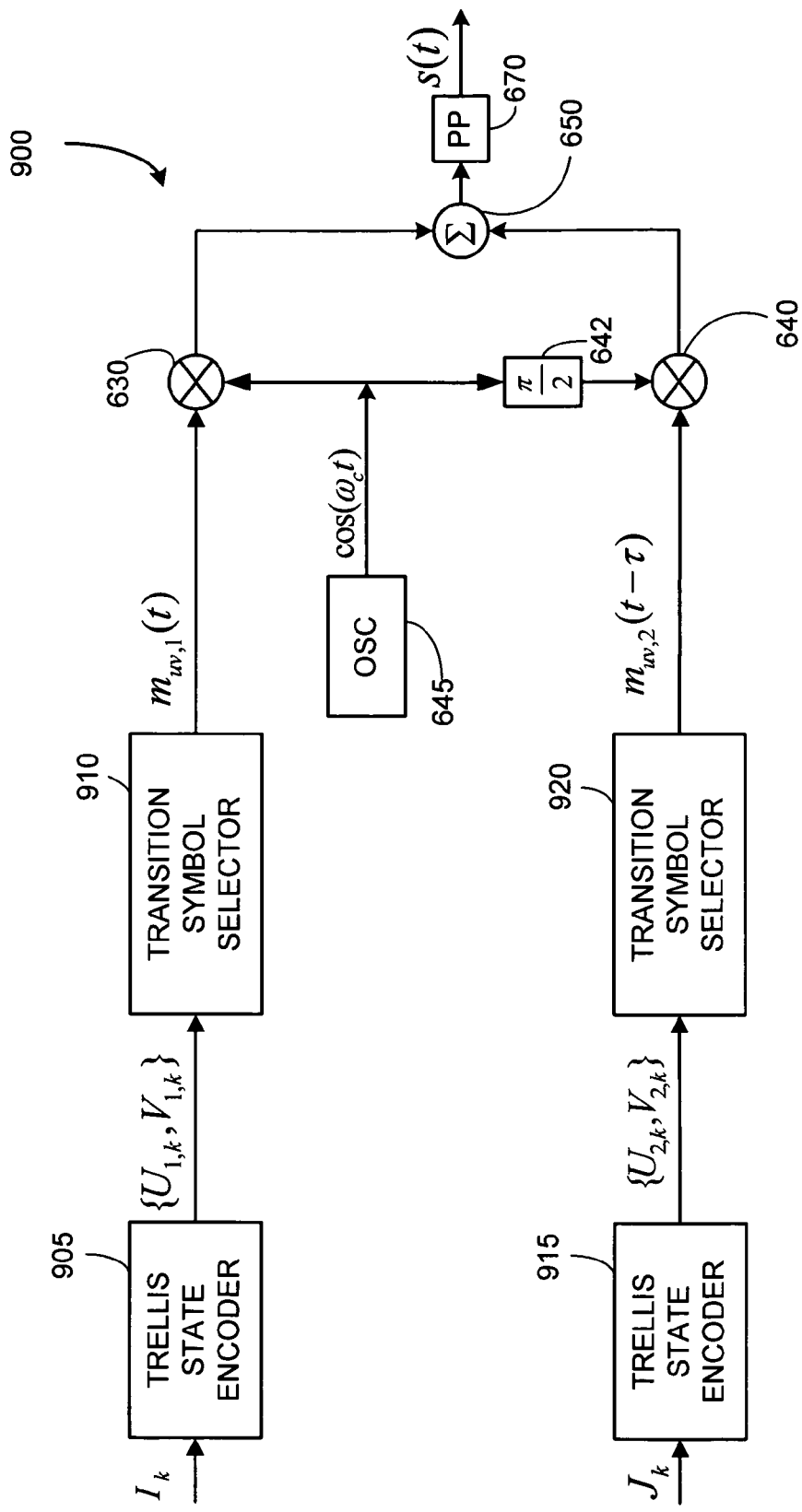
FIG. 18 a transmitter model that transmits sequences of trellis state transition signals. This model is useful in analyzing carrier recovery, symbol timing recovery, and equalization algorithms for use in SSB-FM systems.

FIG. 18 shows a QM-CPM transmitter model 900 that generates the trellis transition signals shown in FIG. 3 and FIG. 4. Additionally, any other trellis transition signal can be generated by the transmitter model 900, e.g., FIGS. 9-12. FIG. 18 illustrates the same transmitter as FIG. 7, but focuses on the trellis state selection and the transmission of a sequence of trellis-state transition signals as discussed in connection with FIG. 3 and FIG. 4. The transmitter 900 is useful in understanding the operation of certain embodiments of the synchronizer aspect of the channel interface synchronizer block used in various receivers structures discussed herein. It can be noted that if the quadrature-phase signal path of the model 900 is replaced with the Hilbert transform of the in-phase channel, the model 900 will apply to an SSB-CPM transmitter.

Consider the in-phase channel of the transmitter model 900. An information sequence $I_k$ is used to drive a trellis state encoder 905. The trellis state encoder 905 keeps track of the set of trellis states, $\{(u_{1,k}, v_{1,k})\}$ that would be generated in the Viterbi decoder in a receiver that receives a transmitted waveform sent by the transmitter model 900. The state information is sent to a transition symbol selector 910 that, based on the state transition from the state U to the state V, selects a state transition symbol, $m_{uv,1}(t)$ to send on the in-phase branch in a QM-CPM signal. The quadrature-phase signal path 915, 920 behaves similarly and generates $m_{uv,2}(t-\tau)$. These transition-symbol sequences are modulated using mixers 630, 640, summed in a summing junction 650. The output of the summing junction 650 is sent to a post processing block 670 which applies any amplitude scaling, and the output signal is sent as transmission signal, s(t). In addition to any amplitude scaling performed in the block 670, the post processing may involve passing the output signal through a pulse shaper. The post processing pulse shaping may alternatively be performed individually in the I- and Q-channels.

Figure 19:
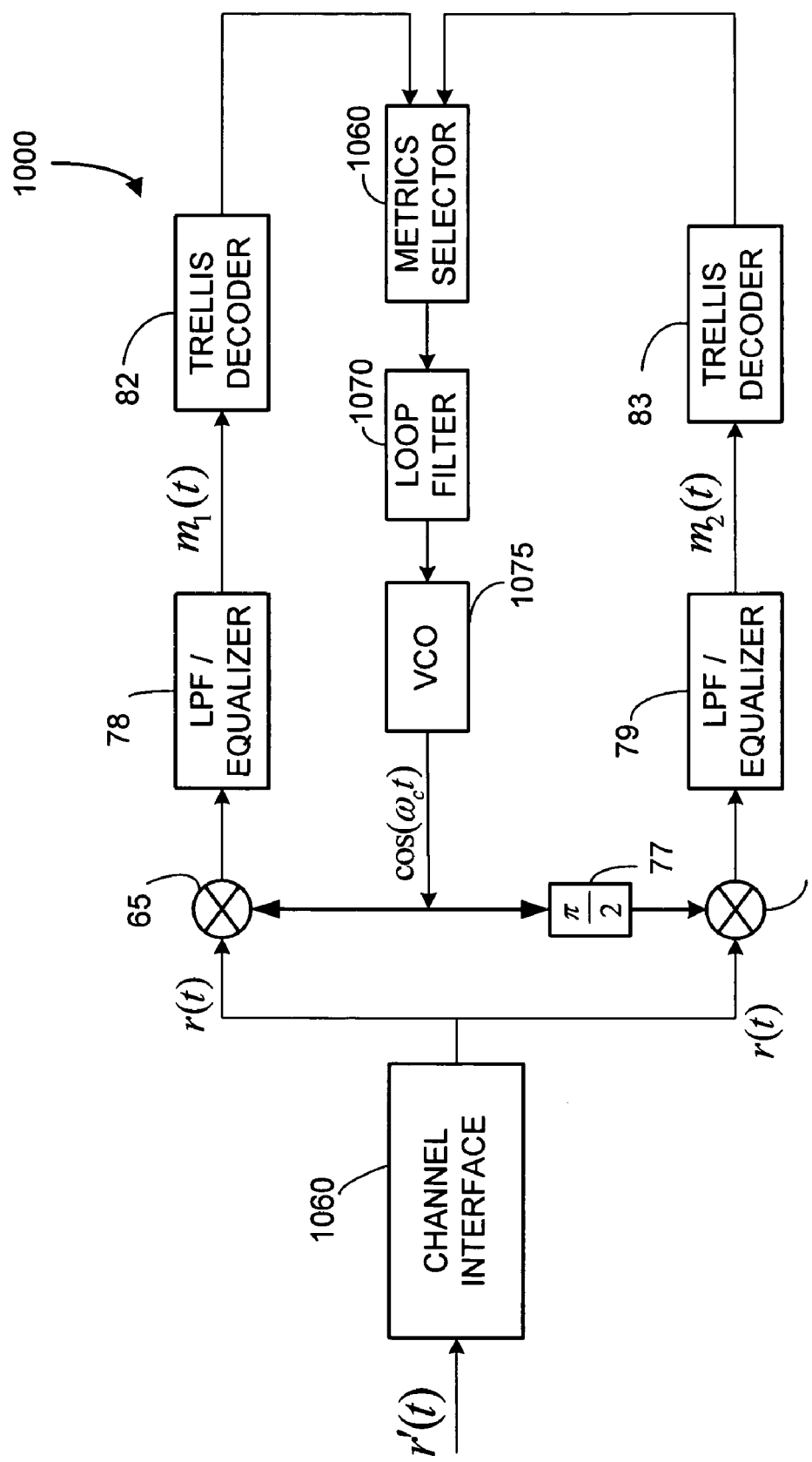
FIG. 19 is a block diagram representing a maximum likelihood carrier recovery loop or other similar types of carrier recovery loops for use in various SSB-FM receiver structures.

Turning now to FIG. 19, a carrier recovery loop for use in QM-CPM receiver is illustrated in block diagram form. Note that this carrier recovery loop will generally be a part of the channel interface and synchronizer block 60 in FIGS. 1 and 7. That is, the carrier recovery loop 1000 may be used to determine the phase of the phase locked oscillator 75 in FIGS. 2 and 7.

In one type of embodiment, the carrier recovery loop 1000 operates on the received signal and adjusts the carrier phase in order to minimize the set of branch metrics along a winning/ survival path in a Viterbi decoder. Consider the in-phase channel of the carrier recovery loop 1000. The received signal r(t) is mixed in a mixer 65 with the output of a voltage controlled oscillator (VCO) 1075 whose carrier phase and frequency of operation are adjustable. The output of the mixer 65 is passed to a low pass filter 78. The output of the low pass filter 78 will be equal to the transmitted transition symbol plus a noise component, $m_{uv,1}(t)+n_1(t)$. This noisy transition symbol is next feed to the trellis decoder 82 which performs Viterbi decoding to determine the most likely path according to the method 500. The trellis decoder will generate a set of branch metrics and eventually a set of delayed decisions based on a survival path.

The branch metric $B_{uv}(k)$ is computed in the trellis decoder 82 in accordance with equation (32) during the interval $kT \leq t < (k+1)T$, for the state transition from state $S_u$ to state $S_v$. Assume that the Viterbi algorithm later makes a delayed decision and determines that the most likely transition symbol sent during the interval $kT \leq t < (k+1)T$ was in fact $m_{uv,1}(t)$ and therefore the least branch metric in during the symbol $k^{th}$ interval was $B_{uv}(k)$. Also assume a data structure was maintained, for example by a metrics selector 1060 or within the trellis decoder 82 to keep track of the individual branch metrics that make up the survival path metric. Then when a delayed decision is made, its corresponding branch metric $B_{uv}(k)$, can be passed from the metric selector 1060 to a loop filter 1070 whose output is used to drive the VC0 1075. Optionally, the metrics selector can also select the sequence of branch metrics that correspond to the sequence of most likely transition symbols in the quadrature path as well to send into the loop filter 1070.

It can be seen that the action of the carrier recovery loop will be to track the frequency and phase of the transmitter 900. That is, the loop will track a carrier phase that minimizes the average power in the sequence of branch metrics corresponding to the most likely set of transmitted symbols.

It is noted that various modifications of the above carrier recovery loop are possible. For example, either at initialization/start up, periodically within a link layer frame structure, and/or upon detection of loss of lock, sets of known transition symbols may be transmitted so that the Viterbi decoder knows a priori what the correct decisions are. Also, pure carrier can be transmitted for short times in a frame structure or at start up so that a phase locked loop can acquire lock. That is, various types of known training sequences and/or pilot signals may be used to assist the locking and/or tracking of the carrier recovery loop.

The carrier recovery loop can also be operated in a variety of other modes. For example, during each interval all the branch metrics could be computed and the least branch metric could be fed back each interval and filtered by the loop filter 1070. In this mode no decisions are fed back but just soft decision information is used for carrier recovery. Other parameters could alternatively be used, like the sequence of correlation terms in equation (32), or the sequence of correlation terms of equation (32) normalized by the energy terms in equation (32). Likewise, simplified measures could be used, for example by considering the signal m(t) at the state value instant at the end of the symbol interval, or at points, as in FIG. 4, at the half symbol interval where the signal values are the farthest apart. This is also known as the point where the "eye is open" on the eye diagram. In this way the carrier phase can be adjusted to maximize the "opening of the eye" in the received signal's trellis diagram.

Hence it is to be understood that any such measures and "eye opening" techniques can be used in accordance with the teachings of the present invention. In general what is fed back is a measure that is a function of the phase and frequency of the VCO 1075 and whose minimization or maximization will be used to determine an operating point for the VCO 1075 using a servo control loop feedback rule and/or an adaptive equalizer technique that minimizes an error function for joint equalization and carrier and/or symbol timing recovery.

Figure 20:
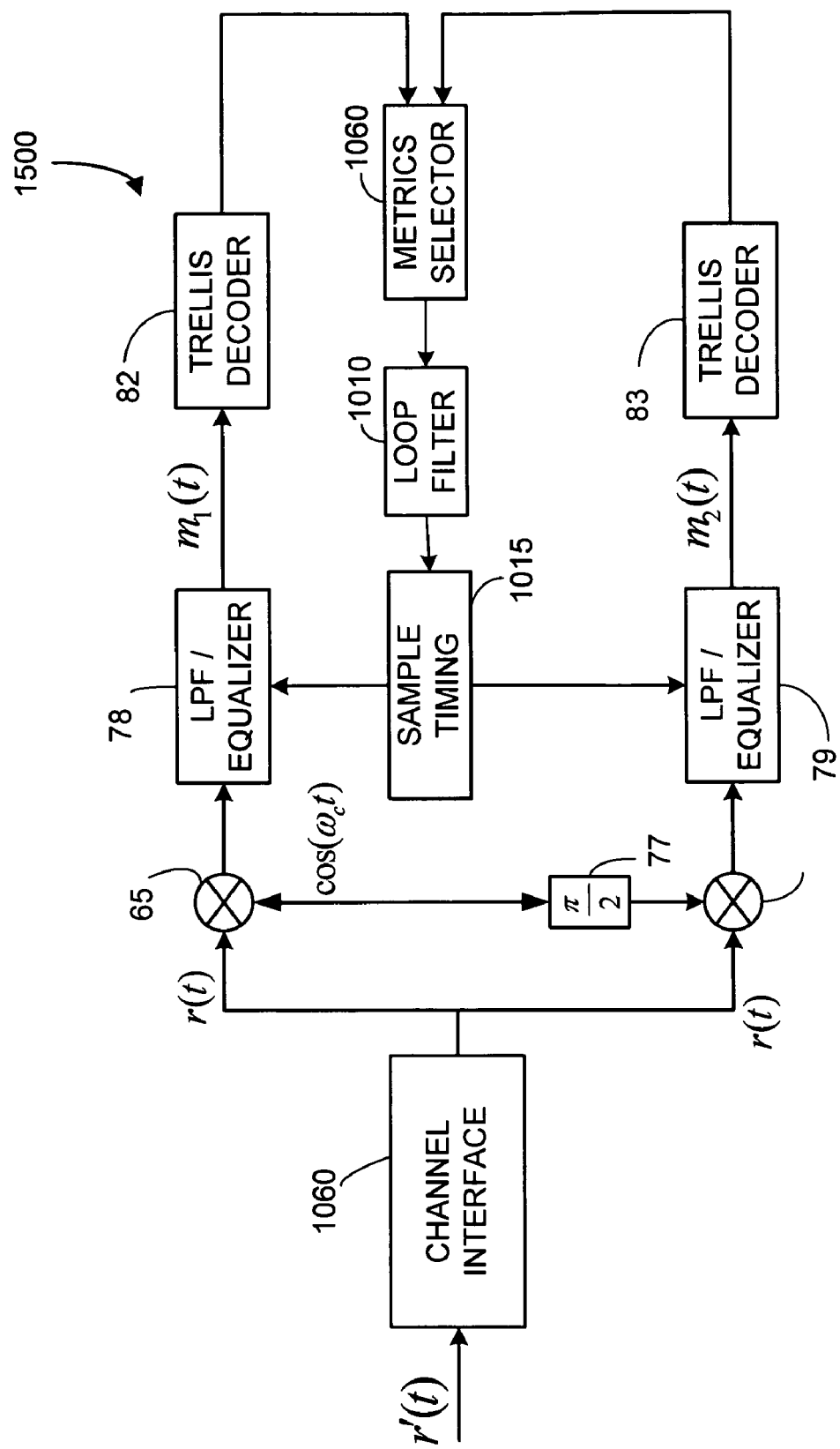
FIG. 20 is a block diagram representing a maximum likelihood symbol timing recovery loop, or an early-late tracking loop for symbol timing recovery, or other similar symbol timing recovery loops for use in various SSB-FM receiver structures.

Turning now to FIG. 20, a symbol timing recovery loop 1500 is shown. The symbol timing recovery loop works on the same principle as the carrier recovery loop 1000, but now instead of adjusting the carrier phase, the sample timing is adjusted in a block 1015 to align the boundaries of a symbol interval. This has the effect of adjusting the limits on the integrations of equations (31) and (32). The loop is operated in a servo fashion to minimize the filtered level of the sequence of selected minimal branch metrics selected by the metrics selector 1060 and processed by the loop filter 1010. All of the variations discussed in connection with the carrier recovery loop can also be applied to the symbol timing recovery loop. Also, carrier and symbol timing recovery can be performed by each of the carrier and symbol timing recovery loops separately, or as a part of a joint optimization strategy, for example, by minimizing a log likelihood function with the carrier phase and the symbol timing instants both as variables in the minimization. Joint carrier recovery, symbol timing recovery and equalization schemes may also be used.

Another variation of the symbol timing recovery loop 1500 is to compute early and late metrics. That is, while the sample timing block 1015 keeps track of the correct symbol timing, additional metrics are computed with the limits on the correlations in equation (32) both advanced and delayed by a time shift, Δ. Then the correlation terms in equation (32) (or other suitable feedback measure as discussed in connection with FIG. 19) should be the same for both the early and the late estimates. The symbol timing recovery loop is then adjusted to keep the early and late correlations equal. An error signal can be performed by squaring the outputs of the early and late correlators, and subtracting the squared values. As in the other embodiments, this error signal is then filtered in the loop filter 1010 and the sample timing is adjusted in the block 1015 is a servo fashion or via an adaptive algorithm that uses an on-line optimization/adaptation rule to keep this error as small as possible.

X. Equalizer Based Processing, and CPM-PAM and CPM-QAM Receiver Structures

As discussed in connections with FIGS. 2 and 7, the LPF/Equalizers 78, 79 may include an equalization function in addition to normal low pass filtering used in demodulation. The equalization function can be used to combat the effects of intersymbol interference (ISI) that is caused by sending a signal through a band limited channel. For example, if the SSB-CPM, QM-CPM, or MQM-CPM are sent through a channel with a 90% bandwidth, $B_{90}$, then 10% a significant amount of high-frequency signal components will be lost, and channel distortion in the form of ISI will need to compensated and reduced.

In considering the equalization function, note that FIG. 4 looks like an "eye diagram" of binary PAM and FIG. 9 looks like an eye diagram of 4-ary PAM. Similarly, FIG. 11 can be viewed as a 4-ary PAM type eye diagram, although the symbol times are staggered using half-symbol-interval offsets. Of course, when the eye diagrams of FIGS. 4 and 9 are quadrature multiplexed, they look very much like the eye diagrams of QAM (or offset-QAM, i.e., OQAM if offset signaling like that shown in FIG. 11 is used).

As is known in the art equalizers, the effect of ISI is to cause the "eye" of the eye diagrams to "close" and the job of the equalizer is to "open the eye." That is, in equalizer parlance, the act of "opening the eye" is the same as separating back out the PAM signal levels so that, for example, a slicer can make decisions at the symbol instants at the PAM symbol levels. In the present invention, such separation is useful whenever the eye diagrams like FIG. 4 or 9 have closed. The equalizer, in opening the eye, serves to improve the observed distances between paths seen in the Viterbi decoders 82, 84.

An aspect of the present invention observes that certain CPM and similar signals that have been mapped to real-valued envelope signals in accordance with the present invention may be viewed as a class of bandwidth efficient trellis based PAM signals (or, when quadrature multiplexed using QM-CPM or MQM-CPM, they form a class of bandwidth efficient trellis based QAM signals). To help describe certain types of processing based upon this aspect of the present invention, we define some new terms. When a multi-amplitude CPM signal is processed via a complex-to-real transform to generate a real-valued multi-amplitude CPM trellis signal, we can refer to the resulting signal as "CPM-PAM." In the receiver, the processing of the CPM-PAM signal can be processed similar to an uncoded PAM signal or can be processed similarly to prior-art TCM-PAM. When quadrature multiplexing is applied to map two CPM-PAM signals onto a pair of quadrature-phase carriers, we can refer to the resulting signal as "CPM-QAM." In the receiver, the processing of the CPM-QAM signal is similar to the way prior-art TCM-QAM would be processed.

In one form of CPM-PAM/CPM-QAM processing, an equalizer can be used to ensure that, in the receiver, the "eye" of FIG. 4, 9 or 11 "is open" so that decisions may be made at the symbol instants and/or at other selected instants, e.g. at the times ½(kT) in FIG. 4. This allows the narrowband CPM signal to be processed much like a PAM or QAM signal. Such processing is simpler in many ways than CPM processing, so such embodiments may be desirable. Also such processing is desirable in certain embodiments of receiver structures for discrete multitone (DMT) and other forms of multi-carrier communication systems like OFDM where receiver simplification is especially important.

To better understand the concept of CPM-PAM and CPM-QAM receiver processing, inspect of FIG. 4 and observe that the largest relative separation between trellis paths of m(t) at any given instant occurs at half-symbol times, i.e., at the 1.5T, 2.5T, etc. At these values there are three maximally separated path sample values which m(t) takes on, i.e., {+1, 0, -1}. This corresponds to the "eye open" instant seen at the output of the equalizer in the receiver (assuming one is needed to open they eye, e.g., an equalizer would not typically be needed on a $B_{99}$ channel). In accordance with some embodiments of CPM-PAM and CPM-QAM processing, the receiver estimates the branch the metrics by sampling m(t) only once per symbol interval at a judiciously selected time. This greatly simplifies the receiver structure. Using the specific example of FIG. 4, then, it is best to adjust the symbol timing to sample the received waveform in each channel at one half of a symbol time after (or before) the actual symbol times (e.g., 1.5T, 2.5T, ... ). This increases the measured distances between the estimated branch metrics. In FIG. 4, note that four paths are possible at 1.5T, two that cross through zero, one that passes through +1, and another that passes through -1. The Viterbi decoder can distinguish between the paths at +1 -1 by using the current branch metrics and can distinguish the two paths that cross through zero using the measured path metrics from one symbol interval earlier. Thus CPM-PAM and CPM-QAM receiver structures in general can sample any SSB-FM waveform at one or more sampling points per sampling interval at one or more judiciously selected times, and use these points to estimate the branch metrics of equations (31)-(32), resulting in simple and practical receiver structures. For example, to CPM-PAM process the waveform in FIG. 9, it might be desirable to take two samples per interval, one at kT and one at kT-T/2.

Recall from the discussion of FIG. 16, the signal m(t) is preferably designed to keep the signal-energy-normalized distance between m(t)'s state values or other selected values as large as possible. Especially when CPM-PAM and CPM-QAM techniques are applied, it is desirable to maximize this normalized distance as much as possible. Even when no TCM encoding is used, CPM-PAM and CPM-QAM will preferably use as many symbol intervals as there are in the path memory length of the Viterbi decoder to make decisions, and in a suboptimal design, as many symbol intervals as there are between merging events. The analysis of exemplary embodiments I, II, III, and IV show that SSB-CPM, QM-CPM and MQM-CPM signals can be constructed that have between 10 and 56 dB of added performance gain in many practical cases. In CPM-PAM and CPM-QAM we trade some of those dB back for simplicity in the receiver implementation. The net effect is we obtain simple and practical receiver structures to process many types of SSB-FM signals.

Various types of equalizer structures may be used with the present invention to "open the eye" of the received CPM-PAM and CPM-QAM signals. A fractionally spaced equalizer may be used to process points in between the symbol times, or a symbol-spaced equalizer may be used that only processes samples spaced at the symbol interval. Only a feed-forward linear equalizer structure may be used, or a combination of a feed-forward linear equalizer and a decision feed-back equalizer may also be employed to implement a nonlinear equalizer structure. Likewise, transversal FIR filter structures may be used, or lattice based adaptive filter structures may also be used to implement one or more adaptive filter portions of the equalizer. If trellis coded modulation is used to encode the CPM-PAM or CPM-QAM signal, then delayed decision techniques may be employed to integrate the equalizer with a trellis decoder. Delayed decision techniques typically use the decisions out of a cascaded trellis encoder to generate a delayed error signal that is used to update a set of adaptive equalizer coefficients. Even when TCM is not used, delayed decisions are typically used because of the inherent trellis structure in m(t). Other techniques based on prediction and interleaving are known that allow a decision feedback equalizer to be cascaded with a trellis decoder. All such embodiments are options that may be selected to use with the present embodiment.

CPM-PAM and CPM-QAM processing techniques preferably make use of an equalizer to separate the signal amplitude levels at the symbol times in the associated trellis diagram (e.g., FIGS. 4, 9, 11, and 12). For example, the receiver structures of FIG. 2 and FIG. 7 can be used with or without the trellis decoders 82, 84. In such embodiments, the low pass filter/equalizer blocks 78, 79 (or in the channel interface 60 or 1060) make use of an adaptive equalizer to separate the pulse amplitude levels or the quadrature amplitude levels. In such structures, the equalizer can be thought of as an alternative structure for computing the branch metrics. At the symbol sample times and/or at other selected times, the branch metric can be computed as the distance away from one or more respective pulse amplitude levels in a symbol interval. The equalizer processes the received signal to maximize the separation at these sample times. The trellis structure can then optionally be used to find the most likely path based on these simplified branch metrics, much like ordinary SSB-FM, TCM-PAM and TCM-QAM using Viterbi decoding. The main difference is the bandwidth required to carry the trellis signals is much lower in CPM-PAM and CPM-QAM than it is in their prior art PAM/QAM counterparts. As discussed earlier, any suitable TCM scheme can be used to improve the distance measure used in a CPM-PAM or CPM-QAM signaling scheme and the equalizer based processing can be used to improve the signal quality into the trellis decoder. Note that CPM-PAM and CPM-QAM can be derived form mapping a CPM waveform x(t) to a real valued signal m(t), or equivalently, from any other signal x(t) that has been mapped to the signal m(t), preferably with some form of interpolation between signal points in the signal constellation between symbol epochs in order to maintain achieve desirable spectral properties.

Figure 21:
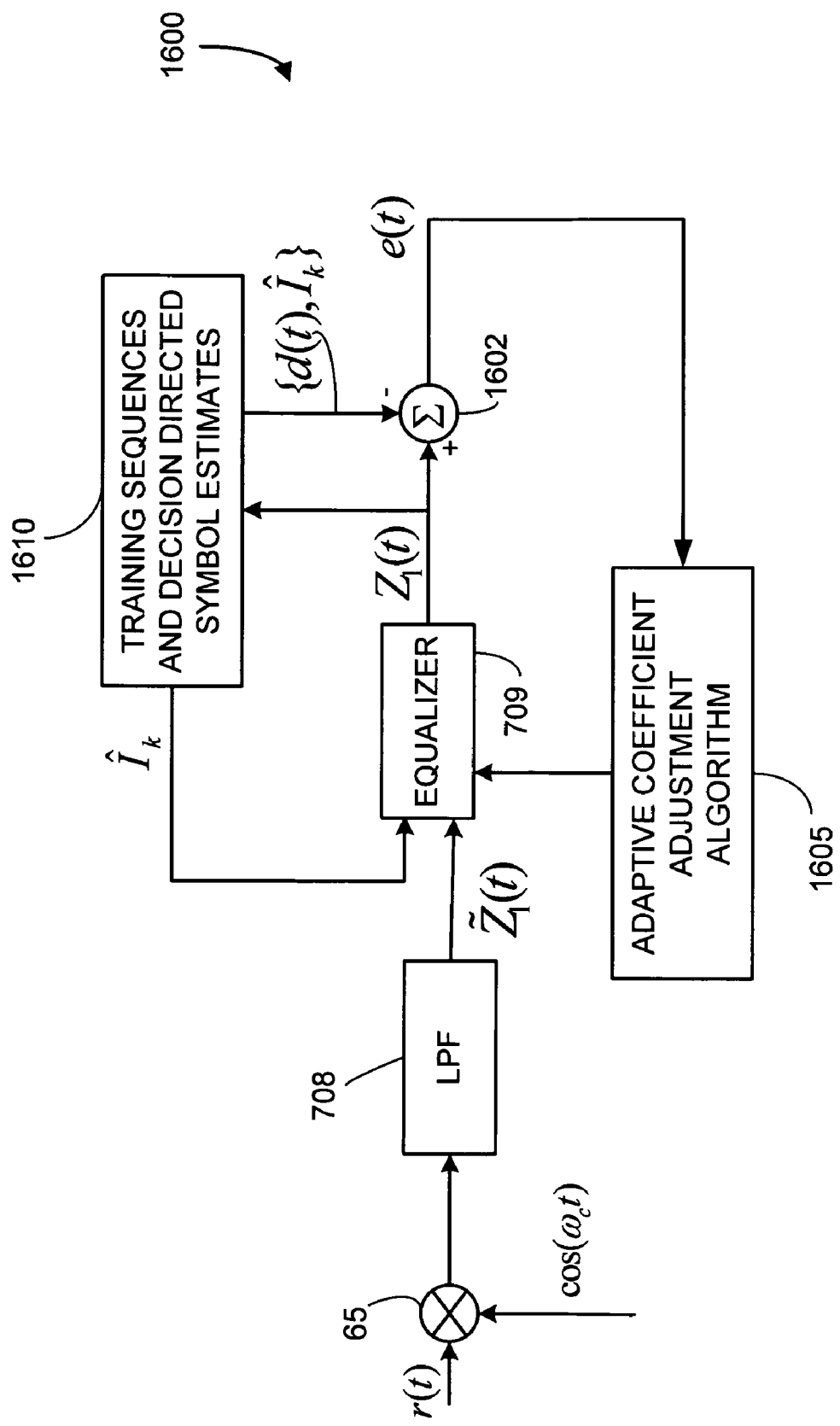
FIG. 21 is a block diagram representing equalizer structures and methods that can be used to improve trellis decoder performance and/or can be used to implement receiver structures that directly process CPM-PAM and CPM-QAM trellis signals.

Referring now to FIG. 21, an equalizer structure is shown for use in equalizing the in-phase path of any of the signals types discussed in this patent specification. For illustrative purposes only, the processing of the in-phase path the receiver of FIGS. 2 and 7 is shown. However, it should be noted that complex-valued processing may be performed where the output of mixer 65 is lowpass filtered and processed in an in-phase channel of an equalizer 709 and the output of mixer 70 is lowpass filtered and processed in a quadrature phase channel of the equalizer 709. In such embodiments, the equalizer 709 is adapted to jointly equalize both the real and complex channels and the adaptive equalizer coefficients are complex. However, for clarity of discussion, we focus on the version of the equalizer shown in FIG. 21.

The received signal r(t) is processed through the mixer 65 and the lowpass filter 708 to generate an in-phase input signal, $\tilde{Z}_1(t)$ that is fed into the adaptive equalizer 709 which can be of any of the equalizer types discussed above. The equalizer includes a set of adjustable parameters called coefficients. These coefficients are adjusted so that an output signal $Z_1(t)$ more closely resembles the transmitted signal, $m_1(t)$. That is, the coefficients of the equalizer 709 are adjusted to in accordance with an optimization strategy that causes the equalizer to map the in-phase input signal, $\tilde{Z}_1(t)$ to a signal that more closely resembles the transmitted signal, $m_1(t)$. Either a separate equalizer can be used in the quadrature phase path to map $\tilde{Z}_2(t)$ to a signal that resembles $m_2(t)$, or a single complex-coefficient equalizer can be used to jointly map both $\tilde{Z}_1(t)$ and $\tilde{Z}_2(t)$ to signals that more closely resemble the transmitted signals, $m_1(t)$ and $m_2(t)$. For the discussion below, we continue to focus on the in-phase only version of the equalizer.

The output of the equalizer 709 is routed to a summing junction 1602 that subtracts from the equalizer's output signal, $Z_1(t)$ a reference signal, d(t). At the symbol sampling instants, the value of the reference signal will preferably be equal to the transmitted symbol values as seen at the sample times in the trellis diagrams of FIGS. 4 and 9 (and/or the offset symbol times of FIG. 11). Depending on the mode of operation, at the symbol times, the value of d(t) may be equal to an estimated value of the transmitted "PAM symbol values", denoted $\hat{I}_k$. The output of the summing junction 1602 is an error signal, e(t), which, at the symbol times, is equal to the difference between $Z_1(t)$ and the estimated correct PAM symbol value, $\hat{I}_k$. At points between PAM states, d(t) can match other known values along a path in a symbol interval.

The reference signal, d(t), is generated in a block 1610 that generates training signals and/or makes symbol decisions and to the nearest PAM symbol level. In some cases, especially where TCM is used, the symbol decisions may be delayed due to trellis decoding, in which case delayed-adaptation algorithms as are known in the art may be used. The reference signal may include samples spaced at the symbol times to provide reference PAM levels based on hard or soft decisions, or be configured to process points along m(t)'s amplitude-trellis paths in between decision points in fractionally spaced embodiments. Any such embodiments are within the scope of the present invention.

In one type of embodiment, a start-up handshaking period is implemented where the transmitter sends known training signals in accordance with link and/or physical layer communication protocols used to allow the equalizer to adjust to a particular channel. In such cases, the block 1610 generates or reads from memory the known training signal and sends it to the subtraction input of the summing junction 1602. In such training, the error signal output of the summing junction 1602 is equal to the difference between $Z_1(t)$ and the transmitted CPM-PAM signal, at a specified sampling interval which may be fractionally spaced or symbol spaced. The error is then sent to an adaptive coefficient adjustment algorithm block 1605. The adaptive coefficient adjustment algorithm block 1605 may use any desired algorithm, to adjust the adaptive filter coefficients in the equalizer 709. The adaptation algorithm may use least mean squares (LMS), recursive least squares (RLS), a block algorithm like block LMS or block least squares, or block conjugate gradient, block Shanno, or any other suitable adaptation algorithm. The adaptive filter typically uses a finite impulse response (FIR) transversal or lattice filter structure, but IIR structures or even nonlinear structures like neural networks are contemplated as alternative embodiments.

While the equalizer can be used to merely improve the quality of the $Z_1(t)$ and $Z_2(t)$ for use in any of the receiver structures discussed herein, the improved $Z_1(t)$ and $Z_2(t)$ signals can also be used to make hard or soft (tentative) decisions at the sample instants and/or other selected times in a symbol interval. As such, PAM/QAM-like processing may be used to recover the transmitted information sequence. This type of processing leads to various types of low cost, practical receiver implementations. Also, the ability to make hard or soft decisions at the sample instants is useful in transform domain communication schemes like discrete multitone and other forms of OFDM systems.

XI. Dense Multi-carrier Modulation (DMCM)

So far we have developed a class of bandwidth-efficient modulation techniques to modulate a single carrier, which we have referred to as SSB-FM. The specific examples we have given so far for SSB-FM type signals includes SSB-CPM, DDR SSB-CPM, QM-CPM, MQM-CPM, CPM-PAM, CPM-QAM, and TCM versions thereof. In this section we develop a class of multi-carrier type communication systems that use one or more selected SSB-FM modulation types to bandwidth efficiently (i.e., densely) modulate a collection of carriers to create a dense multi-carrier modulated (DMCM) system. The SSB-FM signals of the present invention are able to much more densely pack information into the bandwidth provided by each carrier, and this allows us to develop multi-carrier systems whose net channel capacity is significantly increased.

Figure 22:
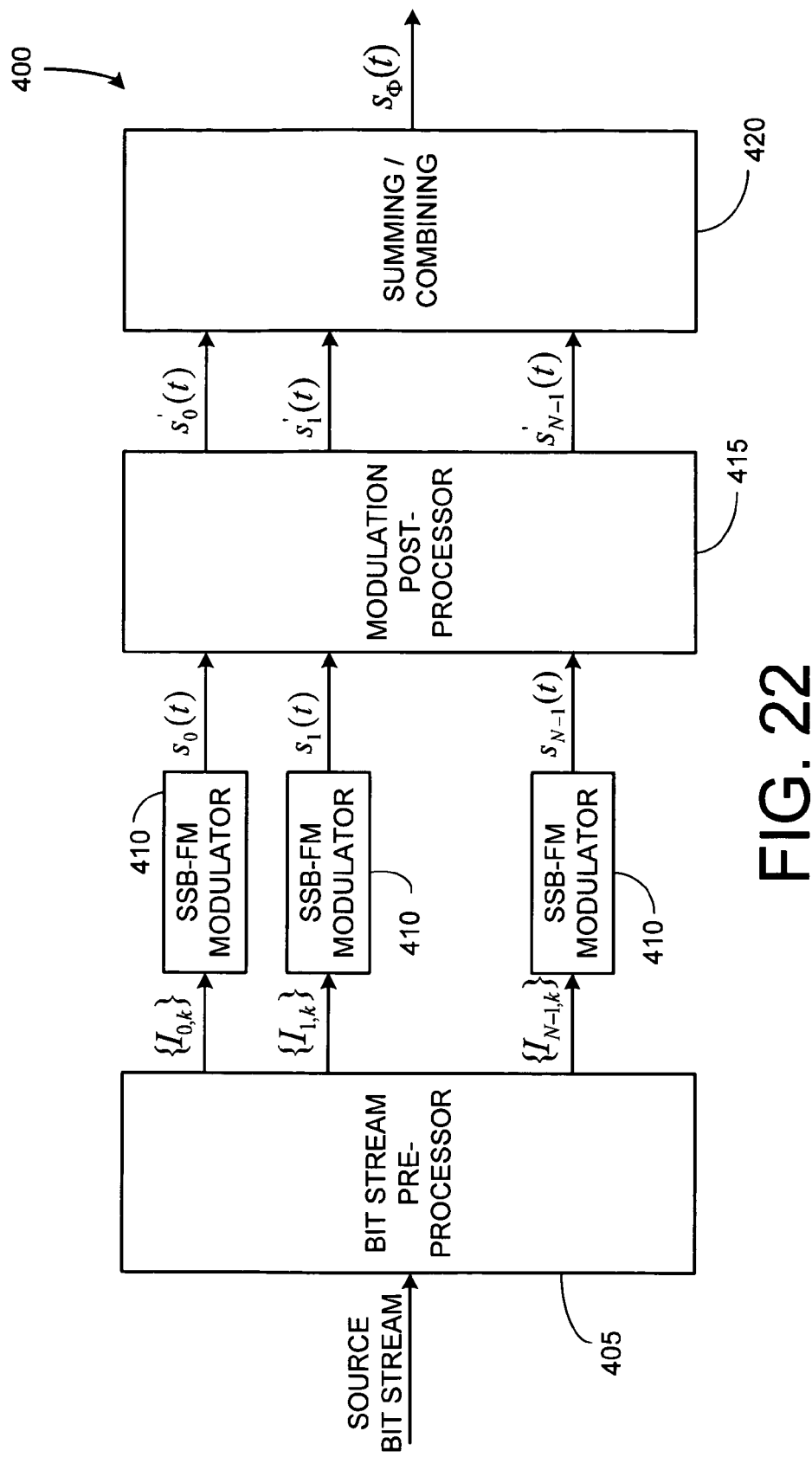
FIG. 22 is a block diagram representing an exemplary dense multi-carrier (DMCM) modulator/transmitter structure.

Turning now to FIG. 22, a modulator 400 for generating a dense (SSB-FM) multi-carrier signal is illustrated in block diagram form. The modulator 400 receives a bit stream for multi-carrier modulation. This bit stream is sent to a bit stream preprocessor 405 which separates the bit stream into a set of parallel sub-streams, $I_{0,k}, \ldots, I_{N,k}$. The bit stream preprocessor 405 may optionally also perform other optional functions, such as addition of a link layer framing structure and supporting framing bits, scrambling, interleaving, permutation, and FEC (e.g., Reed-Solomon, block, convolutional, turbo). Similarly, the bit stream preprocessor 405 may introduce coding relationships into the bit stream as a whole, or may optionally choose to code each substream separately, for example by adding trellis coded parity bits individually trellis encoding each parallel substream. The bit stream preprocessor 405 may optionally introduce a controlled amount of cross correlation between the sequences of the adjacent substreams, for example using a set of multi-input multi-output convolutional encoders, vector precoders, or any other means that introduces controlled amounts of cross correlation between information sequences in different substreams. This allows receiver structures to either process individual substreams separately, or to employ transform domain or matrix-vector algorithms in the receiver that treat the received set of parallel multi-carrier signals as a single vector-valued signal. Likewise, this allows the receiver to process sets of channels such as a window (possibly a sliding window) of adjacent channels as a group. Instead of viewing co-channel interference as noise, the co-channel interference may be estimated and its effect reduced or eliminated. A receiver structure can decode a channel by taking into account information decoded on adjacent channels and using this information to subtract noise out of branch metric terms. Alternatively the receiver can perform joint Viterbi decoding of more than one channel at a time, again reducing the effect of co-channel interference.

The outputs of the bit stream preprocessor 405 are fed to a collection of parallel SSB-FM modulators 410. Depending on the particular embodiment, any one or more of the aforementioned SSB-FM modulation techniques may be used to implement the SSB-FM modulators 410. To illustrate the general approach by way of example, consider a specific embodiment where QM-CPM is used in each one of the SSB-FM modulators 410. In accordance with multi-carrier modulation techniques, the $i^{th}$ information sequence, $I_{i,k}$ is modulated onto an $i^{th}$ carrier frequency $\omega_i$. For example, if 256 carriers are used, then 256 information sequences are mapped onto 256 carriers, $\omega_i$, for $i=0, \ldots, 255$. Also, if negative frequencies are considered, then, for example, $2N=512$ carriers are used in all. In many cases one or more of these carriers may be used to support one or more pilot channels to carry carrier phase reference information, symbol timing reference information, frequency reference information, or any other type of communication protocol signaling such as link layer signaling for framing and the like.

To continue with the specific example, then, assume the $i^{th}$ SSB-FM modulator is implemented to generate an $i^{th}$ 4-ary QM-CPM waveform modulated to its respective carrier frequency, $\omega_i$. In this exemplary system, there are $N=256$ channels, one of which is used to carry a carrier phase reference signal and another used to carry a symbol timing reference signal. Assume $2N=512$ carriers in all are used if the negative frequencies are counted. Because the actual transmitted signal will be a real-valued signal, the negative frequency carriers have the complex conjugate of their corresponding respective positive frequency. Hence a total of 256 SSB-FM modulators are used, minus possibly for the reference channels, depending on how the reference channels are embodied, and minus possibly the channel at the zero frequency or other lower frequencies in wireline applications where DC is blocked or some of the lower bandwidth is used to carry plain old telephone service (POTS) signals.

The SSB-FM modulators 410 may individually generate either complex-valued signals (e.g., SSB-CPM, QM-CPM, MQM-CPM), or may just generate real signals (e.g., CPM-PAM), such as by using equations (15) or (42). For example, we can modulate a collection of real-valued envelope signals generated using equation (42) onto a corresponding set of carriers to generate a real-valued multi-carrier signal according to:

$$s_{IP}(t) = \sum_i \sum_j a_{i,j} \cos(\alpha_{i,j}(t) + \beta_{i,j}) \cos(\omega_i t). \qquad (65)$$

Now the SSB-CPM, QM-CPM, and MPM-CPM techniques can be applied at the multi-carrier signal level. That is, we can generate an independent quadrature-phase signal using:

$$s_{QP}(t) = \sum_i \sum_j b_{i,j} \cos(\varphi_{i,j}(t) + \theta_{i,j}) \sin(\omega_i t), \qquad (66)$$

or we can generate a dependent quadrature-phase signal using, $$\begin{aligned} s_{QP}(t) &= H\left[\sum_i \sum_j a_{i,j} \cos(\alpha_{i,j}(t) + \beta_{i,j}) \cos(\omega_i t)\right] \\ &= \sum_i \sum_j a_{i,j} H[\cos(\alpha_{i,j}(t) + \beta_{i,j}) \cos(\omega, t)] \end{aligned} \qquad (67)$$

where $H[\circ]$ denotes the Hilbert transform operator. Then we add, subtract, or otherwise combine the in-phase and quadrature phase multi-carrier signals, $s_{IP}(t)$ and $s_{QP}(t)$ to obtain a multi-carrier version of SSB-CPM or QM-CPM or MQM-CPM. For example, we form $s_\Phi(t) = s_{IP}(t)\cos(\omega_c t) \pm s_{QP}(t)\sin(\omega_c t)$.

Hence we can use multi-amplitude signaling of equation (42) to generate an efficient CPM type of OFDM or multi-carrier signal, and can then I/Q multiplex two such signals onto a single carrier, or can apply SSB type processing to generate an SSB-OFDM signal. As discussed earlier, while equation (42) can be used to generate CPM signals, any SSB-FM technique that maps a complex-valued signal onto a real-valued envelope signal with a trellis structure that allows the original information sequence to be recovered can be used as well. Therefore when equations (65) and (67) are added, SSB-CPM-OFDM results. If a variant of equation (42) is used to generate the SSB-FM real-valued envelope signal, then non-CPM forms of SSB-OFDM result. Similarly, if PSK is used as a baseband modulation with interpolation between phase states, different forms of SSB-OFDM can be generated that do not rely on equation (42). Hence all such embodiments that generate SSB-OFDM are within the scope of the present invention.

Independent of whether the SSB-FM modulators 410 each generate real-valued signals or complex signals, the outputs each of the SSB-FM modulators 410 are next routed to an optional modulation post-processor 415. The modulation post-processor 415 need not be present in all embodiments, but may be included to improve performance by introducing controlled cross correlations between channel elements or alternatively, to eliminate cross coupling between channels. The outputs of the modulation post-processor 415 are sent to a summing/combining device 425. The output of the summing device is a channel signal, $s_\Phi(t)$. In some embodiments, the channel signal, $s_\Phi(t)$, is a baseband signal that can be D/A converted and sent, for example, onto a DSL modem channel or a cable modem channel. In other cases the channel signal, $s_\oplus(t)$, may need to undergo further up-conversion for transmission via an antenna for wireless propagation. When each SSB-FM modulator 410 generates a complex valued signal, each complex-valued sub-band signal is modulated onto respective carrier. In the frequency domain, this generates positive and negative frequency images. If the SSB-FM modulators are used to collectively generate a real-valued multi-carrier signal, then equations (65) and (67) can be used to form an SSB-OFDM/SSB-DMCM type signal as discussed above.

The modulation post-processor 415 may be embodied as a polyphase filter bank whose filters have sharp skits to reduce out-of-band sidelobe components from each SSB-FM signal. This filter bank may be selected to minimize in-band distortion in each channel but to keep the $i^{th}$ channel from interfering with the other channels, and especially the adjacent channels, i.e., the $(i-1)^{st}$ and the $(i+1)^{st}$ channels. As discussed previously, joint estimation techniques may also be used where adjacent channel interference is estimated and its effect reduced. Examples of filter bank structures include standard analysis/synthesis filter banks, FFT (fast Fourier transform), DCT (discrete cosine transform), QMF (quadrature mirror filter), pseudo-QMF, and cosine-modulated filter banks. Other transform domain subband decomposition approaches like wavelet based filter banks and filter banks made up of various orthonormal basis sets may also be used. For example, the present invention can produce specific examples of embodiments by mixing the SSB-FM techniques herein with the methods and structures of U.S. Pat. No. 6,947,509 and U.S. Pat. No. 6,662,367, both of which are incorporated herein by reference, but only to the extent that they be used to disclose specific additional embodiments constructed direct combinations of the methods and structures disclosed in present application with the methods and structures described in the '509 and '367 patents. These patents can be used to derive both transmitter and receiver embodiments for DMCM systems in accordance with aspects of the present invention.

The modulation post-processor 415 may alternatively be embodied as a set of cross-talk cancellation filters used to generate sidelobe-canceling signals to be subtracted from a selected adjacent channel signal. This way, each SSB-FM signal need not be filtered. Instead the known cross-talk into $(i-1)^{st}$ and the $(i+1)^{st}$ channels is generated using the known transmitted information in the $i^{th}$ channel. This sidelobe/cross talk information is used to generate a known sidelobe-canceling signal that can then be subtracted from an adjacent channel to reduce or eliminate the effect of cross talk. For example, the bandwidth of each channel is a 96% bandwidth channel, the cross talk effect will not appreciably affect channels beyond the adjacent channels.

The modulation post-processor 415 may alternatively introduce a known amount of cross correlation into adjacent channels. For example, modulation post-processor 415 could cause adjacent channel signals to become orthogonalized, so that in the receiver, the post-processed signals will be separated by an orthogonalizing filter bank or branch metric computation, even though a non-trivial amount of overlap in the frequency domain between adjacent channels existed in the transmitted signal.

In some types of multi-carrier systems, especially OFDM (orthogonal frequency division multiplexed) systems, the channels may overlap in such a way that the side lobes of a given channel are allowed to leak into adjacent channels because the signals in the adjacent channels are chosen to be orthogonal. That is, upon separation in a receiver structure, the channel signals will be separable because the sidelobes are properly chosen to cancel out upon filtering though a polyphase type filter bank in a receiver. Such embodiments are also contemplated by the present invention and are desirable. Further discussion about certain embodiments of receiver structures that take advantage of the orthogonality of adjacent channel signals that have overlapping bandwidth is discussed in connection with FIG. 23.

Figure 23:
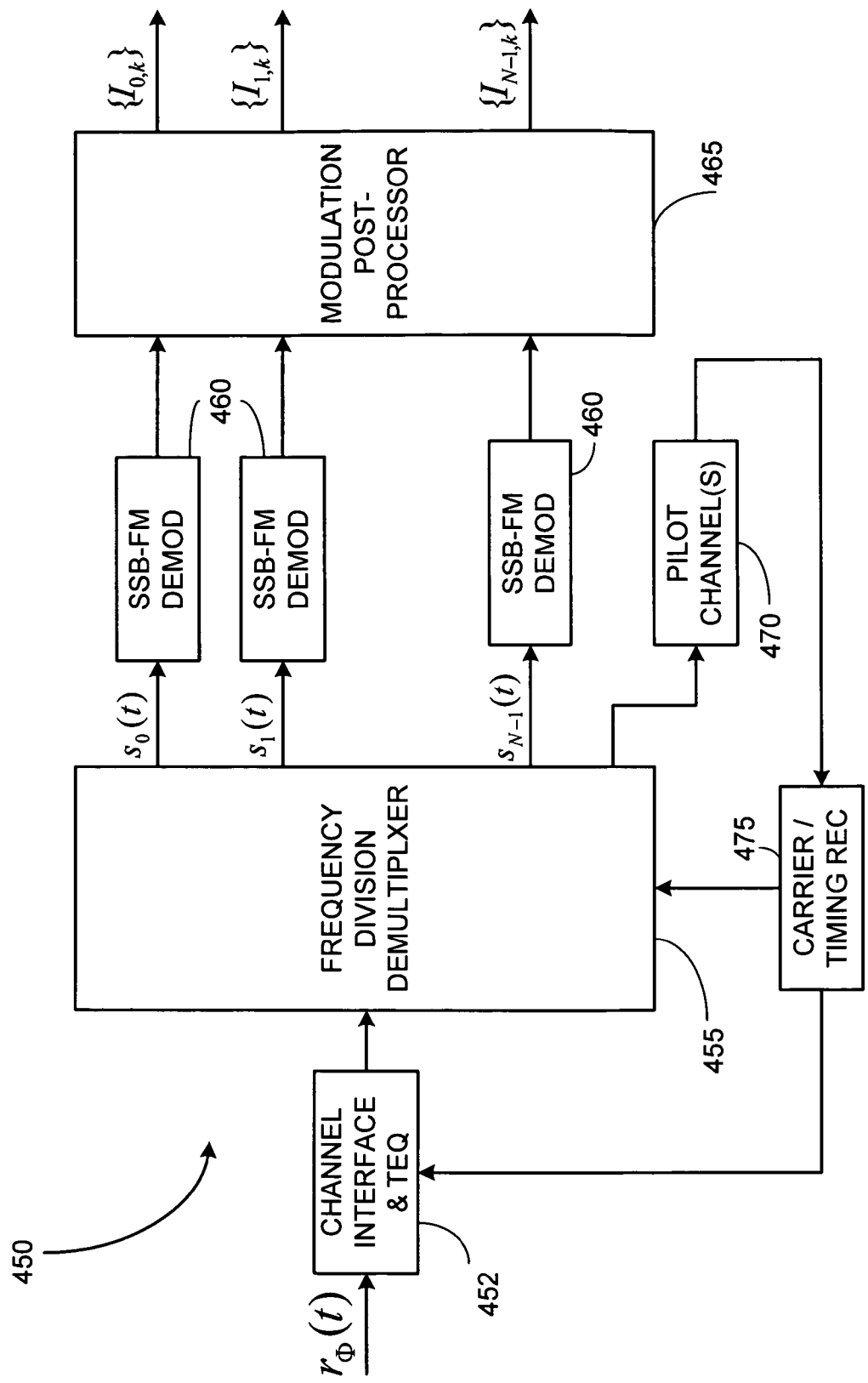
FIG. 23 is a block diagram representing an exemplary dense multi-carrier (DMCM) demodulator/receiver structure.

Turning now to FIG. 23, a demodulator 450 for demodulating a dense SSB-FM multi-carrier signal is provided in block diagram form. A signal r(t) is received from a channel. The signal $r_\oplus(t)$ is preferably a received-signal version of the signal $s_\oplus(t)$ generated from a modulator structure or method as per the modulator 400 of FIG. 23. The job of the demodulator 450 is to recover the transmitted information sequences, $I_{0,k}, \ldots, I_{N,k}$ by processing the received signal, $r_\oplus(t)$. The signal $r_\oplus(t)$ is first applied to a channel interface block 452 which may optionally include a time domain equalizer. The channel interface block 452 preferably includes a wireline or wireless channel interface block, an A/D converter, and optionally is responsive to carrier and/or symbol timing recovery so that data may be properly time-aligned for further processing. The output of the channel interface block 452 is applied to a frequency division demultiplexer block 455. In some embodiments, especially filter bank type receivers, carrier and symbol timing recovery may be performed in the individual SSB-FM demodulators 460, but the pilot channel is believed to be a more efficient way to achieve the same result. A plurality of demultiplexed channel signals, $s_0(t)$, $s_1(t), \ldots, S_{N-1}(t)$, are output from the frequency division demultiplexer and are sent to a corresponding respective set of SSB-FM demodulators, 460. One or more of the channel outputs of the frequency division demultiplexer may be sent to one or more corresponding respective pilot channel processor modules, 470. The outputs of the one or more pilot channel processing modules are fed back to a timing lock circuit 475 for carrier phase locking and/or symbol timing recovery. The output of the timing lock circuit is directed to one or more of the channel interface circuit 452 and the frequency division demultiplexer 455. The outputs of the SSB-FM demodulators 460 are fed to an optional modulation post processor module 465. The modulation post processor module 465 delivers a set of recovered information symbols $I_{0,k}, \ldots, I_{N,k}$. The modulation post processor module 465 typically reverses the action of processing introduced by the bit stream pre-processor 405 in accordance with a physical layer and/or a link layer processing protocol.

The DMCM demodulator 450 may be embodied in many different ways. For example, each of the constituent SSB-FM demodulators 460 may be configured to demodulate any of the general class of SSB-FM signal types such as SSB-CPM, DDR SSB-CPM, MQM-CPM, CPM-PAM, CPM-QAM, and the like. The frequency division demultiplexer 455 may be implemented as a polyphase filter bank that splits a signal into a collection of equally spaced sub-bands. Preferably, a computationally efficient form of polyphase filter is used. In embodiments where such a polyphase filter bank is used, the SSB-FM demodulators may be of standard design, for example as shown in FIG. 2 or FIG. 7. Similarly, the frequency division demultiplexer 455 may perform per-channel weighting or complex-valued weighting to implement a frequency domain equalizer function as is known in the multi-carrier arts, for example, in ADSL DMT (asymmetric digital subscriber line discrete multitone) systems. Also, carrier and symbol timing recovery are preferably handled jointly by the one or more pilot channel processors to offload carrier and symbol timing recovery requirements from each of the SSB-FM demodulators 460.

U.S. Pat. No. 6,298,361 is incorporated by reference herein, but only for the purpose of enabling a class of multi-carrier systems that use a polyphase filter bank for signal separation for use with certain DMCM embodiments of the present invention. That is, an aspect of the present invention involves incorporating any of the filter bank embodiments of U.S. Pat. No. 6,298,361 with any of the DMCM embodiments to arrive at specific combination embodiments. Hence certain embodiments of the present invention involve using the techniques of U.S. Pat. No. 6,298,361 to provide specific polyphase filter structures for use in DMCM signal separation. Any embodiments derived from combining the present disclosure with that of U.S. Pat. No. 6,298,361 is an embodiment of the present invention. Other types of efficient embodiments of polyphase filter banks can be used with equal success, but combinations built around the '361 patent are provided to disclose particular specific exemplary embodiments.

In another type of embodiment, the frequency-division demultiplexer is implemented by computing a transform of the received signal $r_\Phi(t)$ which may have undergone some preprocessing such as down conversion and equalization. In one type of embodiment, the frequency-division demultiplexer may be implemented using an selected signal transformation that decomposes $r_\Phi(t)$ into a set of quantities that can be used for the branch metrics (31)-(32) for a given symbol interval in each channel. This type of embodiment allows us to transform a time window of the $r_\Phi(t)$ to a set of decision statistics, much like a TCM encoded version of ADSL DMT. The FFT or other selected transform values do not generally represent signal points, but are used instead as correlation sub-values in order to efficiently compute the needed branch metrics.

Another type of embodiment eliminates the frequency division demultiplexer 455 all together. In this type of embodiment the set of SSB-FM demodulators 460 can compute the branch metrics of equations (31)-(32), or approximations thereof, using frequency-specific branch transition signals, $m_{i,uv}(t)$, where i is the channel number. That is, when the quantities of equation (31) are computed or approximated in each channel, the $m_{i,uv}(t)$ signal is frequency-specific and the correlation of equation (32) is frequency-selective. That is, the correlations of equation (32) in the branch metric computations tend to separate. This is because the correlations of equation (32) are orthogonal or approximately orthogonal. In accordance with an aspect of the present invention, frequency separations and other parameters such as signal shapes and limits of integration times used in equations (31)-(32) (e.g., symbol timing shifts) of the signals $m_{i,uv}(t)$ are selected to increase orthogonality between the branch transition signals in adjacent channels. This way, the branch metrics for each channel can be computed directly from the received signal output from the channel interface block 452. No filter bank nor a signal transform like an FFT is needed. The received signal, $r_\Phi(t)$, is correlated directly with different template functions that serve to orthogonalize as a part of the branch metric computation itself. However, pre-filtering or pre-transforming can often reduce the load relative to this type of embodiment.

Bandpass sampling represents a preferred way to eliminate a filter bank operation or a signal transformation operation to thereby eliminate the frequency domain demultiplexer 455. Bandpass sampling, as is known in the art, allows a bandpass signal to be sampled below the Nyquist rate, and this form of sampling has the effect of mixing the bandpass signal down to baseband. One such bandpass sampling system is described in U.S. Pat. No. 5,841,814 which is incorporated herein by reference, but only to the extent to provide enabling exemplary embodiments made up of combinations of the present disclosure with any of the disclosure of the '814 patent. Other types of bandpass sampling systems can also be combined and used to bandpass sample individual channels of the received signal, $r_\Phi(t)$, and all such embodiments are within the scope of the present invention. In such embodiments, any given ones (or all) of the individual channels contained in the received signal, $r_\Phi(t)$ are bandpass sampled at appropriate rates to downconvert each channel to baseband or a selected intermediate frequency. Then at baseband (or the selected IF) an optional filtering operation is performed and then the branch metrics are computed for that channel. Alternatively, the branch metrics can be computed directly using the (down-converted) bandpass sampled signal by integrating any needed filtering into the branch metric computations. In this type of embodiment, the mixers in the SSB-FM receivers are replaced by or assisted by bandpass sampling. The bandpass sampling may be selected to convert a channel to an IF instead of baseband is to allow the I and Q channels to be treated with mixing, but the techniques of the '814 patent allow the I and Q signals to be processed using bandpass sampling, and such processing is preferred.

In a similar type of embodiment, no frequency division demultiplexer 455 is used, but the mixers and low pass filters of the SSB-FM demodulator (e.g., of FIG. 2 and FIG. 7) that operates to pass the $i^{th}$ channel signal will reject all the other channel signals. That is, each SSB-FM demodulator already has built into it all it needs to reject all the other channel signals, so the frequency division demultiplexer 455 can be eliminated in this type of embodiment as well.

Another alternative embodiment is to apply vector-based processing in the frequency division demultiplexer block 455. The vector processing can be used to allow either channel coding or cross-channel modulation to be used to deal with the effects of cross correlations among channels. An example of a form of vector processing is joint trellis coding between channels or matrix based vector precoding to eliminate the need or reduce the need for a time-domain and/or frequency domain channel equalizer. In fact, any of the vector precoding techniques of U.S. Pat. No. 6,597,745 may be integrated for use with the present system. Only for the purpose of enablement of embodiments of the present invention that combine aspects of the vector precoding techniques as discussed in of U.S. Pat. No. 6,597,745, U.S. Pat. No. 6,597,745 is incorporated herein by reference.

XII. SSB-FFT-OFDM, QM-FFT-OFDM and Recursive Modulation

As discussed previously, one way to generate a real-valued envelope signal is to start with a conjugate-symmetric vector of complex signal points and to inverse transform the vector. In applications like ADSL DMT (e.g., G.991, G.992) an IFFT (inverse fast Fourier transform) is used to compute a real-valued signal, m(t). For example, 256 QAM constellation points to be transmitted are loaded into a sub-vector of 256 elements and their complex conjugates are loaded in reverse-order into another 256-element sub-vector. The two sub-vectors, when concatenated make up a 512-element vector. When the IFFT of this 512-element vector is computed, a 512-point real-valued multi-carrier signal, m(t), results. In this section we discuss transmitter and receiver structures for SSB and QM modulation of such a real-valued signal and discuss a generalization of this notion for passband signals.

In systems RF systems like WiFi and WiMAX, the time domain signal is complex-valued and I/Q modulation techniques are used to obtain double the data rate. Double data rate performance is achieved in RF systems by eliminating the conjugate symmetry constraint to thereby transmit double the number of independent QAM points per transmitted signal vector. When the IFFT is computed, a complex-valued signal results instead of a real signal. The real and imaginary components of this time-domain complex-valued signal are respectively modulated in the I- and Q-channels of an I/Q modulator. In some systems, it may be advantageous to make the data in the I- and Q-channels separable and independent. It may also be advantageous to send an SSB version of FFT-OFDM.

Figure 24A:
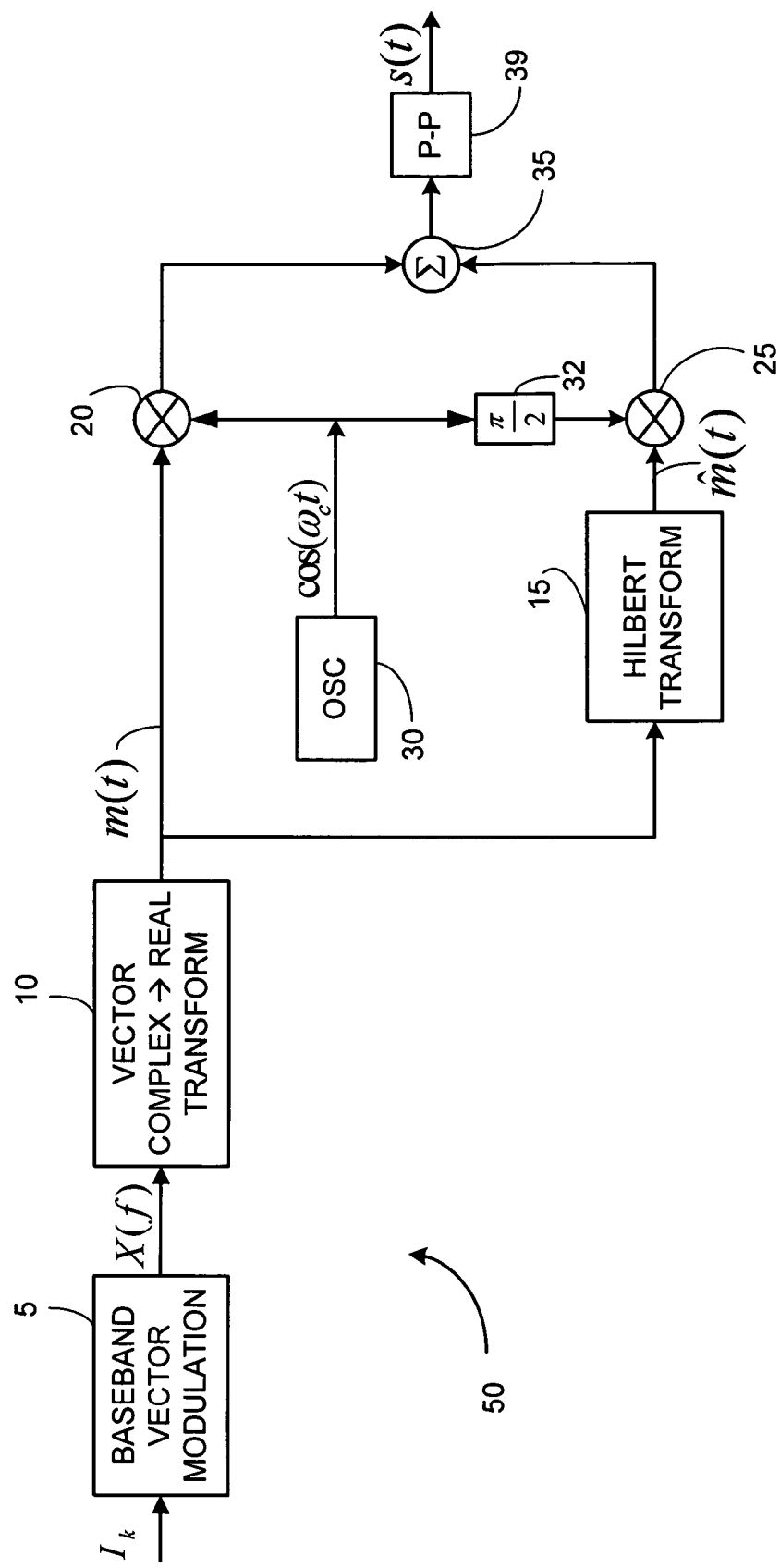
FIG. 24a is a block diagram representing an SSB-FFT-OFDM modulator structure.

Turning now to FIG. 24a, a transmitter structure is shown that is used to generate an SSB-FFT-OFDM signal or other type of similar SSB-bandwidth reduced multi-carrier signal. An information sequence, $I_k$, is applied to a baseband vector modulator 5. Different embodiments of the baseband vector modulator can generate various forms of complex-valued signal vectors. In a preferred embodiment the vector is maintained in a conjugate-symmetric form and is loaded with QAM signal points similar to ADSL DMT as discussed above.

The complex valued signal vector X(f) is then applied to a vector complex-to-real transformer 10. The vector complex-to-real transformer 10 preferably uses a mapping such as the IFFT to derive a message signal, m(t). Other mappings such as m(t)=IDCT(x(t)) can be used with equal success, if, for example, the baseband vector modulator 5 generates a real-valued vector signal, which is an alternative type of embodiment The output of the vector complex-to-real transformer 10 is sent to a Hilbert transformer 15 which generates a Hilbert-transformed message signal m̂(t). The Hilbert transformer may be implemented using any of the techniques described herein above. The output of the vector complex-to-real transformer 10 is also routed to a mixer 20 where it is mixed with a carrier signal $\cos(\omega_c t)$ that is generated in an oscillator 30. The output of the oscillator 30 is applied to a phase shifter 32 to generate a quadrature phase carrier signal, $\sin(\omega_c t)$ which is applied to a mixer 25 along with the output of the Hilbert transformer 15. To generate an upper sideband signal, the output of the mixer 20 and the output of the mixer 25 are routed to a summing junction 35 where a subtraction is performed, and the output of this subtraction is provided to a post-processing block 39 to produce s(t) in accordance with equation (19) above. In addition to any amplitude scaling performed in the block 39, the post processing 39 may involve passing the SSB signal through a pulse shaper, a filter, and/or a limiter. The optional post processing may alternatively be performed individually in the I- and Q-channels. To generate the lower sideband, the summing junction 35 performs an addition operation instead of a subtraction. Hence the SSB modulator structure 50 can generate either the upper or lower sideband using equation (18). Also, an amplitude scale factor, A, may be applied to scale the transmitted signal in accordance with equation (18). Instead of applying SSB-CPM in each subband, SSB processing is applied to the entire (real-valued ADSL type) FFT-OFDM multi-carrier signal to provide SSB bandwidth compression at the multi-carrier signal level.

The modulator structure of FIG. 24a is a vector version of FIG. 1. Like reference numerals were used to point out the similarities. Likewise, the SSB receiver structure of FIG. 2 can be used as an FFT based SSB multi-carrier receiver. The main difference is that the trellis decoder 90 is replaced by an FFT based OFDM receiver structure. The version of FIG. 2 discussed above where only the I-channel is processed to avoid the need to compute the inverse Hilbert transform in the receiver applies in the multi-carrier case as well. Another modification is that the channel interface and synchronizer can make use of one or more pilot channels to derive carrier and symbol timing recovery. Hence we use this discussion and FIG. 2 to illustrate the FFT based SSB multi-carrier receiver structure and method.

Using the QM-CPM concept, we can transmit two real-valued multi-carrier signals simultaneously in the same bandwidth by multiplexing them onto a pair of quadrature-phase carriers, $\cos(\omega_c t)$, $\sin(\omega_c t)$. That is, instead of mapping m(t) and m̂(t) onto the cosine and sine carriers as per FIG. 24a, we transform two separate information streams into real-valued multi-carrier signals, $m_1(t)$, $m_2(t)$ and then modulate these two real-valued multi-carrier signals onto cosine and sine carriers as per FIG. 24b.

Figure 24B:
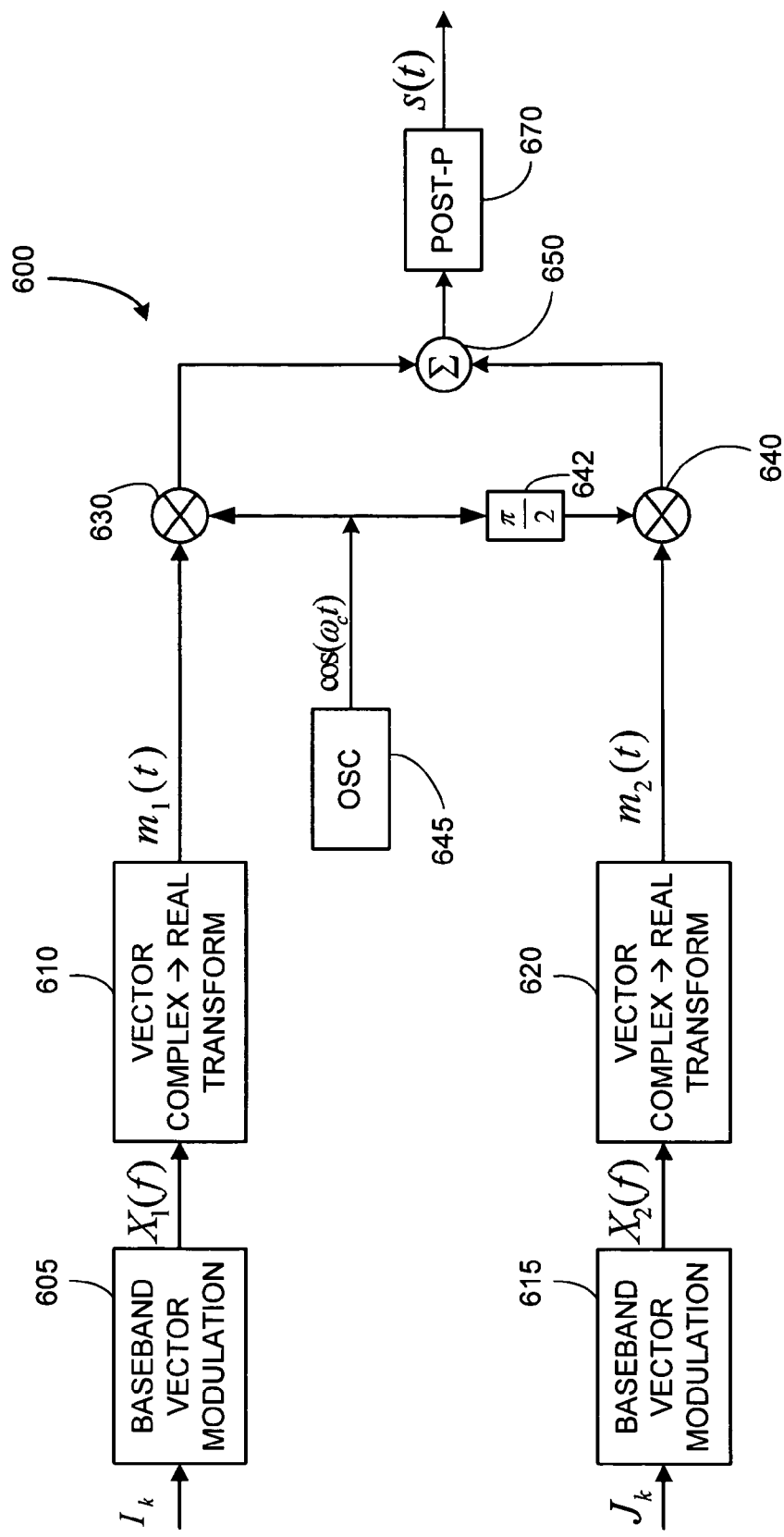
FIG. 24b is a block diagram representing an efficient QM-FFT-OFDM modulator structure.

In the embodiment of FIG. 24b, two information sequences, $I_k$, $J_k$ are modulated in baseband modulators 605, 615 in accordance, for example, with the conjugate-symmetric QAM modulation method described above to generate two complex-valued baseband vector signals $X_1(f)$, and $X_2(f)$. Each of these complex-valued baseband vector signals are then mapped via complex-to-real transformation blocks 610, 620 to real-valued multi-carrier signals, $m_1(t)$, $m_2(t)$, for example, by computing the IFFT of each of $X_1(f)$, and $X_2(f)$. While we can time shift the two signals $m_1(t)$, $m_2(t)$ as done in FIG. 6, we show in FIG. 24b a version where no time shift is applied. The real-signal outputs of the vector transforms 610 620 are then respectively modulated onto in-phase and quadrature-phase carriers in mixers 630 and 640. These mixer signals are then added together in summing junction 650 to produce an output signal. This is provided to an optional post processor 670 which applies optional amplitude scaling to produce the output of equation (37) with or without the time shifting. In addition to any amplitude scaling performed in the optional block 670, the post processing may involve passing the output signal through a signal shaper or post filter. The post processing may alternatively be performed individually in the I- and Q-channels, for example, prior to mixing by the mixers 630, 640.

The modulator structure of FIG. 24b is a vector version of FIG. 6. Like reference numerals were used to point out the similarities. Likewise, the QM receiver structure of FIG. 7 can be used as an FFT based QM multi-carrier receiver. The main difference is that the trellis decoders 82, 84 are replaced by FFT based OFDM receiver structures. Another modification is that the channel interface and synchronizer can make use of one or more pilot channels to derive carrier and symbol timing recovery in each of the I and Q channels, or this pilot function can be shared between the two because the carrier and symbol timing will preferably be the same or shifted but fixed in the two channels. Hence we use this discussion and FIG. 7 to illustrate the FFT based QM multi-carrier receiver structure and method.

Various alternative embodiments of SSB-FFT-OFDM and QM-FFT-OFDM may be constructed. Different modulation types beside QAM may be used and different types of vector transformations may be used. For example, the complex valued signal vector X(f) can be real-valued and use and IDCT instead of an IFFT. Time domain equalizers and frequency domain equalizers may be used, and various pilot channel schemes and bit loading schemes may be used. Any such variations are within the scope of the present invention. Also, any variations of any of the schemes discussed in this application that apply to FFT-OFDM may be used without the need to restate all those variations here. For example, many variations discussed in connection with DMCM apply to FFT- OFDM and can be used to create alternative embodiments with added features, etc. The general idea of this section is to take an existing architecture that generates a real-valued multi-carrier signal and to use SSB or QM processing to improve performance.

The present invention allows sub-portions of an FFT-OFDM signal to be sent while using the SSB and QM approaches. For example, to send channels 27-43, a signal point vector could loaded with all zeros, except for channels 27-43, which would be loaded with the QAM constellation points to be transmitted in a particular symbol interval. Now the corresponding negative frequency entries are loaded with the complex-conjugates of the QAM values, and the IFFT computed. This approach maintains the conjugate symmetry needed to produce a real-valued multi-carrier signal in the time domain. Two such signals can be sent using QM-FFT-OFDM. For example, in point-to-multipoint RF applications like NLOS WiMAX, this allows certain stations to use a sub-portion of the bandwidth in a given TDMA time slot. This is a multiple access feature and is referred to as OFDMA. The use of QM-FFT-OFDM allows the real and imaginary parts to carry separate data streams, allowing another layer of signal separability for multiple access as well as other advantages.

The use of the QM and SSB techniques throughout this specification can be applied to generate a form of recursive modulation. For example, in FIG. 1 and FIG. 6, replace the blocks 5, 605 and 615 labeled "Baseband Trellis Modulation" with "Complex Baseband Modulator" and replace blocks 10, 610 and 620 labeled "Complex→Real Transform" with "Complex→Real I/Q Modulator." This defines SSB and QM recursive a tree structures of I/Q modulators. At each intermediate frequency, the two real-valued signals from the previous stage are modulated onto I- and Q-channels and combined (e.g., at 25, 650) to form another real signal that can be modulated onto the I- or Q-channel of a next stage in the modulation tree. A receiver structure is then used that reverses the process to re-generate the original leaf-node signals.

In an exemplary embodiment, a QAM baseband signal is generated in block 5 and I/Q modulated to an intermediate frequency (IF) in block 10 to generate a passband real-valued signal, $m(t)=s_{IF}(t)$. This real-valued passband signal is then SSB modulated using the rest of the structure of FIG. 1 to a carrier frequency $\omega_{IF}+\omega_c$. In a second exemplary embodiment, two QAM baseband signals are generated in blocks 605, 615 and are respectively I/Q modulated to IF in blocks 610, 620 to generate passband real-valued signals, $m_1(t)=s_{IF1}(t)$, and $m_2(t)=s_{IF2}(t)$. These real-valued passband signals are then QM modulated using the rest of the structure of FIG. 6 to a carrier frequency $\omega_{IF}+\omega_c$.

XIII. SSB-CPM and MQM-CPM Systems Architectures and Services

The various forms of SSB-FM modulators and demodulators, to include DMCM systems described in the last section provide methods and systems to improve performance in DSL modems, cable modems, broadband wireless access (e.g., WiMAX, 802.16, 802.16a), wireless local area networks (e.g., WiFi, 802.11), personal area networks (e.g., Bluetooth), terrestrial HDTV channels, digital cable TV channels, satellite communications, cellular telephones, wide-area cellular telephony based data endpoints (e.g., GSM EDGE, 2.5G, 3G and 4G), and other types of communication systems. In this section we consider some system architecture related issues.

Figure 25:
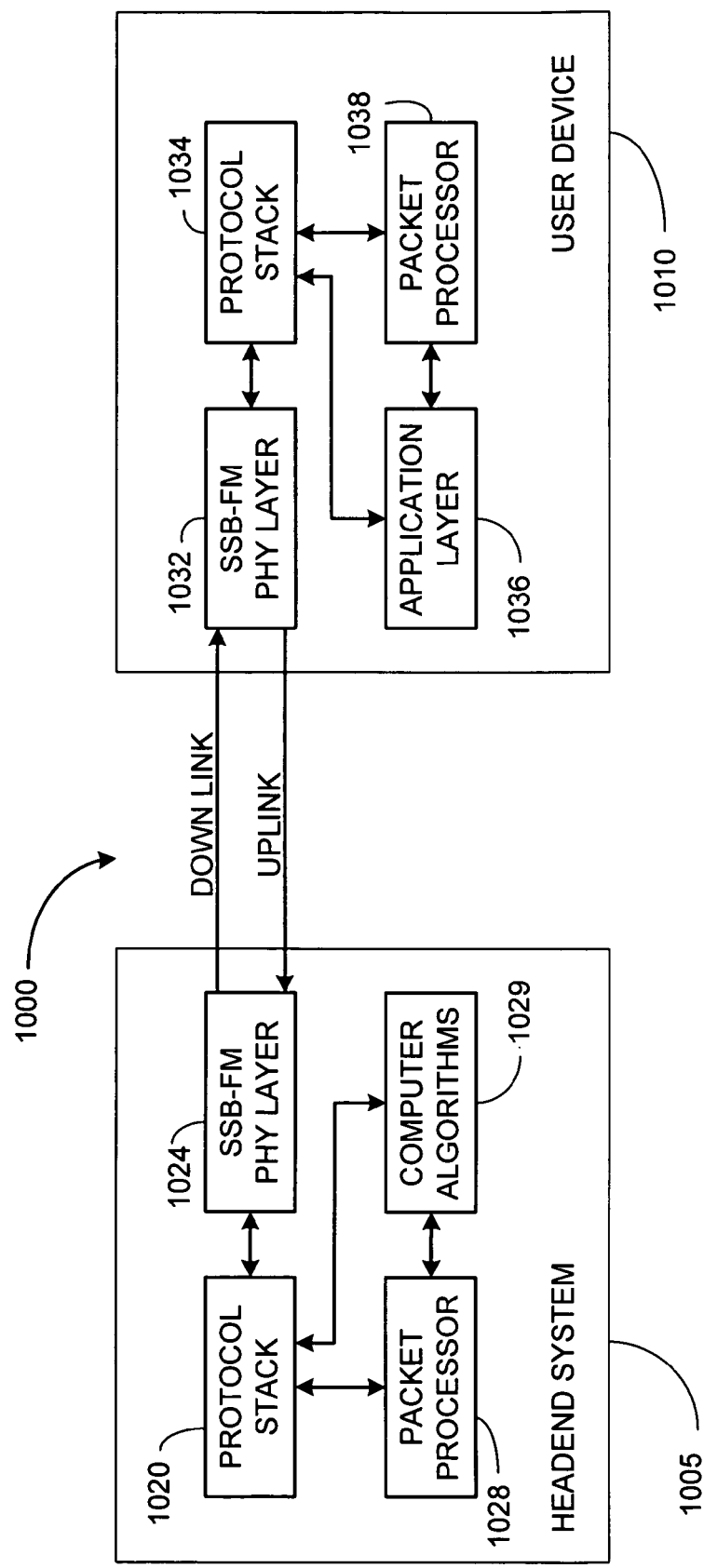
FIG. 25 is a block diagram representing an exemplary uplink/downlink type communication system used to implement a communication system and/or a communication protocol to provide a layered protocol structure using the SSB-FM techniques of the present invention in the physical layer.

FIG. 25 shows a higher level systems architecture 1000 into which any of the SSB-FM techniques described herein may be used. A headend system 1005 transmits via a downlink channel to user device 1010. The user device 1010 transmits back to the headend system 1005 via an uplink channel. The headend system comprises a protocol stack 1020 which includes a physical layer 1024. The headend system also may include a control and routing module 1028 to connect to external networks, databases, and the like. The headend system also contains a computer control module 1029 which comprises processing power coupled to memory. The computer control module 1029 preferably implements any maintenance functions, service provisioning and resource allocation, auto-configuration, software patch downloading and protocol version software downloads, billing, local databases, web page interfaces, upper layer protocol support, subscriber records, and the like.

The user terminal 1010 similarly includes a physical layer interface 1032, a protocol stack 1034 and an application layer module 1036 which may include user interface devices as well as application software. The user terminal 1010 also may optionally include a packet processor 1038 which can be connected to a local area network, for example. The user 1010 terminal may also act as an IP switching node or router in addition to user functions in some embodiments.

Another type of embodiment replaces the headend system 1005 with another user device 1010 in which case direct peer-to-peer communications is enabled. In many applications, though, the headend can act as an intermediary between two user devices to enable indirect peer-to-peer communications using the same headend-to/from-user device uplink/downlink architecture illustrated in FIG. 25.

In preferred embodiments of the present invention, at least one of the uplink and the downlink channels is implemented using one or more of the SSB-FM family of modulation schemes. For example, the transmitter and receiver structures such as described with FIGS. 1, 2, 6, 7, 22, and 23 may be used to implement one or both of the physical layer interfaces 1024, 1032. The physical layer may also include trellis coded modulation versions of any of the SSB-FM modulation schemes described. In some types of embodiments, the PHYS 1024, 1032 may include echo cancellation, cross-talk cancellation, equalization, and other forms of signal conditioning or receiver pre-processing.

Similarly, the protocol stack may preferably include in its link layer scrambling, interleaving, and forward error correction coding (channel coding, e.g., Reed-Solomon, block codes, convolutional codes, and turbo codes). The headend may include the optional packet switching node and/or router 1028, for example using an Internet Protocol (IP) packet forwarding policy. External databases connected via the router 1028 thereby provide remote services to the subscriber terminal via the headend. Similarly, local databases holding more specific types of data may be saved in computerized storage areas and processed using the computerized module 1029.

Focusing on the physical layer, the headend system may be coupled to a network infrastructure and may transmit onto the downlink channel a modulated signal derived from one or more real-value-baseband signals using any of the class of SSB-FM modulation types to include DMCM, SSB-CPM, QM-CPM, MQM-CPM, any TCM versions thereof, and any non-CPM SSB-FM variants thereof. Similarly, the real-valued baseband signal may be generated and modulated for use in the uplink direction and so that any form of SSB-FM reception is performed in the headend.

In one type of embodiment, the headend system may be a cellular communications base station that carriers voice and/or data, such as IP packet traffic. In other embodiments, the headend may be a wireless local area network base station or personal area network base station, respectively, for WiFi and Bluetooth type applications. In other types of applications, the headend system 1005 may correspond to a cable services headend system and the user device 1010 may be a cable modem. In other types of applications, the head end system 1005 may correspond to a DSL services head end system and the user device 1010 may be a DSL modem. In such applications the user device may also have a router function and connect to a home or office network, or any other type of network, for example.

In other types of applications the headend 1005 may transmit and the user devices 1010 may receive only, or the communications may be highly asymmetric. The SSB-FM class of signaling may be used to transmit digital television signals from a cable TV headend, a satellite TV broadcast headend, or a terrestrial HDTV headend. For example, a QAM or a 8-VSB signal as used in current digital CATV and terrestrial HDTV standards could be replaced, for example with CPM-QAM and CPM-PAM respectively with a physical layer software upgrade. Other SSB-FM signals could similarly be substituted for QAM or 8-VSB with equal success. Similarly, a trellis interleaver scheme like a turbo encoder or a trellis interleaver as used in the ATSC HDTV terrestrial transmission standard may be used with the present invention. As such U.S. Pat. No. 4,677,624, U.S. Pat. No. 4,677,625, U.S. Pat. No. 4,677,626, U.S. Pat. No. 5,243,627 and U.S. Pat. No. 5,446,747 are all incorporated herein by reference, but only to the extent that they serve as the basis for various additional specific exemplary embodiments of aspects of the present invention involving specific embodiments formed from combinations of the current disclosure with these patents. It is envisioned that the present invention can be combined with any of these patents to construct advantageous coded communication structures and methods.

We note that 8-VSB is a form of 8-level PAM modulation where the PAM levels are modulated onto the imaginary axis. CPM-PAM could similarly be modulated onto the imaginary axis only. However, it may be more desirable to use an SSB format instead, whereby the negative Hilbert transform is modulated onto the real axis and the M-ary CPM-PAM signal is modulated onto the imaginary axis. This provides an M-ary SSB-CPM-VSB signaling scheme that is much more efficient than prior art M-ary VSB. As discussed previously, 8-VSB signal's imaginary axis could be mapped to an 8-level PAM signal $\alpha(t)$ and then again mapped to an SSB-FM signal accordingly. This in essence converts the 8-VSB signal to a bandwidth efficient version of 8-PSK and then converts the 8-PSK signal back to an amplitude modulated signal, m(t). Typically CPM is used, or the PSK can contain phase jumps, or a PSK with a form of interpolation between phase points may be used as well, all within in the general context of SSB-FM signaling, based on one or more real-valued baseband (envelope) signals m(t) derived from phase-modulated signals. These schemes are also well suited to GSM EDGE which uses an 8-PSK version of CPM. An aspect of the present invention is to replace the 8-PSK modulation of GSM EDGE with a form of SSB-FM modulation, for example, the ones discussed in this paragraph and the preceding paragraphs.

Alternatively, a QM-CPM transmitter structure could be used and only the Q-channel modulated by an 8-level signal real-valued CPM signal m(t) to produce a more direct 8-VSB-CPM type signal. On the other hand, in the same bandwidth we could double the symbol rate and get by with a 4-VSB-CPM scheme. Preferably, a simple CPM-PAM demodulation scheme would be used to keep the processing in the television receiver simple. Four example, we could modulate a 4-ary real-valued CPM signal m(t) of FIG. 9 onto the imaginary axis only (Q-channel) using the transmitter of FIG. 6, and could take sample values at the symbol times and half symbol times to compute reduced-cost branch metrics for use in the Viterbi algorithm of the trellis decoder. Alternatively, these simpler 8-VSB-like modulation types could be replaced for a higher density scheme like TCM-MQM-CPM or DMCM to gain still higher bandwidth savings and efficiency for digital television transmission applications.

Another envisioned application is to replace DMT as used in modern ADSL modems with DMCM or SSB-FFT-OFDM or QM-FFT-OFDM as described in the previous sections. In one embodiment, each of 256 carriers is modulated with a selected type of SSB-FM. The same pilot signaling structure, bit loading algorithms, equalization, etc., are used from a selected prior art ADSL DMT system standard (e.g., G.991, G.992, VDSL. etc). In a preferred embodiment, then, the SSB-FM technique is selected to be MQM-CPM and the receiver structure is selected to be any of the DMCM receiver structures previously discussed. This type of embodiment can be used to improve the channel capacity of these existing standards by adopting a DMCM version of ADSL-DMT.

A preferred embodiment borrows services and techniques from selected protocol layers in an ADSL DMT communication system and adapts these borrowed features to layer over a higher-capacity DMCM physical layer.

In an alternative embodiment, SSB-FM processing is used to enhance the channel capacity of Bluetooth personal area networks. In such system, a given node is may be dynamically assigned to be the headend 1005. Bluetooth systems use a form of CPFSK which, according to the present invention, is preferably be replaced by an SSB-CPFSK or QM-CPFSK counterpart or some other SSB-FM type modulation. Similarly, multi-amplitude forms of GMSK, are replaced by a selected SSB-FM modulation type for further efficiency and bandwidth savings.

In other systems, the headend 1005 performs frequency hopping. The system dwells at a frequency and sends a burst of a modulated trellis signal m(t). Preferably the state of the trellis signal is constrained to be known at the time the frequency hop is performed, or alternatively, the frequency hop can be made in a continuous phase manner. Also, any of the members of the class of SSB-FM signal types can be spread in accordance with direct sequence e spread spectrum techniques. U.S. Pat. No. 5,610,940 is incorporated by reference herein, only for the purpose of enabling a class of spread spectrum techniques for use with the present invention. That is, an aspect of the present invention involves substituting the CPM or MSK signals used in U.S. Pat. No. 5,610,940 with any of the SSB-FM family of modulation types. Hence embodiments of the present invention involve using the techniques of U.S. Pat. No. 5,610,940 to extend the SSB-FM family of signals, transmitter and receiver structures to create a family of direct sequence spread spectrum signals and systems. Any embodiments derived from combining the present disclosure with any aspect of U.S. Pat. No. 5,610,940 is an embodiment of the present invention.

Another aspect of the present invention is a method of providing communication services to subscribers. That is, FIG. 25 also illustrates communication methods and methods of doing business. In this method a communication services company such as a cable modem services provider, a digital cable TV provider, a cellular telephony and IP data services provider, a wireless local area network WiFi hotspot provider, WiMAX broadband access provider, a terrestrial HDTV services provider, a satellite broadcast TV, a satellite IP data services connectivity provider or other type of communication services provider implements one or more of the headend nodes 1005 and provides services to one or more subscriber terminals 1010. A method or doing business is provided whereby an SSB-FM physical layer is used in the head end in the uplink and/or the downlink to provide a net higher system channel capacity to subscribers to thereby derive more revenue than in prior art techniques. The SSB-FM class of signaling schemes allows providers to provide higher data rates and/or higher reliability (BER performance) than when using prior art methods, thereby improving profit margin and customer satisfaction. Therefore, any of the systems or methods provided herein serve as the basis for methods of doing business whereby a communication service is provided to subscribers using any of the techniques described herein.

In another aspect of the invention, new features and services may be added to head end and subscriber terminal equipment using various forms of software download. For example, the system architecture of FIG. 25 supports downloading of patches or other types of software modules to a head end or subscriber device to upgrade an existing communication device to operate with a physical and/or link layer adapted for SSB-FM communications. A user may operate a communication device (e.g., cable modem, DSL modem, WiFi access point, WiMAX broadband access node, Bluetooth device, cellular data terminal or cellular phone, CATV receiver) using a legacy communication protocol, and receive one or more software modules to convert a the legacy protocol to a newer protocol or an updated protocol version that provides improved performance using an SSB-FM physical and/or link layer. Similarly, a previous revision of an SSB-FM physical layer or link layer protocol or an upper layer service may be upgraded or added to an existing SSB-FM based device via software download.

The present invention also envisions many specific embodiments involving heterogeneous inter-system roaming, software assisted roaming and software upgrading of mobile devices. As such, only for the purposes of describing specific embodiments involving downloading and software radio updating, the following patents are incorporated herein by reference: U.S. patent application Ser. No. 09/698,882, US Patent Application publication number 20050198199, US Patent Application publication number 20020069284, U.S. Pat. No. 6,308,281, and U.S. Pat. No. 6,680,923. In an aspect of the present invention, wireless access points such as satellite communications access points, WiFi access points, WiMAX broadband access points (e.g., using 802.16e), 2.5G, 3G and 4G cellular voice and data wireless access points are connected to a wide area network such as the Internet or into others forms of WAN and MAN type networks such as those provided by service providers and telecommunications network operators. Specific embodiments of the present invention are hereby disclosed as methods and systems taught in the patents or patent applications incorporated herein by reference into this paragraph using any type of SSB-FM physical layer. For example, always best connected roaming procedures for heterogeneous inter system roaming can be performed to roam to a network or from a network that uses an SSB-FM physical layer.

Another system level aspect involves the use of broadband access technologies such as 802.11, 802.16, 802.16a, 802.16e WiMAX and there derivatives. SSB-FM versions of OFDM are envisioned that provide services using advanced features such as DMCM, FFT DMCM, SSB-FFT-OFDM, QM-FFT-OFDM, and selected types of SSB-FM physical layers. Advanced coding techniques like Reed Solomon codes concatenated with trellis codes are envisioned. For example, the Reed Solomon coding can be applied at the link layer and trellis coding, possibly with interleaving can be applied at the link or physical layer. The SSB-FM modulation schemes can be layered with TDMA based access at the MAC layer, for example, using a slotted TDMA multiple access protocol in a point-to-multipoint network topology. In DMCM embodiments, different channels of different bandwidths may be assigned to users or subscriber endpoints on a slotted basis. That is, both frequency division multiplexing and time division multiplexing may be used to provide a multiple access protocol for multiple users sharing the same spectral resources. Additionally, the physical layer can preferably perform a second level of quadrature multiplexing at the antenna by modulating two physical layer signals onto orthogonally polarized antenna signals. This provides yet a second doubling of capacity.

In another aspect of the invention a wireless access station is configured using a DMCM air interface protocol. The DMCM protocol assigns different frequency channels having potentially varying bandwidths to different subscriber endpoints (fixed stations, SOHO, office complexes, campus environments, mobile users, etc.). These frequency channels of can be further shared using a form of TDMA at the MAC layer. Space division multiple access to include space-time coding, beam forming, and other forms of smart antenna systems can be used for sectorizing, cell splitting, or for pencil beaming to increase channel capacity as well. Hence in a layered system, FDMA, TDMA, and SDMA (space division multiple access) are all integrated with an SSB-FM technology to provide ultra-high capacity systems architectures to make the most efficient use of bandwidth possible. As discussed previously, a CDMA layer may be added as well, although at present it is believed that the DMCM without CDMA approach is preferred. When used in line of sight (LOS) air interfaces, this technology can also be used to carry back haul traffic from other wireless access points to interface back to the WAN. The LOS air interface may also be used to carry data to individual subscribers or campuses. A non-LOS (NLOS) air interface protocol may be used in more densely populated areas and to support mobile systems. Such a system would preferably support adaptive modulation whereby channel conditions are evaluated and the channel is optimized for the current channel conditions. A security layer is also preferably used to protect subscriber data. Quality of service guarantees are also provided. Automatic retransmission request is preferably supported to improve end-to-end performance by hiding RF layer errors to the upper layer protocols. Automatic power control is also provided to minimize self interference. Business methods involve providing one or more communication services using one or more of the aforementioned protocols and features combined over an SSB-FM physical layer to provide improved system performance to thereby increase system capacity and revenues.

XIV. Some Alternative Embodiments

A transmitter apparatus is constructed using an encoder that encodes into a memory structure of a real-valued envelope signal a set of trellis paths that correspond to respective data sequences. The trellis paths represent data from a complex-valued constellation that has been mapped to the real-valued envelope signal.

In one form of modulator embodiment, a modulator includes a baseband modulator that modulates an information stream onto a complex-valued baseband signal. The modulator uses a complex-to-real mapper that maps the complex-valued baseband signal onto a real-valued envelope signal. A Hilbert transformer then maps the real-valued envelope signal onto a corresponding real-valued Hilbert transform signal. An I/Q modulator then is used to modulate the real-valued envelope signal and the Hilbert transform signal onto a single sideband modulated signal.

Another type of modulator embodiment involves a modulator that includes a baseband modulator that modulates an information stream onto a real-valued phase function. A signal mapper is employed to map the real-valued phase function to onto a real-valued envelope signal. A Hilbert transformer is used to map the real-valued envelope signal onto a corresponding real-valued Hilbert transform signal. An I/Q modulator then is able to modulate the real-valued envelope signal and the Hilbert transform signal onto a single sideband modulated signal. The spectral content of the single sideband modulated signal typically occupies half the bandwidth of a baseband signal obtained by mapping the real-valued phase function onto a complex-valued baseband signal that is related to the real-valued envelope signal through a point-wise complex-to-real signal transformation.

Another type of modulator embodiment involves a modulator that includes a baseband modulator that modulates an information stream onto a real-valued phase function and a real-valued amplitude function. A mapping unit is used to map the real-valued phase function and the real-valued amplitude function onto a real-valued envelope signal. A Hilbert transformer is used to map the real-valued envelope signal onto a corresponding real-valued Hilbert transform signal. An I/Q modulator then maps the real-valued envelope signal and the Hilbert transform signal onto a single sideband modulated signal.

Another type of modulator involves a baseband modulator that modulates an information stream onto first and second real-valued phase functions. A signal mapper is used that maps the first and second real-valued phase functions onto a first and second real-valued envelope signals. A combining device is used that combines the first and second real-valued envelope signals to form a third real-valued envelope signal. An I-channel modulator (in-phase channel) is used that modulates the third real-valued envelope signal onto an in-phase carrier signal to form an in-phase modulated signal.

This type of modulator also preferably includes a second baseband modulator that modulates a second information stream onto third and fourth real-valued phase functions. The signal mapper further maps the third and fourth real-valued phase functions to onto a fourth and fifth real-valued envelope signals. The combining device further combines the fourth and fifth real-valued envelope signals to form a sixth real-valued envelope signal. A Q-channel modulator (quadrature-phase channel) is used to modulate the sixth real-valued envelope signal onto a quadrature-phase carrier signal to form a quadrature phase modulated signal. A modulation combiner is used that combines the in-phase and quadrature-phase modulated signals to form a quadrature multiplexed modulated signal.

In a multi-amplitude SSB version of this embodiment, a Hilbert transformer is used that maps the third real-valued envelope signal onto a corresponding real-valued Hilbert transform signal. In this case the Q-channel modulator is used to modulate the Hilbert transform signal onto the quadrature-phase carrier signal to form the quadrature phase modulated signal. The modulation combiner is then used to combine the in-phase and quadrature-phase modulated signals to form a single-sideband modulated signal.

Another type of modulator embodiment involves a baseband modulator that modulates an information stream onto a plurality of complex-valued SSB-FM baseband signals that each comprise two real-valued envelope signals, each of which that carry information in a respective trellis structure. A multi-carrier modulator is used to modulate each of the plurality of SSB-FM baseband signals onto respective in-phase and quadrature-phase carrier signals to form a plurality of SSB-FM modulated signals. These SSB-FM modulated signals are then combined to form a multi-carrier signal.

Another type of modulator embodiment involves a baseband modulator that modulates an information stream onto a plurality of complex-valued baseband signals. A complex-to-real mapper that maps the plurality of complex-valued baseband signals onto a respective plurality of real-valued envelope signals. A multi-carrier modulator is used that modulates each of the plurality of real-valued envelope signals onto respective in-phase carrier signals to form a plurality of real-valued in-phase modulated signals and combines the plurality of real-valued in-phase modulated signals to form a real-valued multi-carrier signal. A Hilbert transformer that maps the real-valued multi-carrier signal onto a corresponding real-valued Hilbert transform signal. An I/Q modulator is used that modulates the real-valued multi-carrier signal and the Hilbert transform signal onto a single sideband modulated signal.

Another type of modulator embodiment involves a baseband modulator that modulates an information stream onto a plurality of real-valued phase functions. A signal mapper is used that maps the real-valued phase functions onto a respective plurality of real-valued envelope signals. A multi-carrier modulator is used that modulates each of the plurality of real-valued envelope signals onto respective in-phase carrier signals to form a plurality of real-valued in-phase modulated signals and combines the plurality of real-valued in-phase modulated signals to form a real-valued multi-carrier signal. A Hilbert transformer is used that maps the real-valued multi-carrier signal onto a corresponding real-valued Hilbert transform signal. An I/Q modulator then modulates the real-valued multi-carrier signal and the Hilbert transform signal onto a single sideband modulated signal.

Another type of modulator embodiment involves a baseband modulator that modulates an information stream onto a plurality of complex-valued baseband signals. A multi-carrier modulator performs a complex-to-real mapping that maps the plurality of complex-valued baseband signals onto a real-valued multi-carrier-modulated signal. A Hilbert transformer maps the real-valued multi-carrier signal onto a corresponding real-valued Hilbert transform signal. An I/Q modulator modulates the real-valued multi-carrier signal and the Hilbert transform signal onto a single sideband modulated signal.

A method of processing involves starting with a bandwidth N point vector of signal points having a conjugate symmetric property and inverse transforming this vector to a real-valued multi-carrier signal that would require a bandwidth of B to send. A Hilbert transformer maps the real-valued multi-carrier signal onto a corresponding real-valued Hilbert transform signal. An I/Q modulator modulates the real-valued multi-carrier signal and the Hilbert transform signal onto an upper or lower sideband modulated signal, for example using equation (18).

A communication system involves a base station that is coupled to a network infrastructure and transmits in a downlink direction a real-valued envelope signal to a subscriber. The base station generates the real-value envelope signal using an encoder that encodes into a memory structure of the real-valued envelope signal a set of trellis paths that correspond to respective data sequences, and the trellis paths represent data from a complex-valued signal constellation. The base station may optionally receive a similar real-valued envelope signal in addition to or instead of sending the real-valued envelope signal. The communication system can optionally be a cellular, WiFi, or WiMAX type communication system and the base station transmits in the downlink direction via wireless transmission. The communication system can also be telephone network head end or a cable services head end in which case the base station transmits in the downlink direction via digital subscriber line transmission or a cable modem transmission.

Another embodiment involves a modulator that includes a baseband modulator that modulates an information stream onto first and second complex-valued baseband signals. This structure also includes a signal mapper that maps the first and second complex-valued baseband signals to onto first and second real-valued passband signals. An I/Q modulator then modulates the first and second real-valued passband signals respectively onto in-phase and quadrature-phase carrier signals.

Another embodiment involves a modulator that includes a baseband modulator that modulates an information stream onto a complex-valued baseband signal. This structure also includes a signal mapper that maps the complex-valued baseband signal onto real-valued passband signal. An I/Q modulator then modulates the real-valued passband signal and its Hilbert transform respectively onto in-phase and quadrature-phase carrier signals to create a passband SSB signal.

Although the present invention has been described with reference to specific embodiments, other embodiments may occur to those skilled in the art without deviating from the intended scope. It is to be expressly understood that many possibilities are envisioned but there are too many to specifically describe each one. For example, any of the equations or any sub-portion of any figure may be mixed with any other equation or any other figure or sub portion thereof to arrive at alternative envisioned embodiments. Similarly, while many block diagrams are described in terms of systems, apparatus and devices, any of these block diagrams could also serve as flow diagrams to describe software embodiments (i.e., methods or processes), or embodiments where certain blocks or elements are implemented in hardware and others in software. Likewise, while certain modulator and demodulator structures are described herein, these structures also define method steps that could more generally be carried out by other structures that generate the same or equivalent results in different ways using different functions. While CPM based signaling schemes were used to illustrate many examples, any of the broader genus of SSB-FM signaling types can be used instead, and specific examples can be formed by combining any of the concepts explicitly taught herein with any of the subject matter of any of the patents incorporated herein by reference. For example, the discussions of SSB-CPM, QM-CPM, MQM-CPM, CPM-PAM and CPM-QAM apply equally as well to similarly constructed SSB-FM signals containing phase jumps, or versions of SSB-FM signals derived from phase-discontinuous forms of PSK or trellis-based QAM constellations where interpolation is used between phase states or constellation points to make a discontinuous signaling scheme continuous or pseudo continuous to within a sampling grid. CPM is a convenient example because the information content in a CPM signal is conveniently encoded into a real-valued phase signal, but more complicated trellis-path signals defined over complex signal spaces may also be mapped to real-valued envelope signals, for example, in various TCM signaling schemes with complex baseband signal spaces. Any of the summing junctions disclosed herein can compute additions, subtractions, or other point-wise arithmetic operation. While the FFT and IFFT were used in various embodiments, other transforms may be substituted for these transforms to create alternative embodiments. Therefore, it is to be understood that the invention herein encompasses all such embodiments that do not depart from the spirit and scope of the invention as defined in the appended claims.

What we claim is:

1. A transmitter apparatus, comprising:
    a module that maps a first sequence of bits onto a first real valued envelope signal of the form $m_1(t)=A_1 \cos(\alpha_1(t)+\theta_1)$ and that maps a second sequence of bits onto a second real valued envelope signal of the form $m_2(t)=A_2 \cos(\alpha_2(t)+\theta_2)$, where $\alpha_1(t)$ and $\alpha_2(t)$ are real-valued digitized representations of continuous phase modulation phase functions, $A_1, A_2, \theta_1$, and $\theta_2$ are real numbers, and $\alpha_1(t)$ and $\alpha_2(t)$ are respectively related to the first and second sequences of bits and follow respective first and second sequences of phase states that are each constrained to be allowable sequences of phase states in accordance with a respective phase trellis; and
    an I/Q modulator that maps the first real-valued envelope signal, $m_1(t)$, into an in-phase channel, and maps the second real-valued envelope signal, $m_2(t)$, into a quadrature-phase channel for transmission onto a communication channel.

2. The transmitter apparatus of claim 1, wherein the first and second real-valued envelope signals, $m_1(t)$, $m_2(t)$, correspond to component signals of a quadrature multiplexed continuous phase modulated (QM-CPM) signal.

3. The transmitter apparatus of claim 1, wherein transmitter apparatus is incorporated into a head end system and is used to transmit a downlink signal.

4. The transmitter apparatus of claim 3, wherein the downlink signal is a wireless signal that carries packet data.

5. The transmitter apparatus of claim 3, wherein the downlink signal is a wireline signal that carries packet data.

6. The transmitter apparatus of claim 1, wherein transmitter apparatus is incorporated into a subscriber terminal device and is used to transmit a subscriber uplink signal.

7. The transmitter apparatus of claim 6, wherein the subscriber uplink signal is a wireless signal that carries packet data.

8. The transmitter apparatus of claim 6, wherein the subscriber uplink signal is a wireline signal that carries packet data.

9. The transmitter apparatus of claim 1, wherein:
    $\alpha_1(t)$ is an approximation of $$\alpha_1(t) = 2\pi h \sum_{k=-\infty}^{\infty} I_k \int_{-\infty}^{t} g(\tau - kT) d\tau + \beta \quad (68)$$

where, h is a modulation index, T is a symbol duration, g(t) is a baseband pulse-shape waveform, and β is a where, h is a modulation index, T is a symbol duration, g(t) is a baseband pulse-shape waveform, and β is a fixed phase-offset.

10. The transmitter apparatus of claim 1, wherein $m_1(t)$ is an approximation of a real-valued envelope of a corresponding complex-valued CPM baseband signal of the form, $x(t)=Ae^{j\alpha_1(t)}=A[\cos(\alpha_1(t))+j \sin(\alpha_1(t))]$.

11. The transmitter apparatus of claim 10, wherein $\alpha_1(t)$ is a phase trellis signal that takes on M phase state values in the range $[0, 2\pi]$ and these M phase states map to M/2 real-valued amplitude states in the signal $m_1(t)$, where M is a positive even integer.

12. The transmitter apparatus of claim 1, wherein $\alpha_2(t)=\alpha_3(t-\tau)$, where τ is a real number and $\alpha_3(t)$ is computed using a same formula a used to compute $\alpha_1(t)$, but with a different data sequence as input to the formula used to compute $\alpha_1(t)$.

13. A receiver apparatus, comprising:

an I/Q demodulator that receives in an in-phase channel a first real-valued envelope signal, $z_1(t)$, and receives in a quadrature-phase channel a second real-valued envelope signal, $z_2(t)$; and a decoder that processes the first real-valued envelope signal, $z_1(t)$, and performs trellis decoding thereon to discern a set of trellis paths that correspond to respective data sequences;

wherein the first and second real-valued envelope signals are respective received-signal approximations of transmitted real-valued envelope signals of the form $m_1(t)=A_1 \cos(\alpha_1(t)+\theta_1)$ and $m_2(t)=A_2 \cos(\alpha_2(t)+\theta_2)$, where $\alpha_1(t)$ and $\alpha_2(t)$ are real-valued digitized representations of continuous phase modulation phase functions that follow respective first and second sets of phase states, and $A_1$, $A_2$, $\theta_1$, and $\theta_2$ are real numbers.

14. The receiver apparatus of claim 13, wherein $m_1(t)$ is a real-valued envelope representation of a corresponding complex-valued CPM baseband signal, $x(t)=Ae^{j\alpha_1(t)}=A[\cos(\alpha_1(t))+j\sin(\alpha_1(t))]$.

15. A transmitter apparatus, comprising:

a first module that maps a first of set of input bits onto a first plurality of N digitized representations of real-valued continuous phase modulation phase functions, $\{\alpha_{1,i}(t): i=1,\ldots N\}$, and maps a second set of input bits onto a second plurality of N digitized representations of real-valued continuous phase modulation phase functions, $\{\alpha_{2,i}(t) i=1,\ldots N\}$ where N is a positive integer greater than one, and embedded into each phase function is a respective sequence of phase states that is constrained to conform to a respective allowable phase state sequence in accordance with a respective phase trellis;

a second module that maps the first and second sets of phase functions to respective first and second real valued envelope signals of the form $$m_1(t) = \sum_{i=1}^{N} a_{1,i}\cos(\alpha_{1,i}(t - \tau_{1,i})) \text{ and } m_2(t) = \sum_{i=1}^{N} a_{2,i}(\alpha_{2,i}(t - \tau_{2,i}))$$

where each $a_{,i1}$, $a_{2,i}$, $\tau_{1,i}$, and $\tau_{2,i}$ are real numbers; and an I/Q modulator that maps the first real-valued envelope signal, $m_1(t)$, into an in-phase channel, and maps the second real-valued envelope signal, $m_2(t)$, into a quadrature-phase channel for transmission onto a communication channel.

16. A receiver apparatus, comprising:

an I/Q demodulator that receives in an in-phase channel a first real-valued envelope signal, $z_1(t)$, and receives in a quadrature-phase channel a second real-valued envelope signal, $z_2(t)$; and a decoder that processes the first real-valued envelope signal, $z_1(t)$, and performs trellis decoding thereon to discern a set of trellis paths that correspond to respective data sequences;

wherein the first and second real-valued envelope signals are respective received-signal approximations of transmitted real-valued envelope signals of the form $$m_1(t) = \sum_{i=1}^{N} a_{1,i}\cos(\alpha_{1,i}(t - \tau_{1,i})) \text{ and } m_2(t) = \sum_{i=1}^{N} a_{2,i}\cos(\alpha_{2,i}(t - \tau_{2,i}))$$

where each $a_{,i1}$, $a_{2,1}$, $\tau_{1,i}$, and $\tau_{2,i}$ are real numbers and where $\{\alpha_{1,i}(t): i=1,\ldots N\}$ and $\{\alpha_{2,i}(t): i=1,\ldots N\}$ are digitized representations of real-valued continuous phase modulation phase functions that each follow a respective trellis-constrained sequences of phase states.

* * * * *